US011451555B2

(12) United States Patent
Choyi et al.

(10) Patent No.: US 11,451,555 B2
(45) Date of Patent: Sep. 20, 2022

(54) RESOURCE-DRIVEN DYNAMIC AUTHORIZATION FRAMEWORK

(71) Applicant: Convida Wireless, LLC, Wilmington, DE (US)

(72) Inventors: Vinod Kumar Choyi, Conshohocken, PA (US); Chonggang Wang, Princeton, NJ (US); Shamim Akbar Rahman, Cote St. Luc (CA); Quang Ly, North Wales, PA (US); Xu Li, Plainsboro, NJ (US); Zhuo Chen, Claymont, DE (US); Rocco Di Girolamo, Laval (CA)

(73) Assignee: Convida Wireless, LLC, Wilmington, DE (US)

( * ) Notice: Subject to any disclaimer, the term of this patent is extended or adjusted under 35 U.S.C. 154(b) by 154 days.

(21) Appl. No.: 17/102,494

(22) Filed: Nov. 24, 2020

(65) Prior Publication Data

US 2021/0084044 A1 Mar. 18, 2021

Related U.S. Application Data

(63) Continuation of application No. 15/738,811, filed as application No. PCT/US2016/040395 on Jun. 30, 2016, now Pat. No. 10,893,051.

(Continued)

(51) Int. Cl.
*G06F 21/62* (2013.01)
*H04L 9/40* (2022.01)
(Continued)

(52) U.S. Cl.
CPC ......... *H04L 63/102* (2013.01); *G06Q 20/383* (2013.01); *H04L 63/0884* (2013.01);
(Continued)

(58) Field of Classification Search
CPC ..... G06F 21/60; G06F 21/6227; H04L 63/10; H04L 63/14; H04L 63/105; H04L 63/108; H04L 63/205
See application file for complete search history.

(56) References Cited

U.S. PATENT DOCUMENTS 9,779,260 B1 * 10/2017 Brisebois .............. G06F 16/258
2006/0143690 A1 * 6/2006 Lin ......................... G06F 21/10
726/2

(Continued)

FOREIGN PATENT DOCUMENTS

CN 101208702 A 6/2008
CN 101335618 A 12/2008
(Continued)

OTHER PUBLICATIONS

Dierks et al., "The Transport Layer Security (TLS) Protocol Version 1.2", IETF Network Working Group, RFC 5246, Aug. 2008, 104 pages.

(Continued)

*Primary Examiner* — Olugbenga O Idowu
(74) *Attorney, Agent, or Firm* — BakerHostetler

(57) ABSTRACT

Embodiments concern a dynamic authorization framework. Security Classification Process (SCP) is the process of classifying raw data, information extracted from raw data, content or code from security-value perspective. Security Achievability Determination Process (SADP) is a process based on a SV/SC that has been assigned, the RHE may determine the Security Requirements and how the security requirements may be achieved. During the Security Achievability Listing Process (SALP), the RHE uploads onto the Resource Listing Entity (RLE) the URI of the resource, the SAM associated with the resource and optionally a digital certificate associated with the resource. During the SAM Assessment Process (SAMAP) process, a Client evaluates (Continued)

the security mechanisms that must be carried out in order to meet the SAM that was provided as part of the Discovery Process (DP). Based on the SAM obtained from the RLE, the Client may initiate a Security Achievability Enabling Process (SAEP). The Client may be required to initiate an Authentication, Authorization, Payment and obtain an assertion of secure behavior from a Security-Achievability Enabler Function (SAEF), which may be a trusted third-party Function or Entity.

9 Claims, 34 Drawing Sheets

Related U.S. Application Data

(60) Provisional application No. 62/188,157, filed on Jul. 2, 2015.

(51) Int. Cl.
G06Q 20/38 (2012.01)
H04W 4/70 (2018.01)
H04L 67/01 (2022.01)

(52) U.S. Cl.
CPC .......... H04L 63/101 (2013.01); H04L 63/105 (2013.01); H04L 63/205 (2013.01); H04L 67/01 (2022.05); H04W 4/70 (2018.02)

(56) References Cited

U.S. PATENT DOCUMENTS

2009/0198697 A1 8/2009 Bilger et al.
2011/0154401 A1* 6/2011 Chow ................ H04N 21/4821 725/100
2015/0089623 A1 3/2015 Sondhi et al.

FOREIGN PATENT DOCUMENTS

| CN | 101546261 A | 9/2009 |
|---|---|---|
| CN | 102457377 A | 5/2012 |
| CN | 103428167 A | 12/2013 |
| CN | 103685204 A | 3/2014 |
| CN | 104104673 A | 10/2014 |
| JP | 2005-339179 A | 12/2005 |
| JP | 2006-244473 A | 9/2006 |
| JP | 2008-084266 A | 4/2008 |
| JP | 2014-106652 A | 6/2014 |
| WO | 2015/031779 A1 | 3/2015 |

OTHER PUBLICATIONS

Fugini et al., "Dynamic Security Modeling in Risk Management Using Environmental Knowledge", 2014 IEEE 23rd International WETICE Conference, Jun. 23, 2014, pp. 429-434.
Gerdes et al., "Delegated CoAP Authentication and Authorization Framework (DCAF) draft-gerdes-ace-dcaf-authorize-01" ACE Working Group Internet—Draft, Feb. 9, 2015, 42 pages.
Greevenbosch et al., "Comparison of Different Proposals for ACE draft-greevenbosch-ace-comparison-01" ACE Internet Informational, Dec. 17, 2014, 22 pages.
Hardt et al., "The OAuth 2.0 Authorization Framework", Internet Engineering Task Force (IETF) RFC 6749, Oct. 2012, 76 pages.
Jones et al., "JSON Web Token (JWT)" Internet Engineering Task Force (IETF) RFC 7519, May 2015, 30 pages.
Kent et al. "Security Architecture for the Internet Protocol", IETF Network Working Group, RFC 4301, Dec. 2005, 101 pages.
Nottingham, "Web Linking" Internet Engineering Task Force (IETF) RFC 5988, Oct. 2010, 23 pages.
Rescorla et al., "Datagram Transport Layer Security Version 1.2" Internet Engineering Task Force (IETF) RFC 6347, Jan. 2012, 32 pages.
Seitz Ludwig et al., "Authorization Framework for the Internet-of-Things", Jun. 4, 2013.
Shelby et al. "CoRE Resource Directory draft-ietf-core-resource-directory-02" CoRE Internet—Draft, Standards Track, Nov. 9, 2014, 35 pages.
Shelby et al., "Constrained RESTful Environments (CoRE) Link Format" Internet Engineering Task Force (IETF) RFC 6690, Aug. 2012, 22 pages.
Shelby et al., "The Constrained Application Protocol (CoAP)" Internet Engineering Task Force (IETF) RFC 7252, Jun. 2014, 112 pages.

* cited by examiner

```
{
    "typ": "JWT",
    "alg": "HS256"
}
{
    "iss": "saef1.com",
    "aud": "rhe1.com",
    "sub": "R-id",
    "iat": "01/01/2015: 20:00hrs"
    "payment": $200.00,
    "exp": 86400
}
{

Signature
}
```

RESOURCE-DRIVEN DYNAMIC AUTHORIZATION FRAMEWORK

CROSS-REFERENCE TO RELATED APPLICATIONS

This Application is a continuation of U.S. application Ser. No. 15/738,811 filed Dec. 21, 2017 which is a National Stage Application filed under 35 U.S.C. § 371 of International Application No. PCT/US2016/040395 filed Jun. 30, 2016, which claims the benefit of U.S. Provisional Patent Application Ser. No. 62/188,157, filed Jul. 2, 2015, the disclosure of which is hereby incorporated by reference as if set forth in its.

BACKGROUND

In order to provide for a more dynamic authorization, the Internet Engineering Task Force (IETF) developed the Open Authorization (OAuth) framework (The OAuth 2.0 Authorization Framework, IETF-RFC 6749). The OAuth framework is a token-based framework that has been widely deployed by some of the prominent Identity providers (e.g. Google, Facebook) in the Internet. It enables a Client to access a resource hosted by an entity even though the Client may not have credentials associated with that entity. A statically pre-configured trust relationship between the Client's Identity Provider and the entity hosting the resource is leveraged in order to authorize the Client.

The OAuth has been developed based on requirements from Internet-based use-cases, where a human involvement is generally assumed. In addition, the devices accessing the resource may not have device-specific constraints such as computing, memory or battery. IETF's Authentication and Authorization for Constrained Environment (ACE) working group has been trying to develop standards and solutions by taking advantage of the dynamicity of OAuth but at the same time tailoring it to the needs of Machine-to-Machine (M2M) communications/Internet-of-Things (IoT) systems. Various candidate authorization models have been studied and compared in the references "Comparison of different proposals for ACE", "Delegated Authentication Framework (DCAF)", and "Delegated CoAP Authentication and Authorization Framework (DCAF)". Such candidate authorization models are discussed below.

In information security, access control is the process of restricting an entity (human, applications or hardware) from accessing a piece of data or information. In short, it is the process of controlling a "subject" from accessing an "object". Generally, access control was performed using rigid and static tables, also known as Access Control Lists (ACLs), where a subject was a member of the list and the operations that the subject could perform on the object was explicitly stated. Temporary access was seldom provided, and if it was provided did not go far enough to resources/data that belonged other administrative domains. Classes of subjects and objects such as role-based access mechanisms provided some flexibility but does not provide the flexibility required for a dynamic web environment, where, user applications from various entities belonging to a domain can interact with applications from other domains in a seamless manner.

Token-based access mechanisms provide a more flexible authorization mechanism, wherein a resource owner may provide an entity (subject) with temporary access to an object without revealing the resource owner's credentials for certain duration. OAuth is one such widely deployed authorization framework.

The OAuth framework describes mechanisms for enabling Clients to obtain access to a service/resource indirectly from a resource owner by using the services offered by a trusted third party. The Client may be authorized to access the resource for a limited amount of time or the access may be revoked after a certain amount of time. The resource owner does not have to provide the Client with its own credentials, but the Client is provisioned with temporary credentials to obtain access to the resource. A trusted third-party enables the Client to obtain access to the resource. In addition, the Client may be restricted from accessing the complete resource and may only be authorized to access a subset of it by the trusted third-party.

An Authorization layer separates the role of the Client 102 and a resource owner 104. A resource owner 104 may issue an authorization grant to the Client 102. A Client 102 obtains authorization in the form of an Authorization Token (AT) from an Authorization Server (AS) 106. ATs are issued by an AS 106 based on the approval of a Resource Owner (RO) 104. The Client uses the AT in order to obtain access to the resource. The four main roles defined by the protocol are:

Resource Owner (RO) 104
Resource Server (RS) 108
Client 102
Authorization Server (AS) 106

OAUTH Protocol Flow and Dynamic Authorization Models

In step 1 of FIG. 1, the client 102 requests authorization grant from a RO 104. The request by the Client 102 can be made directly to the RO 104 or done indirectly via the AS 106.

In step 2 of FIG. 1, the Client 102 receives an authorization grant from the RO 104. The RO 104 may provide grants using a few means. The grant type may be an authorization code, using implicit means, resource owner's password credentials, and Client credentials.

In step 3 of FIG. 1, the Client 102 requests to obtain an access token from the AS 106 after presenting the authorization grant obtained from the RO. The Client 102 and the AS 106 may authenticate one another as part of the AT request process.

In step 4 of FIG. 1, the AS 106 issues an AT to the Client 102 after verifying the authorization grant and after subsequently authenticating the Client 102, which may be optional.

In step 5 of FIG. 1, the Client 102 requests access to the protected resource by presenting the AT to the RS.

In step 6 of FIG. 1, the RS 108 validates the AT and if it is deemed to be valid, provides Client 102 with access to the resource.

A high-level description of the different Authorization models are provided in the FIGS. 2-6.

The PUSH Messaging model is described with respect to FIG. 2.

In step 1 of FIG. 2, the client 102 requests an AT from an AS 106 for access to a resource located on a RS.

In step 2 of FIG. 2, the AS 106 sends the AT to the Client 102. The Client 102 and the AS 106 may have mutually authenticated one another before the AT is sent to the Client 102. The AT may be sent over a secure connection In step 3 of FIG. 2, the Client 102 sends the AT using a Resource Access Request to the RS 106.

In step 4 of FIG. 2, the RS 108 verifies the AT and returns a Resource Access Response to the Client 102.

In the PULL Model, all the interactions are performed via the RS 108. The PULL model follows the general service access process (e.g. WiFi Access Request). This may not be very suitable where a RS 108 is constrained. Messaging details for FIG. 3 is provided below.

In step 1 of FIG. 3, the client 102 tries to access a resource located on a RS 108.

In step 2 of FIG. 3, the RS 108 communicates with the AS 106 requesting for authorization of the Client 102. The RS 108 may belong to the same administrative domain as the AS 106 or have a strong trust relationship with AS.

In step 3 of FIG. 3, the AS 106 grants or rejects the authorization. The AS 106 may perform an authentication with the Client 102.

In step 4 of FIG. 3, based on the response from the AS, the RS 108 grants or rejects access to the resource.

In the agent model, a Client 102 requests access to a resource with an AS 106. It is assumed that the Client 102 has a strong trust relationship between itself and the AS 106. The AS 106 may be the identity provider for the Client 102. Messaging details are provided below.

In step 1 of FIG. 4, client 102 forwards resource access request to the AS.

In step 2 of FIG. 4, the AS 106 checks the access rights of the Client 102 and then sends the resource access request to the RS 108. The AS 106 includes an AT within its request to the RS.

In step 3 of FIG. 4, the RS 108 verifies the AT and then responds with a resource access response containing the resource to the AS.

In step 4 of FIG. 4, the AS 106 forwards the response to the Client 102.

The PUSH Confirm Model is illustrated in FIG. 5 and messaging details are provided below.

In step 1 of FIG. 5, the Client 102 sends a request to obtain an AT from the AS.

In step 2 of FIG. 5, the AS 106 sends an AT identifier to the Client 102 after an optional authentication process with the Client 102.

In step 3 of FIG. 5, the Client 102 sends AT identifier to the RS 108.

In step 4 of FIG. 5, the RS 108 submits the AT identifier to the AS, in order to obtain the AT from the AS 106.

In step 5 of FIG. 5, the AS 106 checks the AT identifier and responds with the associated AT to the RS 108

In step 6 of FIG. 5, the RS 108 verifies the AT and then sends a response with the resource to the Client 102

The Indirect PUSH Model is illustrated in FIG. 6 and messaging details are provided below.

In step 1 of FIG. 6, the client 102 sends to the AS 106 an authorization request for a particular resource In step 2 of FIG. 6, the AS 106 verifies the request and sends an AT to the RS 108

In step 3 of FIG. 6, the RS 108 stores the AT and sends a response to the AS

In step 4 of FIG. 6, the AS 106 sends an authorization response back to the Client 102

In step 5 of FIG. 6, the Client 102 sends resource access request to the RS 108, which may contain an AT identifier In step 6 of FIG. 6, the RS 108 verifies the request and the AT identifier and then responds with the resource to the Client 102

A brief comparison of the various models from a Client perspective is provided in Table 1. As it can be observed that from a Client messaging perspective (number of messages and possible protocol support), the PUSH model has the highest overhead impact, whereas the PULL and the Agent models have lower impact on a constrained Client.

TABLE 1

Comparison of Models from a Client-perspective

| | Client Messages | Flexibility | Security | Notes |
|---|---|---|---|---|
| PUSH Model | 4 (Med) | HIGH | Not much Control | Closely follows OAUTH<br>Does not leverage relationship between RS 108 and AS 106 |
| PULL Model | 2 (Low) | Medium | Tightly Controlled | Leverages relationship between RS 108 and AS 106<br>Assumption of AS 106/RS 108 close relationship may not fit all scenarios |
| Agent Model | 2 (Low) | Low | Tightly Controlled | All access to a resource has to go through the AS 106<br>May not scale well if AS 106 does not have a relationship with RS |
| Push Confirm | 4 (Med) | Medium | Tightly Controlled | Possibly less efficient than Indirect Push |
| Indirect Push | 4 (Med) | Medium | Tightly Controlled | AS 106 may be able to assess the authorization requirement more efficiently perspective is provided than Push Confirm model. |

A brief comparison of the various models from a RS-perspective is provided in Table 2. The PUSH model has a low impact on an RS 108 but also offers the highest flexibility and therefore may be preferred by a constrained RS 108.

TABLE 2

Comparison of the various models from RS-perspective

| | RS Messages | Flexibility | Security | Notes |
|---|---|---|---|---|
| PUSH Model | 2 (Low) | HIGH | Not much Control | Closely follows OAUTH<br>Does not leverage relationship between RS 108 and AS 106 |
| PULL Model | 4 (HIGH) | Medium | Tightly Controlled | Leverages relationship between RS 108 and AS 106<br>Assumption of AS 106/RS 108 close relationship may not fit all scenarios |

TABLE 2-continued

Comparison of the various models from RS-perspective

|  | RS Messages | Flexibility | Security | Notes |
|---|---|---|---|---|
| Agent Model | 2 (Low) | Low | Tightly Controlled | All access to a resource has to go through the AS 106<br>May not scale well if AS 106 does not have a relationship with RS |
| Push Confirm | 4 (Med) | Medium | Tightly Controlled | Possibly less efficient than Indirect Push |
| Indirect Push | 4 (Med) | Medium | Tightly Controlled | AS 106 may be able to assess the authorization requirement more efficiently than Push Confirm model. |

Referring to FIG. 7, the Delegated CoAP Authentication and Authorization Framework (DCAF) 700 provides for a delegated authentication of the Client 102 by means of a Client Authorization Manager (CAM) 702 and a DCAF-Server Authorization Manager (D-SAM) 704. A Client 102 may delegate the more expensive Authentication and Authorization processes to a CAM 702. The CAM 702 has a trust relationship with a D-SAM 704, with which the CAM 702 performs an authentication on behalf of the Client 102. The DCAF procedure may be applicable to any relevant model. The messaging flow is provided below.

In step 1 of FIG. 7, a Client 102 requests access to a resource, the RS 108 then requests the Client 102 to perform an authorization.

In step 2 of FIG. 7, the Client 102 delegates the authorization process to the CAM 702

In step 3 of FIG. 7, the CAM 702 initiates an authorization process with the D-SAM 704 and performs the authorization on behalf of the Client 102.

SUMMARY

The various OAUTH-based models described above can provide flexibility which may be used by both the Clients as well as the RS. However, there is no current over-arching framework that provides mechanism for either the RS or Clients to select, the appropriate models and create a more dynamic operating procedure suitable for IoT environments.

The following describes a framework and mechanisms to provide for dynamic authorization to resources based on the security value associated with a resource. Security classification process and listing of the classification/requirements and security mechanisms are also described. The right model, appropriate assessments and flexibility in dealing with constrained Clients as well as Resource Servers are also described. Some of the high-level innovative ideas are captured:

Security Classification Process (SCP): The SCP is the process of classifying raw data, information extracted from raw data, content or code from security-value perspective. During the SCP, the Resource Hosting Entity (RHE) determines how the data/information must be handled from a security perspective. As a result of the classification process, a Security Value (SV)/Security Class (SC) is assigned to the data/information. The classification may change over time and also context information (e.g. location, planned usage etc. . . . ) may determine the security value associated with a resource.

Security Achievability Determination Process (SADP): Based on the SV/SC that has been assigned, the RHE may determine the Security Requirements and how the security requirements may be achieved. The RHE and in most cases in conjunction with a resource owner, determines the detailed Security Mechanisms that may be required in order to meet the security requirements and thereby satisfying the SV/SC associated with the data.

A detailed and granular list of security mechanisms called the Security Achievability Mechanism (SAM) is defined.

The SAM also provides information on flexible approaches to authorization (may not be security related): Proxy Authentication and Proxy Authorization, Authorization Models supported (PUSH, PULL, Indirect PUSH, etc.), etc. . . . .

Security Achievability Listing Process (SALP): During the SALP, the RHE uploads onto the Resource Listing Entity (RLE) the User Resource Identifier (URI) of the location of the resource on the RHE, the SAM associated with the resource and optionally a digital certificate associated with the resource.

SAM Assessment Process (SAMAP): During this process, a Client evaluates the security mechanisms that must be carried out in order to meet the SAM that was provided as part of the Discovery Process (DP). The Client takes appropriate actions based on the SAM in order to fulfill the requirements using one or more mechanisms defined within it.

Client makes a determination about the Security level associated with a resource Client makes a determination about the Authorization Model that best suits its needs from a possible list of supported Models provided in the SAM The AS that has to be contacted for Authorization (in the case of PUSH model)

Ability to perform Proxy-Authentication/Retrieval

Security Achievability Enabling Process (SAEP): Based on the SAM obtained from the RLE, the Client may initiate security procedures in order to satisfy the requirements using the SAM as guidelines. The Client may be required to initiate an Authentication, Authorization, Payment and obtain an assertion of secure behavior from a Security-Achievability Enabler Function (SAEF), which may be a trusted third-party Function or Entity.

The SAEF determines the type of assessments that must be carried out

The functions that must be orchestrated and contacted

The type of tokens to be generated

Proxy-Authentication Verification Process and Generation of Appropriate Tokens

Resource Access Process (RAP): The Client presents an assertion or token that illustrates trustworthiness and/or payment information to the RHE. The RHE verifies if the Client has performed the security mechanisms that meets the SAM and if so, authorizes access to the data based on terms and conditions that were agreed upon. The RAP process would include support for the following:

Ability to verify if all the requirements within the SAM have been achieved.

Ability to provide restricted access to a resource if only a subset of the SAM requirements have been achieved.

Verification of the different types of tokens (e.g. Proxy-Authenticated token)

Capability to provide access to a resource in a Proxy-Retrieval mode

Ability to track token, token usage and validity associated with the tokens

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to limitations that solve any or all disadvantages noted in any part of this disclosure.

BRIEF DESCRIPTION OF THE DRAWINGS

A more detailed understanding may be had from the following description, given by way of example in conjunction with accompanying drawings wherein:

FIG. 19 is a diagram that illustrates an example payment token.

FIG. 30 is a diagram that illustrates GUIs that may be incorporated at the AS.

DETAILED DESCRIPTION OF ILLUSTRATIVE EMBODIMENTS

Managing the access control of data (resources) that may be generated by IoT/M2M sensors and applications has become cumbersome and current static access control mechanisms are not well suited for such applications. They are not suitable for multiple reasons:

A Client may request a resource access for a certain period of time. Once access is granted, then validity for access may last an hour or even few minutes.

The resource owner and the Client may not have a prior relationship.

A resource/resource owner does not have to share a password with the Client requesting access to the resource and thereby avoiding expensive and sometimes un-secure password management procedures.

The dynamicity and unique requirements of an IoT system cannot be met using mechanisms that have been generally developed for a Controlled Enterprise-like environment, where a resource access is centrally controlled and requirement for dynamic access is rarely needed. Clients and Resource servers are generally considered to be non-constrained and in fact have very high computing, memory and battery power unlike IoT Clients and RS.

Use Case 1

Figure 1:
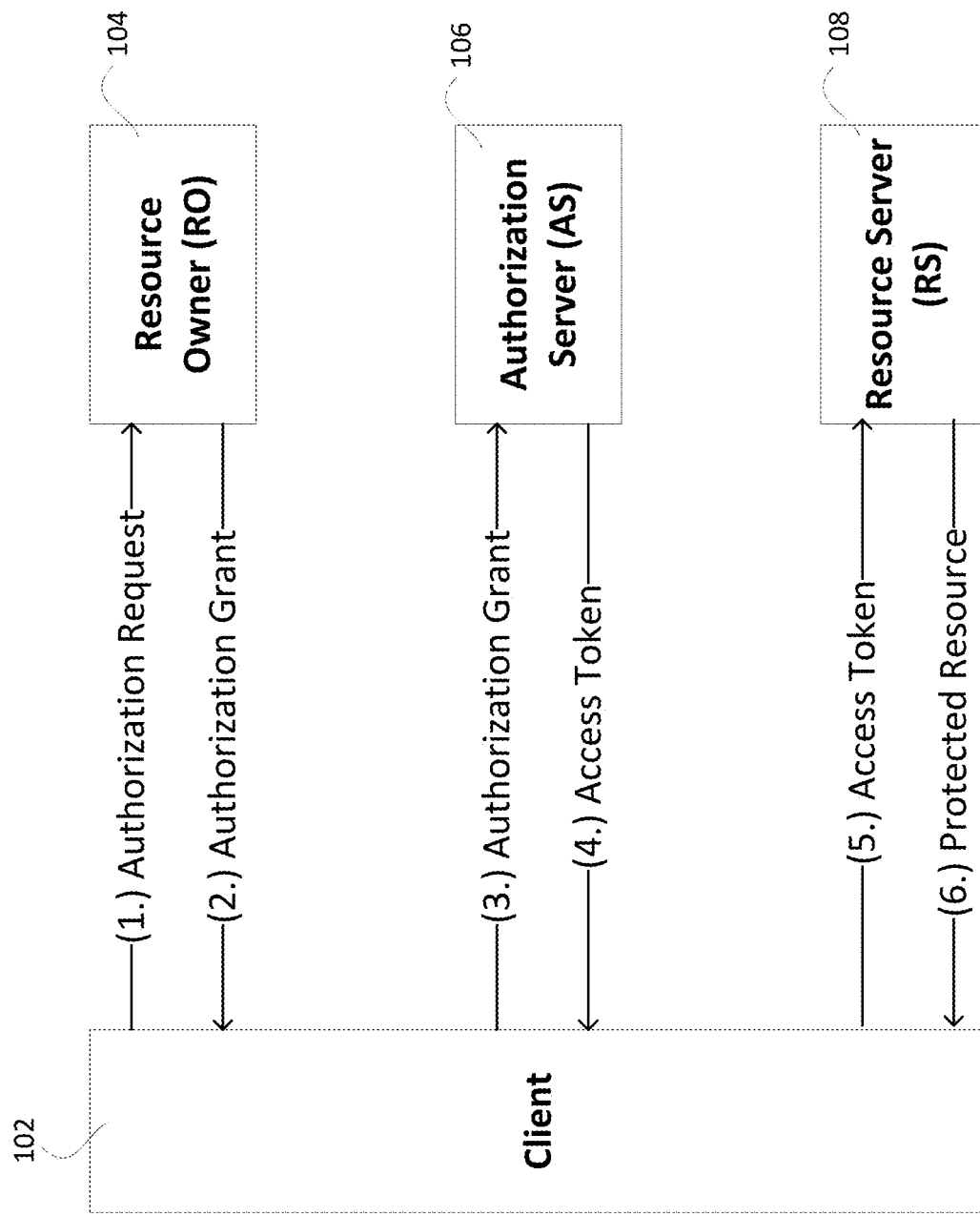
FIG. 1 is a diagram that illustrates the Open Authorization (OAUTH) protocol flow.
Figure 2:
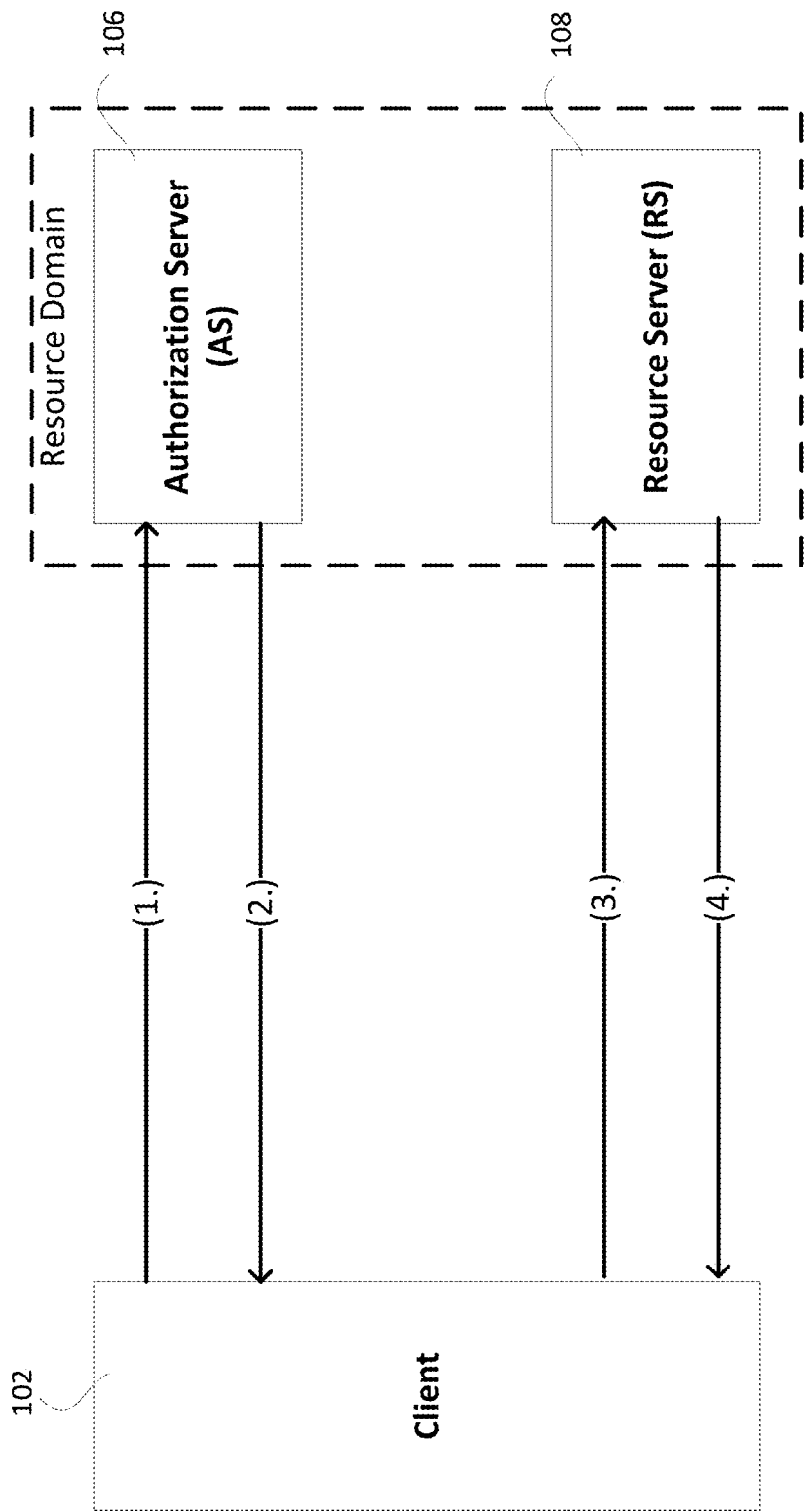
FIG. 2 is a diagram that illustrates a PUSH model.
Figure 3:
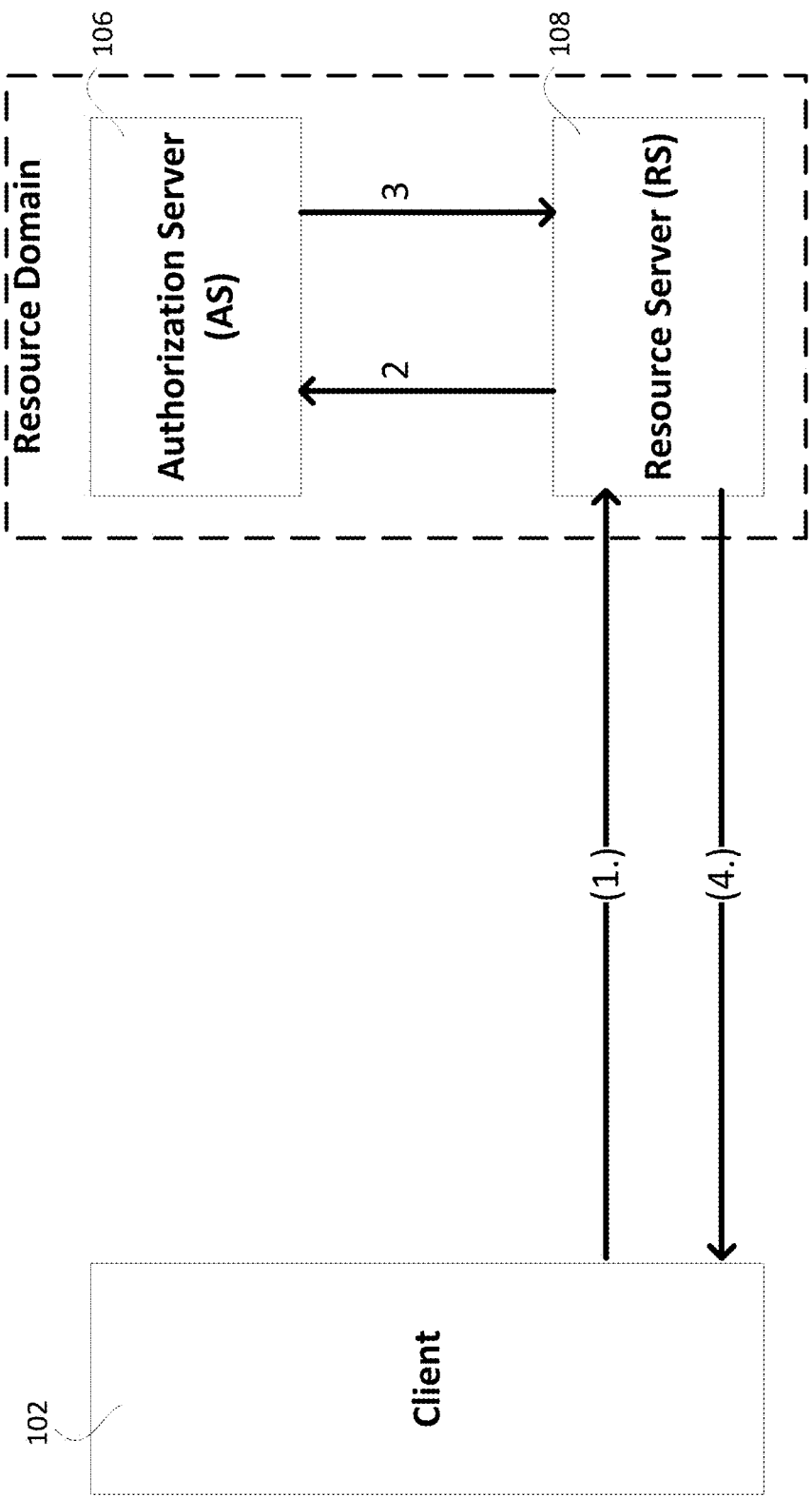
FIG. 3 is a diagram that illustrates a PULL model.
Figure 4:
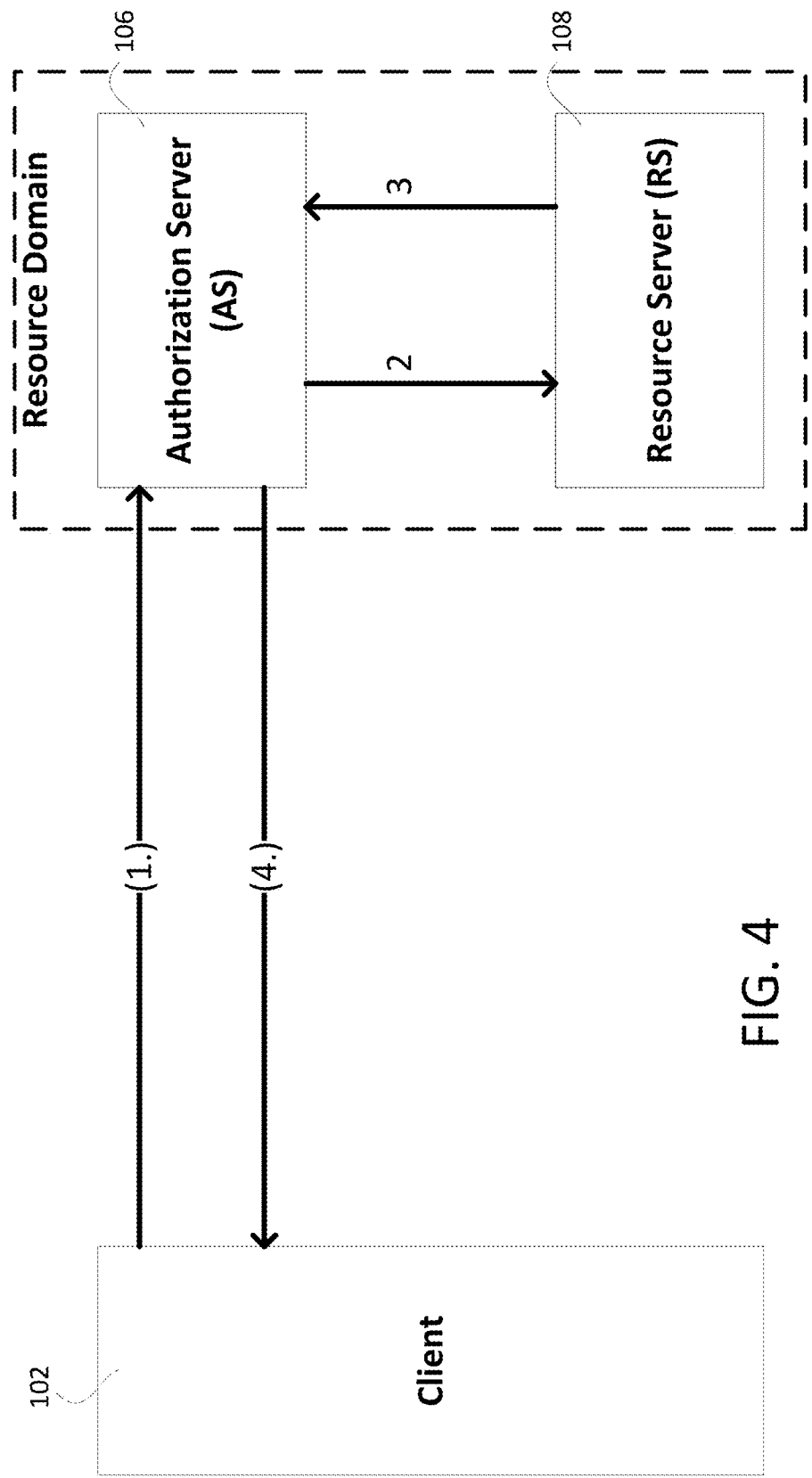
FIG. 4 is a diagram that illustrates an Agent model.
Figure 5:
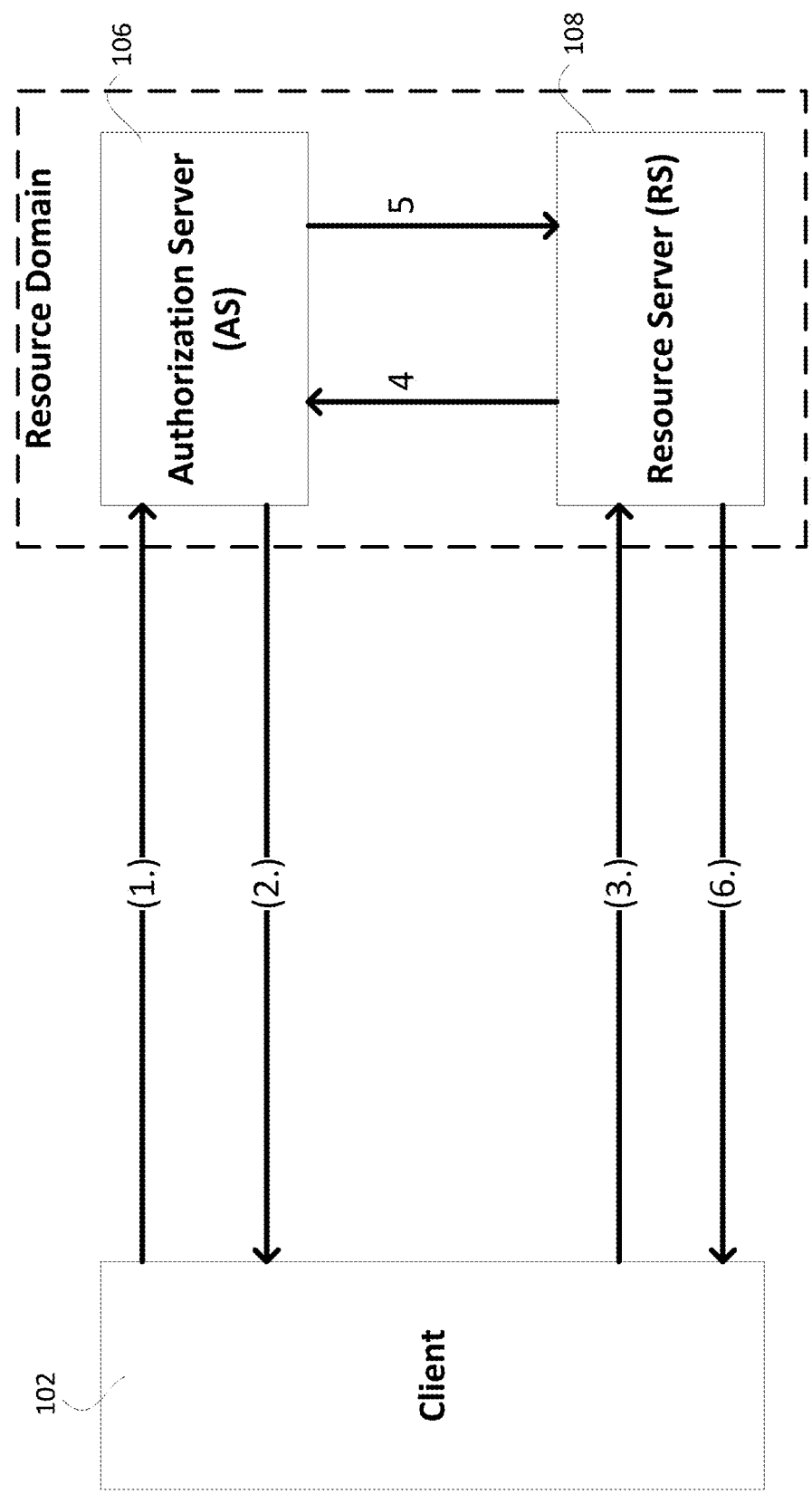
FIG. 5 is a diagram that illustrates a PUSH confirm model.
Figure 6:
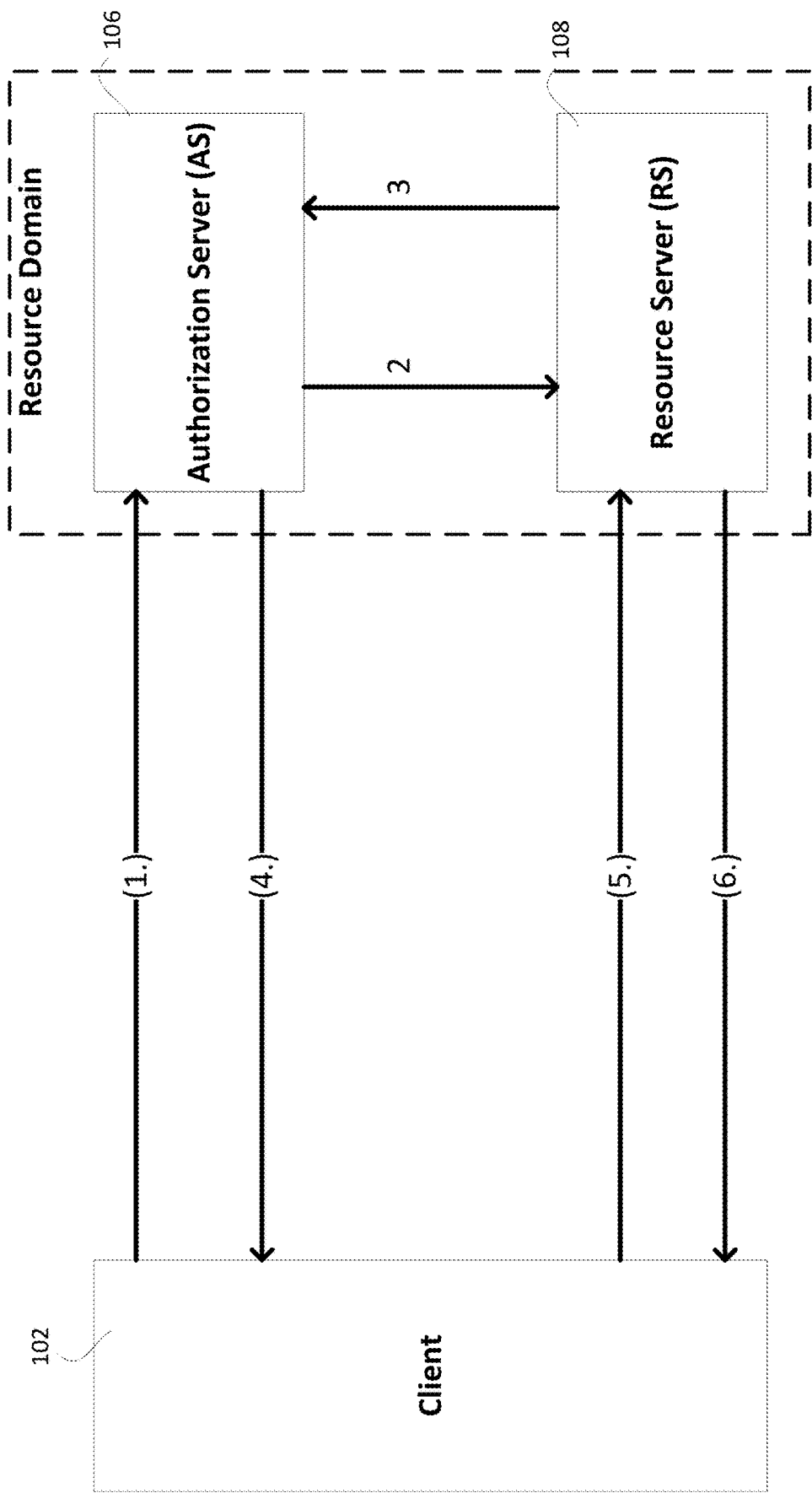
FIG. 6 is a diagram that illustrates an indirect PUSH model.
Figure 7:
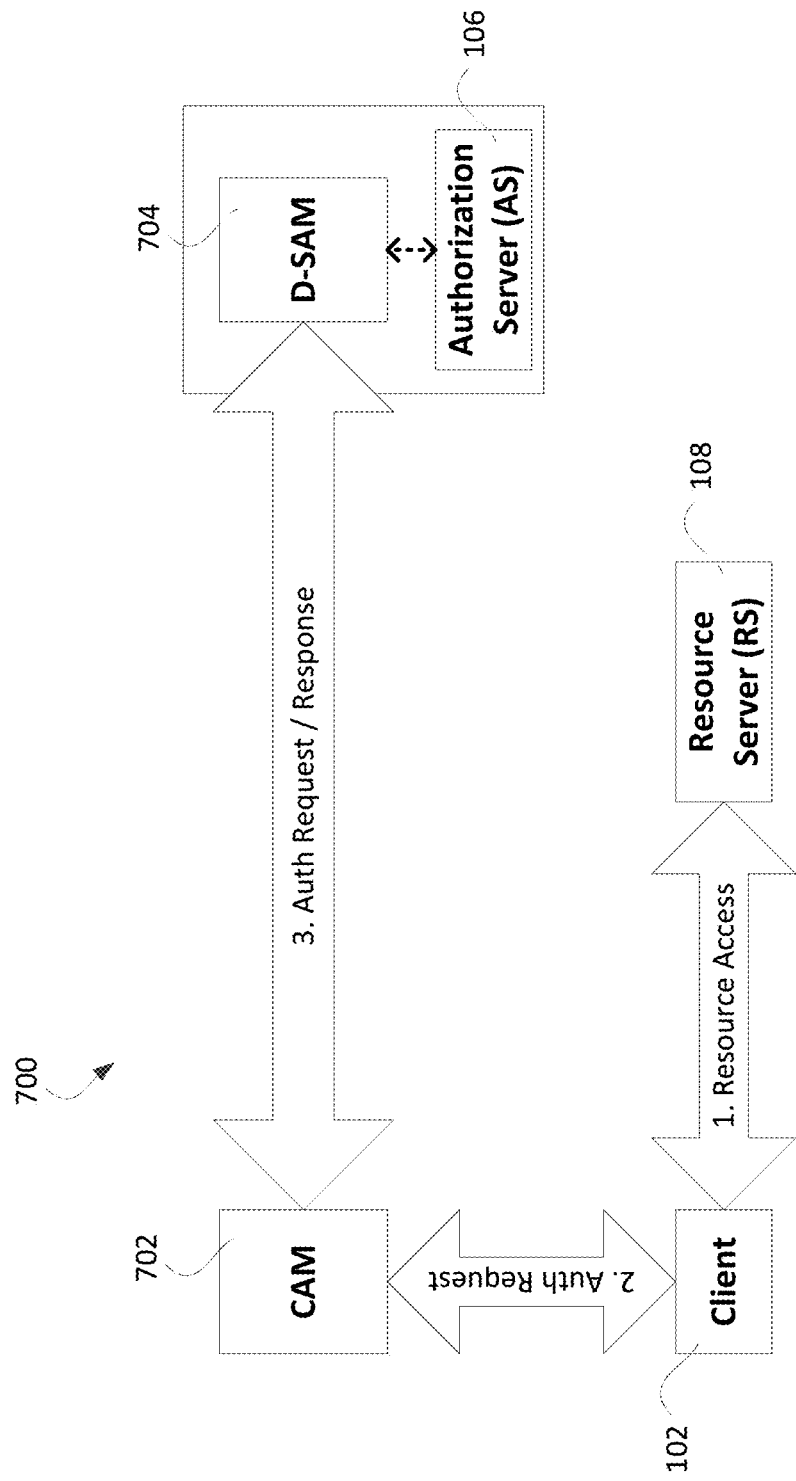
FIG. 7 is a diagram that illustrates a delegated Constrained Application Protocol (CoAP) Authorization Framework.
Figure 8:
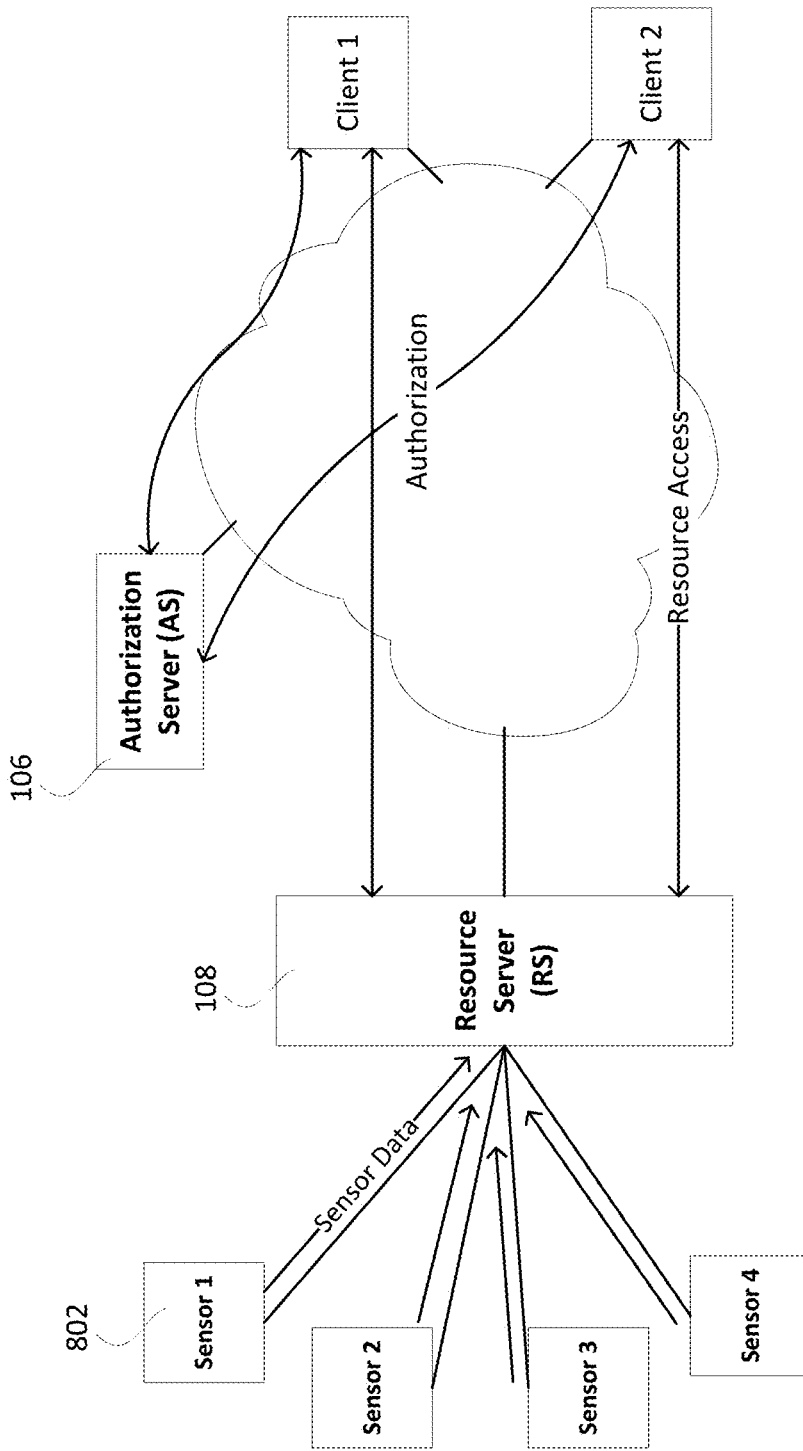
FIG. 8 is a diagram that illustrates resource access by means of a resource server.

Meghan would like to go for dinner and would like to park her car at parking garage that uses a valet service. At some point in the evening due to shortage of parking spots, the valet tries to optimize the parking space and would like to take out a car that is parked behind Meghan's car and let it out. Meghan has the ability to remotely open and start the car and therefore did not provide her car keys or access code with the valet. The valet tries to open her car by scanning the Quick Response (QR) code located on door handle. The QR code launches an application on the valet's device that directs the browser/application to a server that manages access control functions, which then triggers a notification to Meghan's smart phone. Meghan may or may not see the notification, if Meghan sees the notification then she triggers an authorization process, wherein, valet is requested to perform an authentication/authorization with an Authorization Server. If Meghan does not see the notification, then a more elaborate process of authentication and assessment of the valet, valet's device, location information etc. . . . are carried out. If all the checks pass, the valet is provided with an Authorization Token (AT) by the AS 106. Illustrated in FIG. 8, is conceptual view of the scenario, where, the RS 108 is located on the car, the valet is represented as the Client/Client application and the AS 106 is an entity that can vouch for the authenticity of the valet. The application on the valet's device presents the AT to the RS 108 that is located on the car. The RS 108 verifies the AT and then unlocks and starts the car. An application on the car may upload the odometer reading as well as video from the car on to a server. The AT has a valid lifetime after which the car's engine would shutdown and self-lock the doors. The AT may only be processed by the RS 108 if all the context information matches the access request. Meghan gets a notification once the car has been parked and switched-off and an indication of odometer reading as well as link to the video stored on a server. Current mechanisms do not provide for:

Ability for a resource owner (e.g. Meghan) to define a security profile associated with a resource;

Ability for the valet to discover the security requirements associated with the resource that is being accessed;

Ability for a Client to obtain the detailed security mechanisms that is expected to be performed in order to be able to access a resource. E.g. Location of Authentication/Authorization Server Ability for a Client which may not have a prior relationship with a resource owner to obtain a resource in a seamless manner, without administrator involvement.

It is understood that the functionality illustrated in FIG. 8, may be implemented in the form of software (i.e., computer-executable instructions) stored in a memory of, and executing on a processor of, a wireless device or other apparatus (e.g., a server, gateway, device, or other computer system), such as one of those illustrated in FIG. 31C or 31D described below. It is also understood that the functionality illustrated in FIG. 8 may implemented as a set of virtualized network functions. The network functions may not necessarily communicate directly, rather, they may communicate via forwarding or routing function.

Use Case 2

Figure 9:
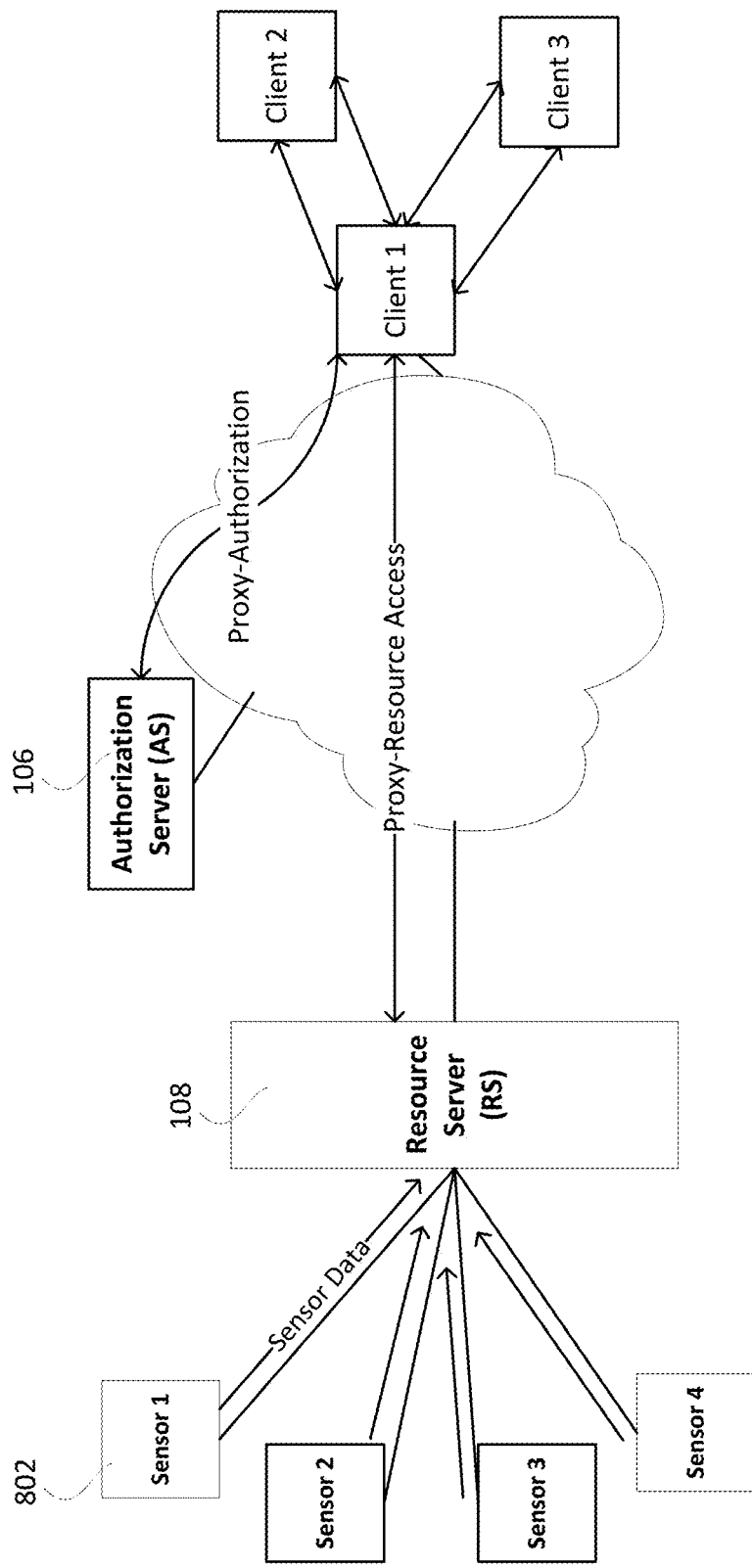
FIG. 9 is a diagram depicting proxy-authentication and proxy-retrieval.

A fire at a building, causes the fire department to send their fire-fighters to the building. A conceptual scenario for this use case is illustrated in FIG. 9. The Fire Chief initiates an access authorization request to the enter a "restricted access area" of the building since he is not authorized to access the restricted area in normal times. The restricted area itself is not affected by the fire, however, works as the control center for the building and requires very strong access control procedures. In order to provide for speedy action but at the same time maintaining the security requirements associated with the resource (here it is the "restricted access area'), the fire chief may want only a core group of his team to be able to enter the area but at the same time would like the access procedures to be performed quickly. In addition, the group members may have devices that may be constrained. The fire chief requests a Proxy-Authorization request using a list of group members that is pulled from a locally stored file within the chief's device and is sent to the RS 108. The list includes information on the group members and the device id (e.g. Internet Protocol (IP) address) and optionally a unique application id that is requesting access to the resource. Since the access requested is to a resource that is considered to be a high-security asset, the chief may be required to provide a high-level of assurance of his authenticity and is required to provide multi-factor authentication (e.g. finger-print authentication using sensor 108 on his smartphone and verification of the smartphone itself by means of Subscriber Identity Module (SIM) or device certificate etc.). An Authorization Server (AS) that is mutually trusted by the building owner/management and the fire department authorizes the fire chief and issues tokens to him (to the application on his device) as well as his team. Each token has a unique id and has restrictions on the duration that the authorizations may be valid. Once the tokens become invalid, the Clients cannot use them to access the "restricted-area" as well as assets located within the area. Context information such as severity of the fire, number of Clients present, location information, asset value etc. may be used in determining the number and validity of the tokens.

A slightly varied use case, may involve a Proxy-Authorization as well as Proxy-Resource Access (Proxy-Retrieval) process, wherein only a single token is issued to the fire chief, but he is allowed to share it with a finite number of Clients as determined by the AS 106 taking into account the policies, the asset value, trustworthiness of the fire chief, his device etc. This use case may be applicable particularly when Client devices may be constrained or a scenario involving a constrained RS 108. The messaging and the processing requirements at the Client and at the RS 108 may be greatly reduced.

Current mechanisms do not provide for:

The ability for the fire chief's application or device to be able perform a Proxy-Authorization on behalf of his group: Reduces processing and messaging from a Client-perspective and therefore may be suitable for constrained Clients.

The ability for the fire chief's application or device to perform a Proxy-Retrieval on behalf of his group members: Reduces processing and messaging at the Client and the RS 108 and therefore suitable for constrained RS 108 and Clients.

Ability for the chief's device or application to discover that an AS 106 provides mechanisms to perform Proxy-Authorization Ability for the chief's device or application to discover if a resource may be accessed using Proxy-Retrieval In certain other scenarios, a resource may be purchased (authentication may be optional) and shared between family members' devices. In such cases, the resource (asset) may be accessed by each family member using a shared token or separate and unique tokens. Current mechanisms do not provide for:

The ability to purchase a resource and integrate it as part of the Authorization Framework.

Ability to perform purchases anonymously thus preserving privacy. Some resource owners may only be interested in a monetary benefit and therefore may not be concerned about identification/authentication.

The short-comings of the current access control and authorization mechanisms are that they assume a certain fixed and centrally controlled access control system that are controlled and accessed using non-constrained devices. However, with IoT, the access control systems may be distributed and controlled by varied resource owners and at the same time the devices may be constrained. The resource owners may provide access to their resources and can monetize them in a more open manner without relying on a centralized and non-flexible access control procedures. In summary, the problems being addressed in this application include:

1. Access to a resource is centrally controlled with prior trust-relationship and therefore does not provide a mechanism for dynamic access as required within IoT systems, where pre-established trust relationships may not be present.
2. There exists piece-meal solutions for resource access catering to constrained entities, however, a completely developed dynamic authorization framework is absent.
3. Other features such as the ability to integrate payment and anonymity of transactions have not been taken into consideration when developing solutions for authorization.

A general and high-level approach to providing a complete dynamic authorization framework may include the ability to:

Obtain and classify the data from a security perspective;
Determine mechanisms that an entity may have to perform in order to achieve the security classification;
List/publish the data using a listing or directory service along with the associated security requirements/mechanisms;
A Client wishing to access the data uses the listing service to obtain information about the location of the resource (URI of the server hosting the resource), the security mechanisms that must be carried out in order to be able to access the resource;
Obtain the necessary authorizations (e.g. by means of token(s)) based on a plurality of assessment(s) of the Client 102, the Client's device, Client application, Client platform, support for security protocols, payment etc. from a trusted third-party;
Once the Client 102 has been authorized, the Client 102 presents the proof of authorization (tokens) to the resource hosting entity; and if the authorizations meet the security (optionally payment) requirements associated with the resource, the Client 102 is provided with access to the resource.

It is understood that the functionality illustrated in FIG. 9, may be implemented in the form of software (i.e., computer-executable instructions) stored in a memory of, and executing on a processor of, a wireless device or other apparatus (e.g., a server, gateway, device, or other computer system), such as one of those illustrated in FIG. 31C or 31D described below. It is also understood that the functionality illustrated in FIG. 9 may implemented as a set of virtualized network functions. The network functions may not necessarily communicate directly, rather, they may communicate via forwarding or routing function.

Figure 10:
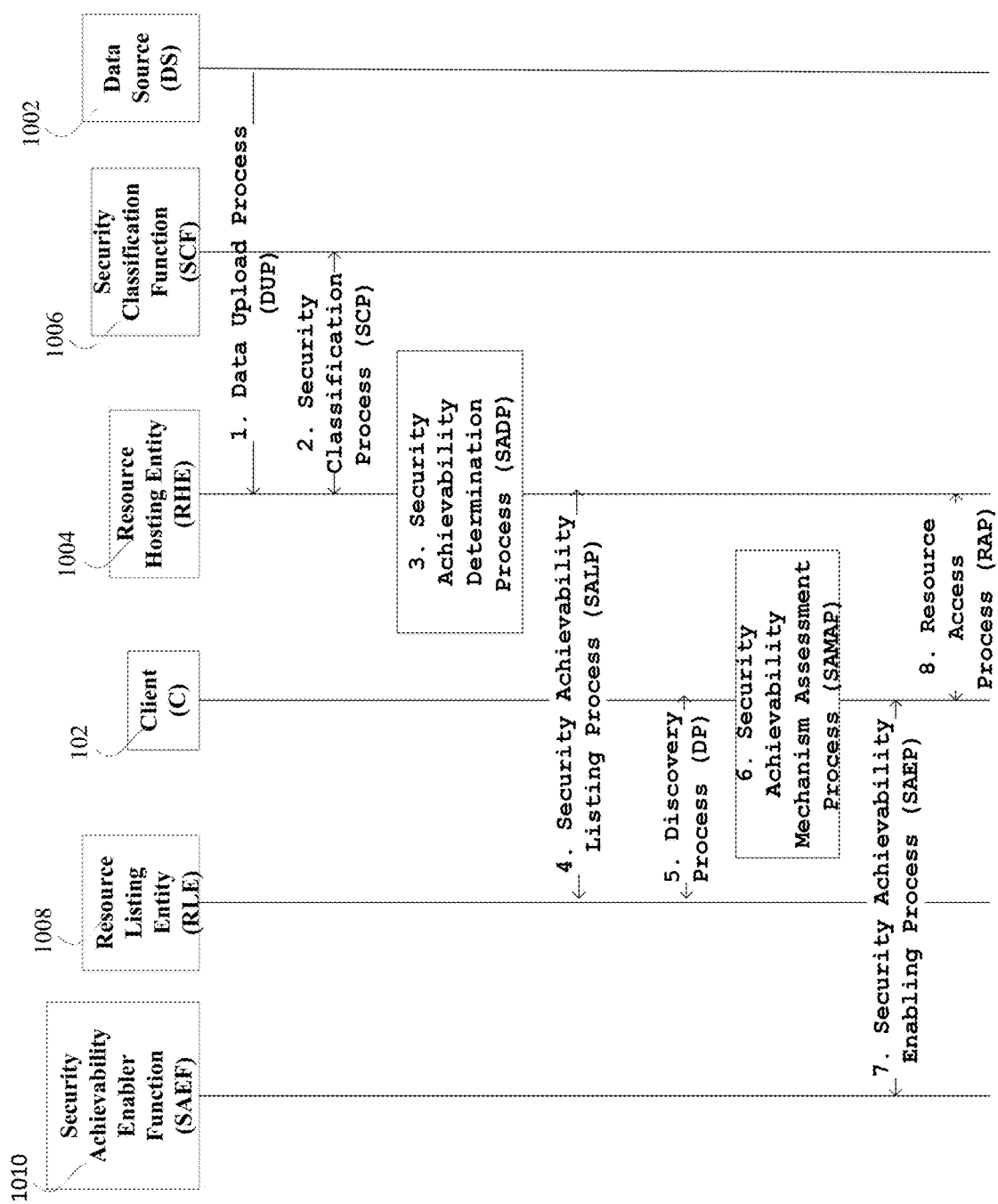
FIG. 10 is a diagram of a processes involved in providing capability for dynamic authorization.

The procedures may be classified into the following processes and interactions as depicted in FIG. 10. A list of relevant functions that may be software that resides on an entity along with other applications hosted on a User Equipment or on Server are listed below. These functions may reside on dedicated hardware entities and therefore throughout the application, the terminology function and entity may be used inter-changeably. Summary of the core functions/entities required for providing dynamic authorization is listed below.

Data Source (DS) 1002: The DS 1002 may be any source of data or information and may include sensors or an entity that collects sensor data, or any entity that is capable of creating information from raw data. Data may be in the rawest form (e.g. temperature reading, other sensor readings etc.) or may be raw-data with additional meta-data associated with it, or may be a collection of data. Data may also be certain Information that may have been extracted from raw data. Data or information may also be content such as machine executable content (e.g. computer program, binary code, executable machine/assembly code that may have been compiled or translated, computer program scripts), computer related configuration parameters, operational polices (e.g. security policies) or playable content (e.g. video, audio etc.), documents, xls sheet, or anything that may have a certain monetary, strategic (e.g. pertaining to national or company secrets), or intellectual value. From here on and for the rest of the document, data or information or content will be referred to generally as a Resource (R). An R may be identified by a globally Unique Resource Identifier (URI) or may be locally identifiable. The URI may provide a physical location of where the resource is hosted. Optionally, a resource may be associated with a unique digital certificate (Cert).

Client (C) 102: The Client 102 may be an application residing on user's device, application residing on a machine or a dedicated hardware or a cloud-based application. The Client 102 may also be part of a group of applications that work together within the platform or in a distributed manner. A Client 102, may or may not be controlled by a human being. A Client 102 generally initiates a request in order to access a resource. In the case, where a Client 102, is controlled and operated by a machine, the initiating to trigger a request is done by machine(s). A trigger for the Client 102 to send a request in order to access an R may be initiated by user/human or by machine(s) or other application(s) or by other Client(s) 102.

Resource Hosting Entity (RHE) 1004: A RHE 1004 hosts the resource and may preferably perform access control checks when a Client 102 wishes to access an R hosted on the RHE. The RHE may also be responsible for defining and describing security mechanisms in order that a Client 102 can be authorized to access an R. An RHE 1004 may be part of a server farm and distributed across globally, implemented on various server systems or using virtual machines. In an IoT scenario, it may be possible that the RHE 1004 is hosted on a constrained device. In a lot of cases, both the DS 1002 and the RHE 1004 may be hosted on the same entity. The RHE may also manage the resource identifier associated with a R and may also be responsible for providing a digital certificate associated with a resource in conjunction with a Certificate Authority (CA) that may be co-located and self-signed or using third-party CA services. A set of resources may alternatively share a single certificate provided the identities listed within the certificate can be verified.

Security Classification Function (SCF) 1006: The SCF 1006 may reside as part of the DS 1002 or the RHE 1004 or may be an independent security function residing on a trusted security services entity/domain. A trusted third-party may provide Security Classification as a Service (SCaaS). The role of the SCF 1006 is to assess a resource's security requirements and assign a Security Value (SV) or Security Class (SC) associated with that resource.

Resource Listing Entity (RLE) 1008: The RLE 1008 is where information regarding an R may be discoverable. The RLE 1008 is responsible for listing an R's location (e.g. URI). The listing may have multiple listings for the same R that may be accessible from different RHEs. Also, the R may be made up of sub-components. It may be possible that each sub-component is hosted on different RHEs. In addition, the security mechanisms required in order to be able to access an R is listed along with optionally a digital certificate associated with the R.

Security Achievability Enabling Function (SAEF) 1010: This function is responsible for enabling a Client 102 function to be able to achieve the requirements as specified within the Security Achievability Mechanism (SAM) and using the mechanisms described within it. The SAEF 1010 may belong to the same administrative domain as the RHE 1004 or may be a separate trusted third-party entity that provides Security as a Service (SaaS). The SAEF 1010 may possess the capability for providing Authentication, Authorization, Security Validation and testing services. The SAEF 1010 may optionally host a Payment Function (PF) 2108 or inter-work with a PF located in a different domain.

The processes involved in providing capability to perform Dynamic Authorization may be classified into the following processes (See FIG. 10):

Step 1 of FIG. 10—Data Upload Process (DUP): As part of the this process, Data collected from Data Sources (DS) 1002 such as sensor data are uploaded to a Resource Hosting Entity (RHE) 1004. The data that is uploaded may be raw data, information extracted from raw data or content. A secure communication channel using protocols such as the Transport Layer Security (TLS) or Datagram Transport Layer Security (DTLS) may be used to transfer the data onto the RHE 1004. It can be envisioned that in certain scenarios the RHE 1004 may be co-located with a DS 1002.

Step 2 of FIG. 10—Security Classification Process (SCP): The RHE 1004 on receiving the data may host the raw data or optionally creates a resource from the data, create metadata for the data or information based on the raw data. During the SCP, the RHE 1004 determines how the data/information must be handled from a security perspective. As a result of the classification process, a Security Value (SV)/Security Class (SC) is assigned to the data/information. The SV/SC may determine how the data has to be stored, transmitted and/or consumed from a security perspective. In addition, it may specify the platform (e.g. secure platform complying to trusted computing group (TCG) standards, implements a trusted platform module (TPM) for verifying platform integrity) on which the data may be consumed, with which entities, for how long (duration), location, whether the data (resource) is re-distributable, etc. The SCP may be carried out by a Security Classification Function (SCF) 1006. The SCF 1006 may reside as part of the RHE infrastructure/domain, within the same platform as the RHE 1004 or even reside at the DS 1002. When the SCF 1006 resides at the DS 1002 domain, then step 2 in FIG. 10 may be performed by the DS 1002 before DUP is carried out. Furthermore, if the SCP was carried out by the DS 1002, then during step 1, the DS 1002 uploads both the data as well as the SV/SC associated with the data onto the RHE 1004. As mentioned earlier, that the DS 1002, the SCF 1006 and the RHE 1004 functions may reside on the same entity, and in such cases, the steps 1 and 2 are performed as internal processes and communicated using inter-process communications between the various functionalities.

Step 3 of FIG. 10—Security Achievability Determination Process (SADP): Based on the SV/SC that has been assigned to the data, the RHE 1004 may initiate on its own or using a functionality that resides elsewhere (initiated by an administration and management process) the process of determining the Security Requirements and how the security requirements may be achieved. The RHE 1004 determines the detailed Security Mechanisms that may be required in order to meet the security requirements and thereby satisfying the SV/SC associated with the data. We define this detailed and granular security mechanisms as the Security Achievability Mechanism (SAM).

Step 4 of FIG. 10—Security Achievability Listing Process (SALP): During the SALP, the RHE 1004 uploads onto the Resource Listing Entity (RLE) 1008 the SAM and provides the location information (e.g. URI) of the data stored on the RHE 1004. It may be possible that in certain IoT implementations, that the RLE 1008 is co-hosted on the same entity as the RHE 1004. In such cases, the step 4 of FIG. 10 may be performed internally within an entity (node) using inter-process communications.

Step 5 of FIG. 10—Discovery Process (DP): As part of this process, a Client 102 wishing to discover a data may query a Resource Listing Entity (RLE) 1008. The RLE 1008 does not generally host any data/information but only lists a location of the resource along with the associated SAM. The RLE 1008 responds to a discovery request with a response containing the location of the data/resource of interest and also provides the SAM. The RLE 1008 may be distributed and may host the resource listings on multiple entities.

Step 6 of FIG. 10—SAM Assessment Process (SAMAP): During this process, a Client 102 evaluates the security mechanisms that must be carried out in order to meet the requirements/mechanisms defined by the SAM that was provided as part of the DP. The Client 102 determines the appropriate entities/functions with which it may have to communicate, the protocols to be used, downloaded etc., so that it complies with the requirements of the SAM. As an example, the Client 102 based on the SAM determines the authorization model (e.g. PUSH, PULL etc.) that is supported and accordingly selects an appropriate AS 106 that is mutually trustable (between the Client 102 and the RHE 1004). Also, the Client 102 may determine that it has to use DTLS and therefore may optionally download and install the latest version of DTLS. Another example is when a Client 102 determines that it is constrained, based on current battery resources and therefore selects a PULL model, if it is supported by the SAM. It is also possible that the Client 102 may select both a PULL model as well as a proxy-authentication and proxy-retrieval processes if supported by the SAM.

Step 7 of FIG. 10—Security Achievability Enabling Process (SAEP): Based on the SAM obtained from the RLE 1008, the Client 102 may be required to initiate Authentication, Authorization, Payment and obtain an assertion of secure behavior from a Security Achievability Enabler Function (SAEF) 1010, which may be a trusted third-party Function or Entity that performs authentication, authorization and/or payment functions.

Step 8 of FIG. 10—Resource Access Process (RAP): The Client 102 presents an assertion or token(s) that illustrates trustworthiness and/or payment information to the RHE 1004. The RHE 1004 verifies if the Client 102 has performed the security and/or payment mechanisms that meets the SAM and if so, authorizes access to the data based on terms and conditions that were agreed upon.

Figure 31A:
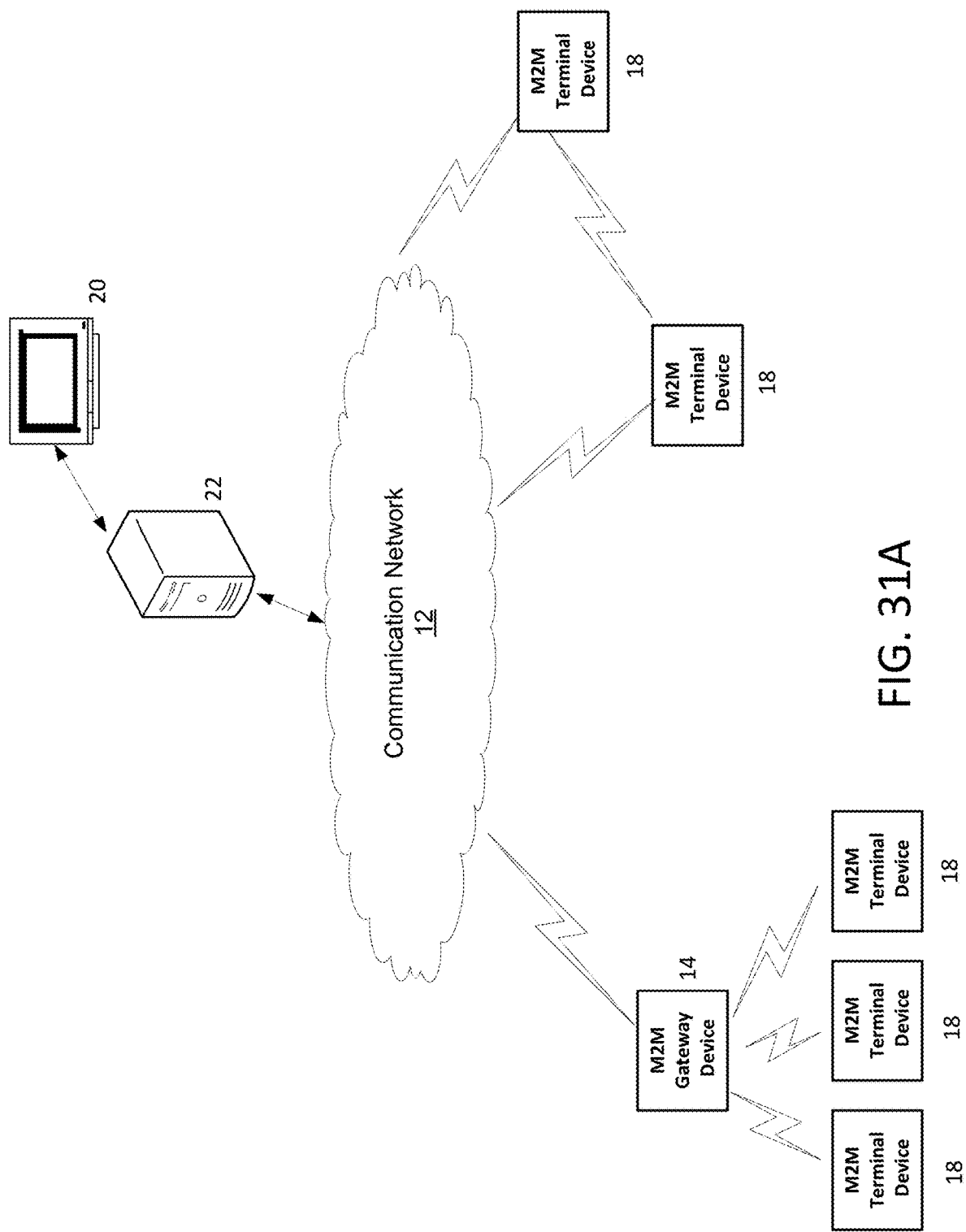
FIG. 31A is a diagram of an example machine-to machine (M2M) or Internet of Things (IoT) communication system in which one or more disclosed embodiments of IoT event management systems and methods may be implemented.
Figure 31B:
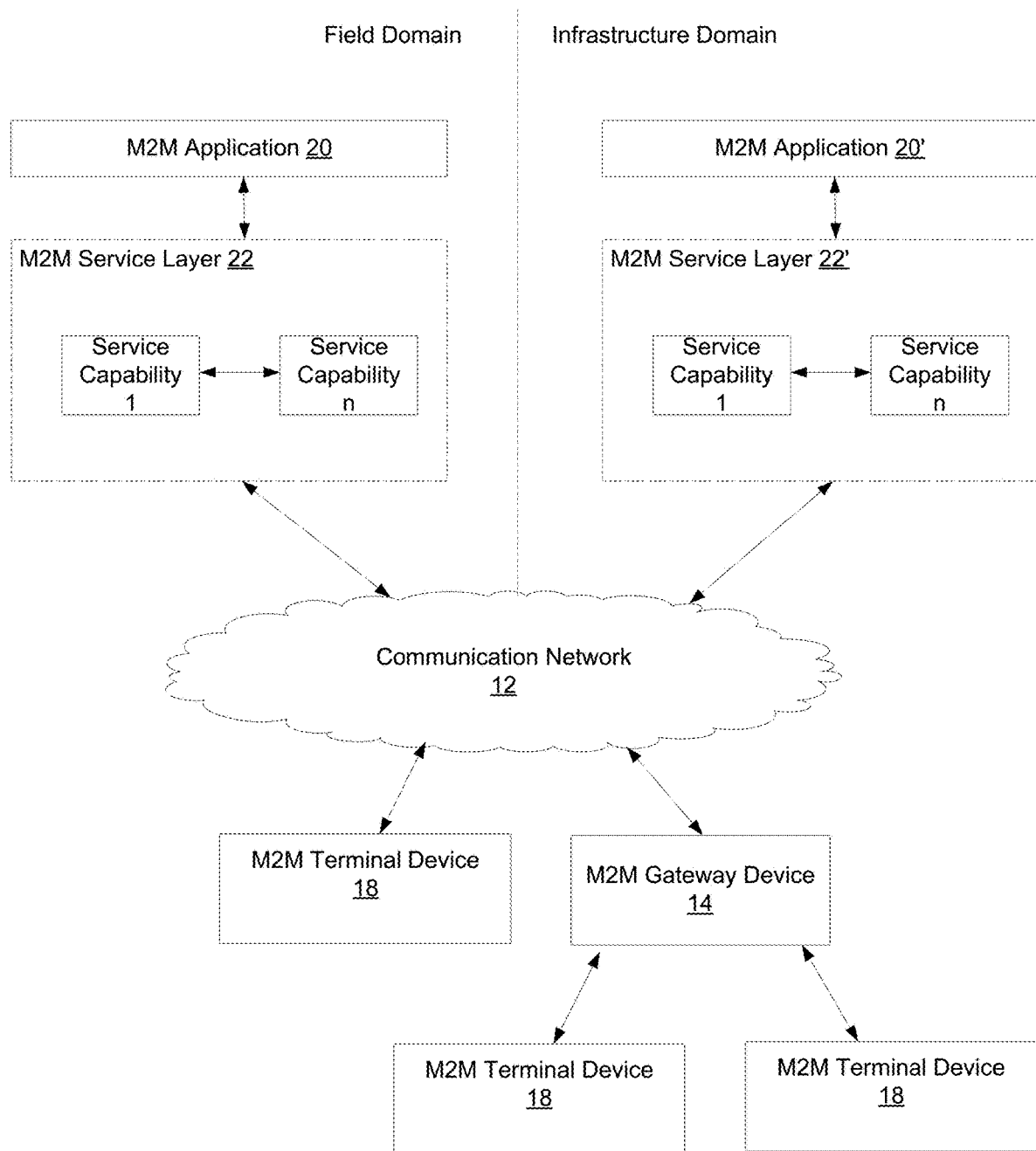
FIG. 31B is a system diagram of an example architecture that may be used within the M2M/IoT communications system illustrated in FIG. 31A.
Figure 31C:
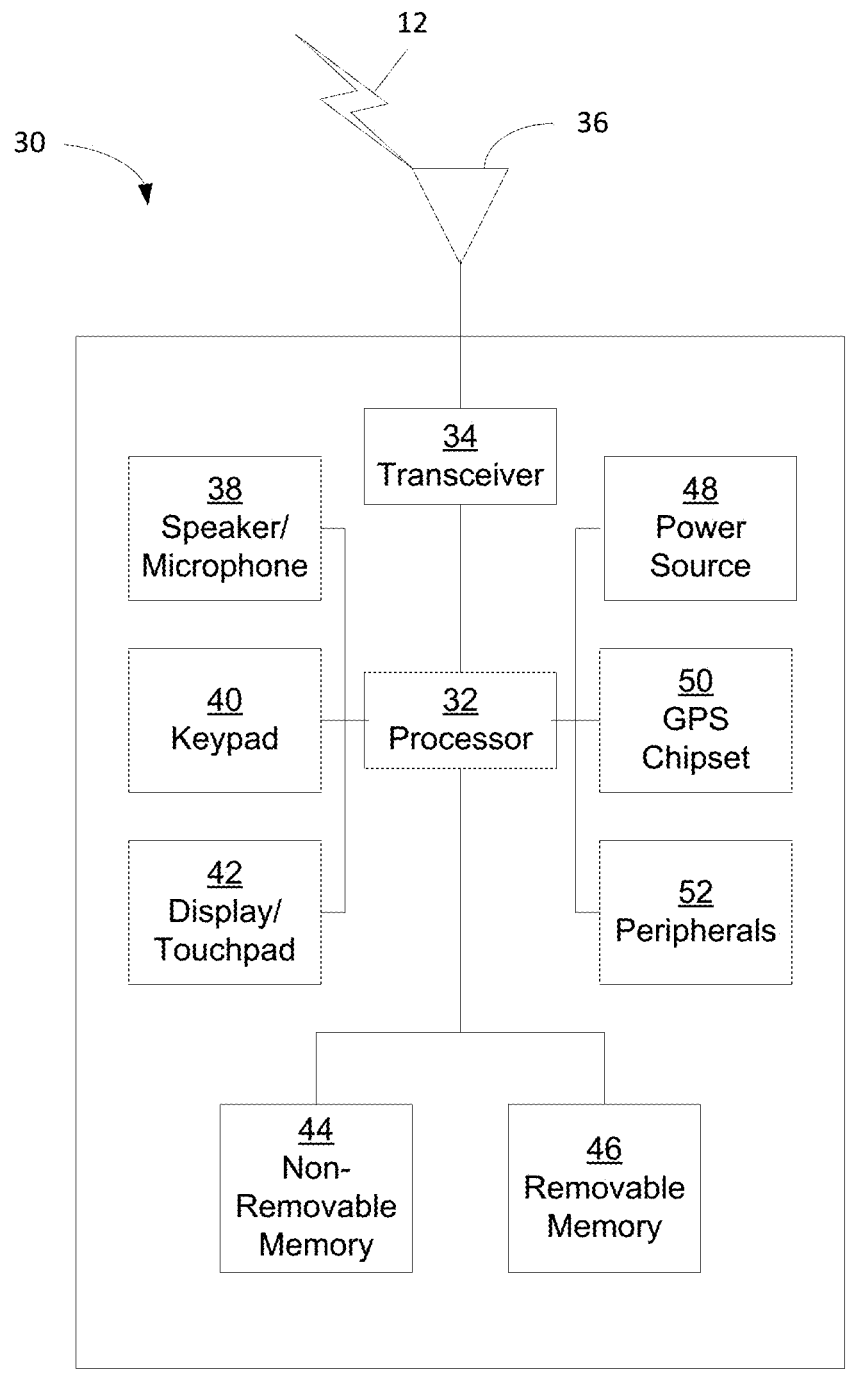
FIG. 31C is a system diagram of an example M2M/IoT terminal or gateway device that may be used within the communications system illustrated in FIG. 31A.
Figure 31D:
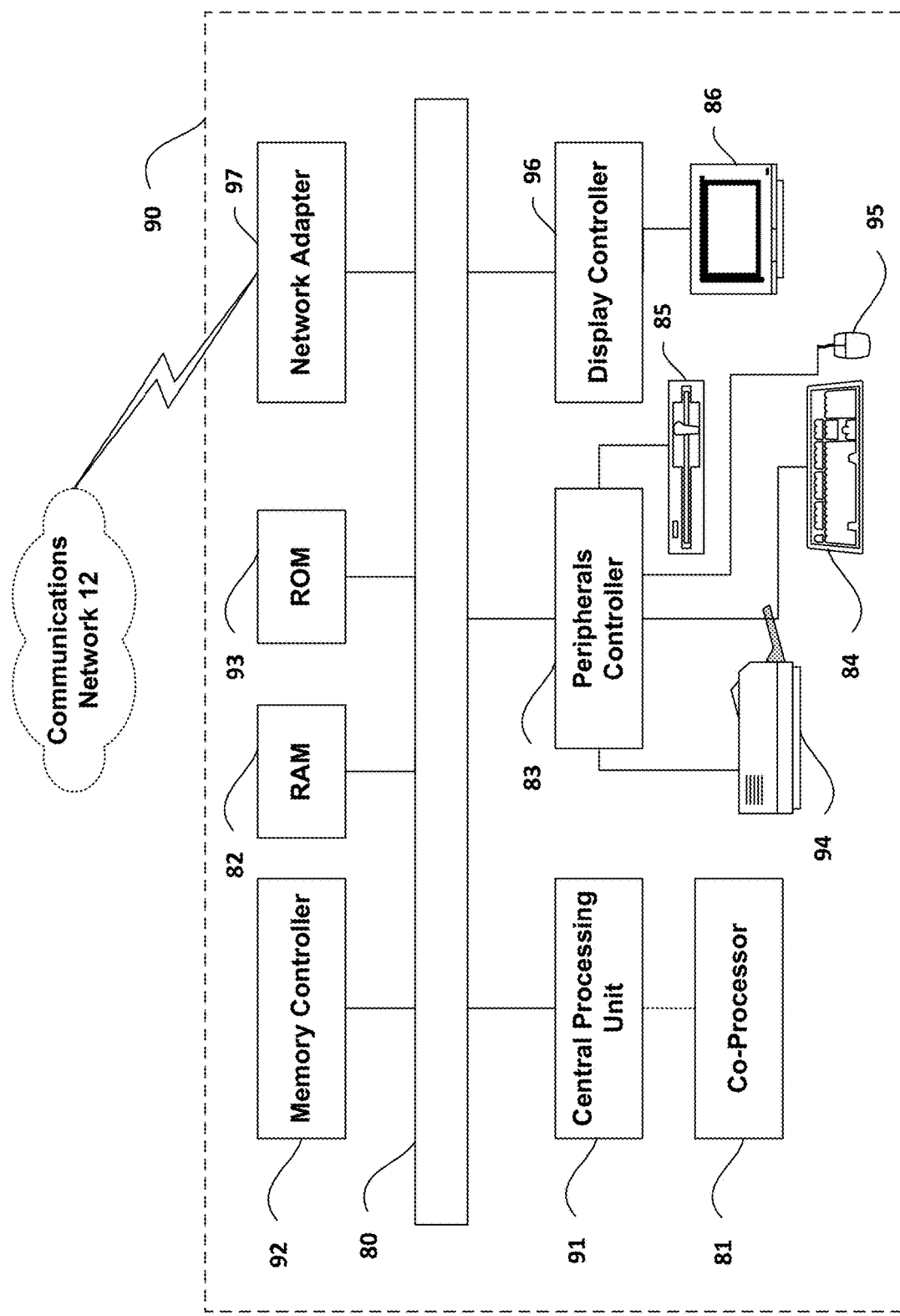
FIG. 31D is a block diagram of an example computing system in which aspects of the communication system of FIG. 31A may be embodied.

It is understood that the entities performing the steps illustrated in FIG. 10 may be logical entities that may be implemented in the form of software (i.e., computer-executable instructions) stored in a memory of, and executing on a processor of, an apparatus configured for wireless and/or network communications or a computer system such as those illustrated in FIG. 31C or FIG. 31D. That is, the method(s) illustrated in FIG. 10 may be implemented in the form of software (i.e., computer-executable instructions)

stored in a memory of an apparatus, such as the apparatus or computer system illustrated in FIG. 31C or FIG. 31D, which computer executable instructions, when executed by a processor of the apparatus, perform the steps illustrated in FIG. 10. It is also understood that the functionality illustrated in FIG. 10 may implemented as a set of virtualized network functions. The network functions may not necessarily communicate directly, rather, they may communicate via forwarding or routing function. It is also understood that any transmitting and receiving steps illustrated in FIG. 10 may be performed by communication circuitry of the apparatus under control of the processor of the apparatus and the computer-executable instructions (e.g., software) that it executes.

Data Upload Process (DUP):

Data collected from Data Sources (DS) 1002 such as sensor data are uploaded to a Resource Hosting Entity (RHE) 1004. The data that is uploaded may be raw data, information extracted from raw data or content. Data or information from other RHE 1004 may also be uploaded in order to provide for distributed access. A secure communication channel (e.g. TLS or DTLS) may be used to upload the data onto the RHE 1004. The DS 1002 may optionally classify a resource (data/content/information) before it is uploaded onto the RHE 1004 Security Classification Function (SCF) 1006.

Figure 11:
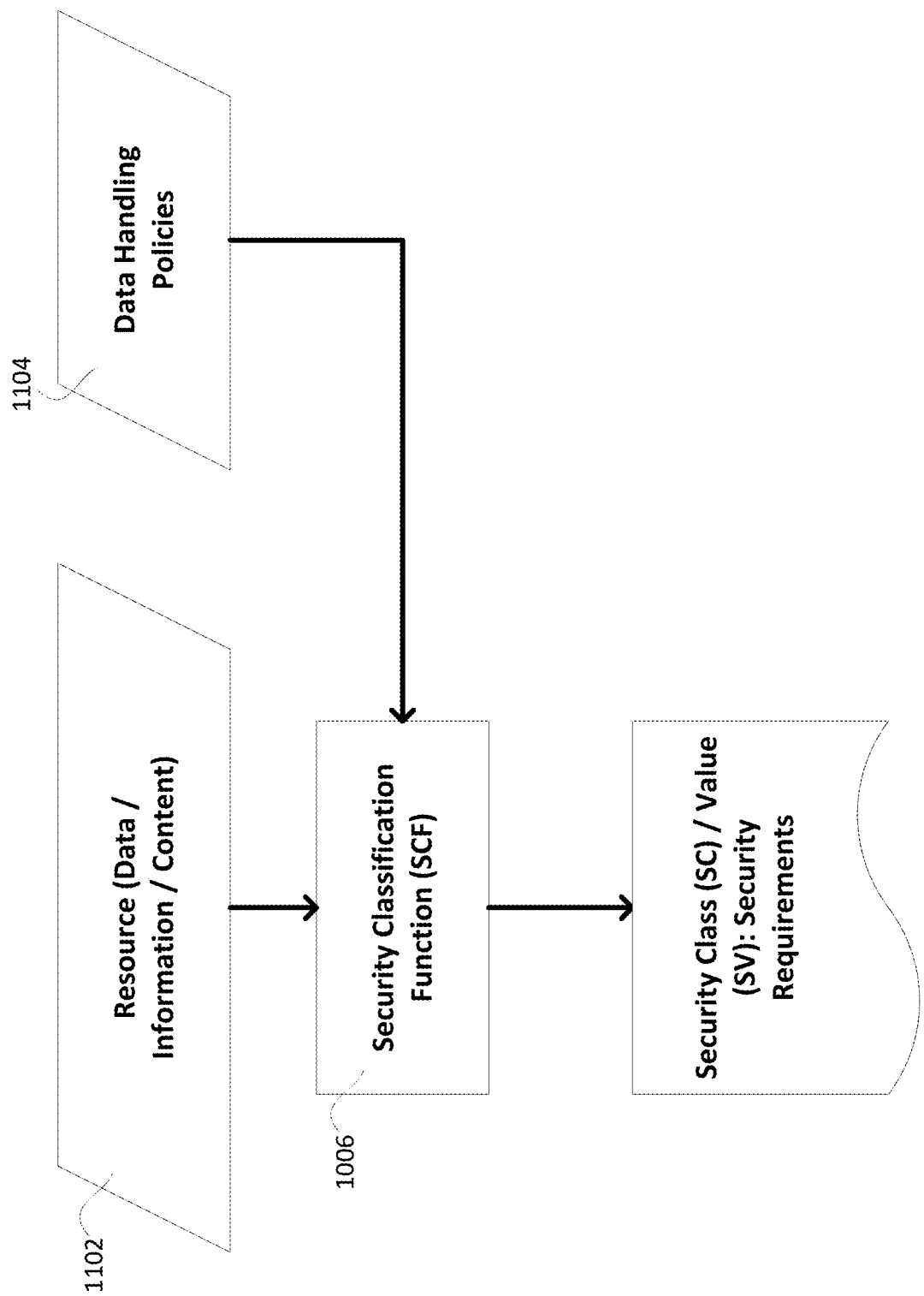
FIG. 11 is a diagram that illustrates a security classification process.

The SCF 1006 is responsible for determining an appropriate Security Value (SV) associated with an R 1102 or possibly classifying the R 1102 to a Security Class (SC). In most cases, the SC may depend upon the relative dollar amount associated with the R 1102 except in the case of national security, impact to reputation or other scenarios where it may be difficult to measure the security value or assess the indirect or longer-term security impacts of a breach of R 1102. The SV may be thought of as the impact (monetary, reputational, national security etc. . . . ) if there were a security attack on the resource R 1102. Examples of such security attack may be denying an authorized entity access to R in a timely manner, leaking of R to un-authorized entities, modification of R by un-authorized entities or other attacks. If seen from a different light, it is the proportional value (e.g. dollar amount) that must be spent in order to protect R from attacks related to confidentiality, integrity and availability. A less granular approach is to assign a certain SC that is associated to a resource. As an example, an R may have an associated SC=High, Medium or Low. The SC/SV may have an associated Security Requirements (SR) that must be achieved for any Client 102 that wishes to access the resource. Based upon the type of operations that a Client 102 wishes to perform on R, the SV/SC associated with R may translate to very granular set of security requirements that may be required in order to protect the resource. As illustrated in FIG. 11, the R 1102 is classified based on data handling policies 1104, which may be general policies, as well as data-specific policies. E.g. of general data handling policies would entail: Any data originating from an unknown commercial source may be classified as "low" whereas as the same type of data originating from a government entity may be considered as "medium" or "high". Data-specific policies is determined by the type of data (e.g. family's personal information).

It is understood that the functionality illustrated in FIG. 11, may be implemented in the form of software (i.e., computer-executable instructions) stored in a memory of, and executing on a processor of, a wireless device or other apparatus (e.g., a server, gateway, device, or other computer system), such as one of those illustrated in FIG. 31C or 31D described below. It is also understood that the functionality illustrated in FIG. 11 may implemented as a set of virtualized network functions. The network functions may not necessarily communicate directly, rather, they may communicate via forwarding or routing function.

Table 3 depicts an example SC.

TABLE 3

Example Security Class table

| Security Class | Authentication | Confidentiality | Integrity | Platform |
|---|---|---|---|---|
| Low | Low | Low | Medium | None |
| Medium | Medium | Medium | High | Secure transport |
| High | High (multi-factor authentication) | High | Very High | Secure transport Secure Storage Validated Platform Use of Approved protocols Presence of Secure Element (SE)/ Trusted Execution Environment (TEE) Trusted Platform Module (TPM) |

Security Achievability Determination Process (SADP)

After a SC/SV has been determined and assigned and associated requirements has been determined, the RHE 1004 may initiate a Security Achievability Determination Process to determine the security mechanisms that must be carried out by a Client 102 in order to achieve the SV/SC (Security Requirements) that is associated with R. The RHE 1004 draws up a list of Security Achievability Mechanisms (SAM), which is used to authorize a Client 102. The SAM provides a meta-data of security requirements and associated mechanisms to protect R. Some of the mechanisms that a resource owner/RHE 1004 determines to be satisfied in order to access a resource may involve ensuring that a Client 102 has:

Paid for a resource

Belongs to list of authorized entities

Can become part of a list of authorized entities for certain amount of time based on authorization process Be part of a delegated authorized entities If an entity has been authorized, the operations may be limited by time, location, or the list of attributes associated with a resource that a Client 102 may be able to operate upon. The type of operations may involve retrieving a particular resource (e.g. number of people using the Bank of America Kiosk in Times Square). A Client 102 living in certain countries may not be able to access that resource. Another example would be the ability to have physical access to a "restricted-access area" within a building for a certain period, which is applicable to the use case 2 described earlier.

The SAM determined must ensure that they meet or exceed the SV/SC associated with a resource. The same applies for mechanisms such as delegated access/authentication that may be used in order to provide flexibility for a Client 102 to access a resource, must ensure that the SV/SC is met or exceeded. An example high-level summary of the SAM that may be drawn up by the RHE 1004 is provided below (the following list may not be an exhaustive list and other mechanisms may be added to the list).

Core Security Requirements:
  Security requirements in transit:
    Defines the supported protocols (e.g. OAUTH, SAML etc. . . . ), DTLS/TLS etc.
      Cryptography: cryptographic algorithms (encryption, authentication/integrity), key lengths to be used
      Requirements for Client authentication based on human involvement or machine
  Security at rest:
    Access Control: Authentication of entities trying to access R at rest
    Secure storage of resource: Encrypting and Integrity protecting R
    Presence of secure processing environment: Secure Element (SE), Trusted Execution Environment (TEE) or Trusted Platform Module (TPM)
  Options in order to offer flexibility;
    Capability to discover a mutually trustable Authentication/Authorization Server (AS)
    Capability to assert fulfillment of security functions in order that it meets the security requirements associated with a resource belonging to a certain SC or SV.
    Capability to assert fulfillment of payment towards access to a resource
    Ability for the resource to be accessed by multiple entities based on an access control function being performed in a delegated manner (Group scenario).
    Delegated/Proxy Authentication
    Delegated/Proxy Retrieval
    Ability to deal with multiple Resource Owners The SAM may be optionally digitally signed by the RHE 1004 using its private key or by any other entity/function that is considered a trusted third-party or using the resource generators' private key or alternatively, each R may have an associated private which is used for signing the SAM. The private keys may be associated with a public key based certificate (R_Cert) or may be raw public/private key pair, that is used for self-signing. An example SAM along with additional Payment and IoT-specific requirements is listed in Table 4. For the sake of simplicity and easy reading SAM attributes and values as well as Payment, Flexibility attributes and parameters are all listed together.

TABLE 4

SAM attributes and Payment Attributes associated with a resource or RHE

| Features Supported | Attributes | Values |
|---|---|---|
| Required Security Level | Overall SC/SV | Medium |
| | Authentication Level | Medium |
| | Integrity Level | High |
| | Confidentiality Level | Low |
| Client Security Capability (Hardware, Firmware, Kernel, OS, Protocols) | Trusted Execution Environment | NO |
| | Hardware Root-of-Trust: TPM/SE | YES |
| | Integrity Validation | YES |
| | Malware detection & Cleaning application | NO |
| | Minimum Requirement for Client Security Posture | LOW |
| | Device Credentials (e.g. Device Certificate) | YES |
| | Appropriate Configuration Parameters | xyz, abc.. |
| | Supported Security Protocols | OAUTH, SAML, DTLS |

TABLE 4-continued

SAM attributes and Payment Attributes associated with a resource or RHE

| Features Supported | Attributes | Values |
|---|---|---|
| Relationship with Trust-worth Entities | List of Trustworthy SAEF | google.com/SAEF |
| | List of Trustworthy Authentication Functions | google.com/auth.., facebook.com/auth.. |
| | List of Trustworthy Authorization Function | google.com/auth/.. |
| | List of Trustworthy Payment Functions | paypal.com |
| | List of Trustworthy Validation Function | intel.com/mcafee |
| Flexibility in Resource Access | List of supported Authorization Models | PUSH, PULL |
| | Flag for indicating support for Proxy-Authorization | YES |
| | Flag for indicating support for Proxy-Retrieval | YES |
| | Support for Anonymous Access | YES |
| IoT-specific Support | Indication of whether RHE is constrained | NO |
| | Indication of whether support for Constrained Clients | YES |
| Resource Access Restrictions | Multiple Accesses | Allowed |
| | Duration of Access | 1 day |
| | Cost of Resource | $50.00 |
| | Type of Payment | Bitcoins |
| | Geographical, Time-based, IP@ | N. America, Europe.. |

Security Achievability Listing Process (SALP)

The RHE 1004 publishes the location (e.g. URI) of where a Client 102 may be able to access R as well as the associated SAM onto an RLE 1008. The SAM may be published using different encoding formats (e.g. a JavaScript Object Notation (JSON) file, Constrained Binary Object Representation (CBOR)) along with the URI of the R. It is possible that the URI for R is published on a RLE 1008, while another URI points to SAM associated with the R located on a different RLE 1008.

Figure 12:
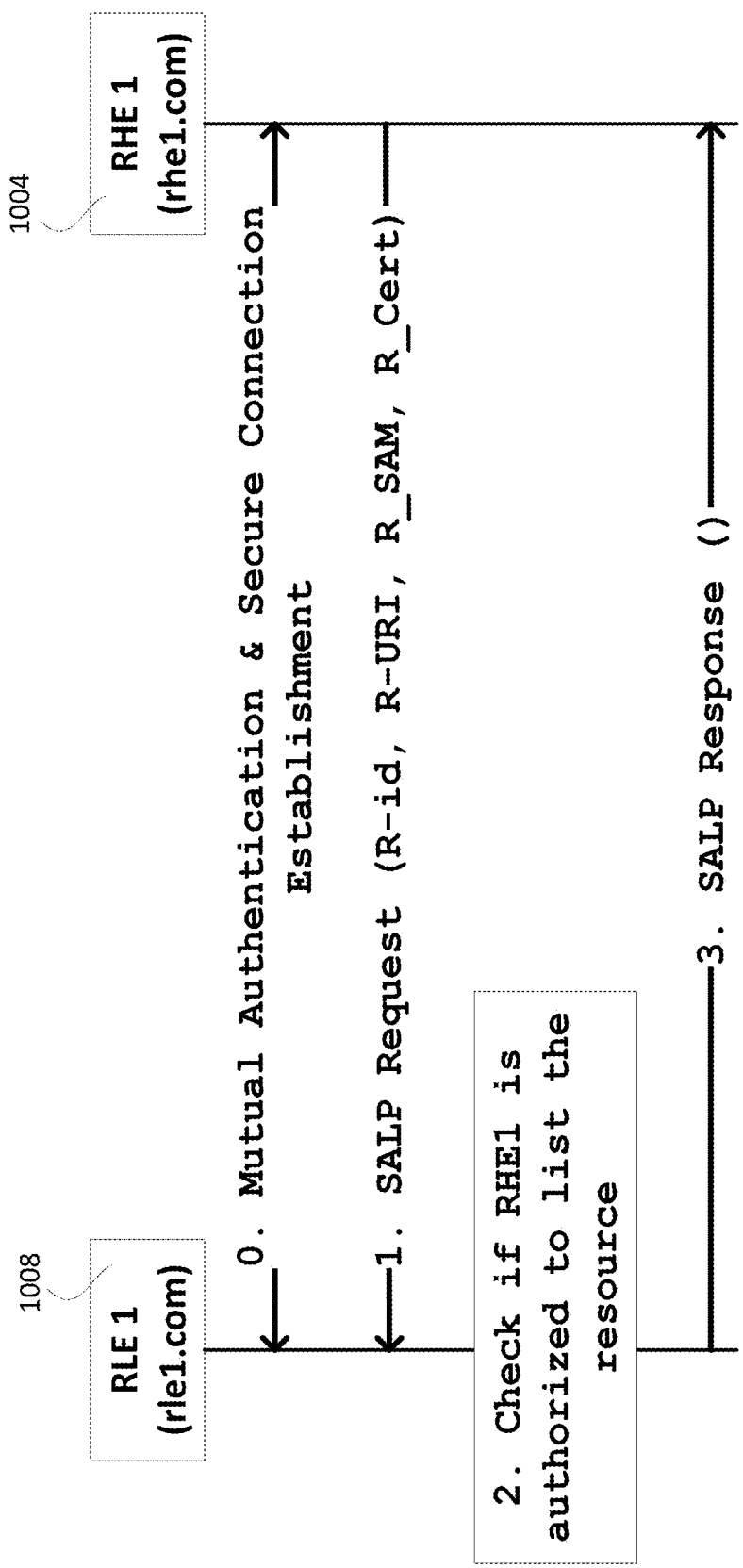
FIG. 12 is a diagram that illustrates a resource and security achievability publication process.

An example listing process is illustrated in FIG. 12. A RHE 1004 (rhe1.com) would like to publish and list an R with a RLE 1008 (rle1.com). The Steps are as follows:

In step 0 of FIG. 12, RLE 1008 and RHE 1004 perform a mutual authentication with one another and may optionally establish a secure connection with one another.

In step 1 of FIG. 12, the RHE 1004 then sends a SALP Request and provides an R-id, a unique identifier for the resource and an associated R-URI (location of the resource). In most cases, R-id=R-URI, but in cases where an R is hosted on multiple RHEs, then the R-id uniquely identifies an R, where the R-URI would be the location of where the R is hosted. In such cases, an R-id may have multiple instantiations of it stored at different R-URIs. The RHE 1004 also includes a R_SAM associated with the R and optionally an R_Cert that may be used to verify the authenticity of a R and/or the R_SAM. The R_Cert may be used by RLE 1008 in order to ensure that the R that is being requested to be listed has been created or obtained from a trusted source. Also, a Client 102 may at some point be able to verify the authenticity of R using the R_Cert. The R_SAM associated with R may also be optionally digitally signed using the R_Cert as well. This ensures that a malicious or non-malicious modification of R_SAM is detectable.

In step 2 of FIG. 12, the RLE1 1008, verifies if RHE1 is authorized to create a listing for the R and if so, a listing containing the R-id, R-URI, R_SAM and R_Cert may be created at the RLE1 1008.

In step 3 of FIG. 12, RLE1 1008 sends an ack back to RHE1 indicating success or failure.

It is understood that the entities performing the steps illustrated in FIG. 12 may be logical entities that may be implemented in the form of software (i.e., computer-executable instructions) stored in a memory of, and executing on a processor of, an apparatus configured for wireless and/or network communications or a computer system such as those illustrated in FIG. 31C or FIG. 31D. That is, the method(s) illustrated in FIG. 12 may be implemented in the form of software (i.e., computer-executable instructions) stored in a memory of an apparatus, such as the apparatus or computer system illustrated in FIG. 31C or FIG. 31D, which computer executable instructions, when executed by a processor of the apparatus, perform the steps illustrated in FIG. 12. It is also understood that the functionality illustrated in FIG. 12 may implemented as a set of virtualized network functions. The network functions may not necessarily communicate directly, rather, they may communicate via forwarding or routing function. It is also understood that any transmitting and receiving steps illustrated in FIG. 12 may be performed by communication circuitry of the apparatus under control of the processor of the apparatus and the computer-executable instructions (e.g., software) that it executes.

Figure 13:
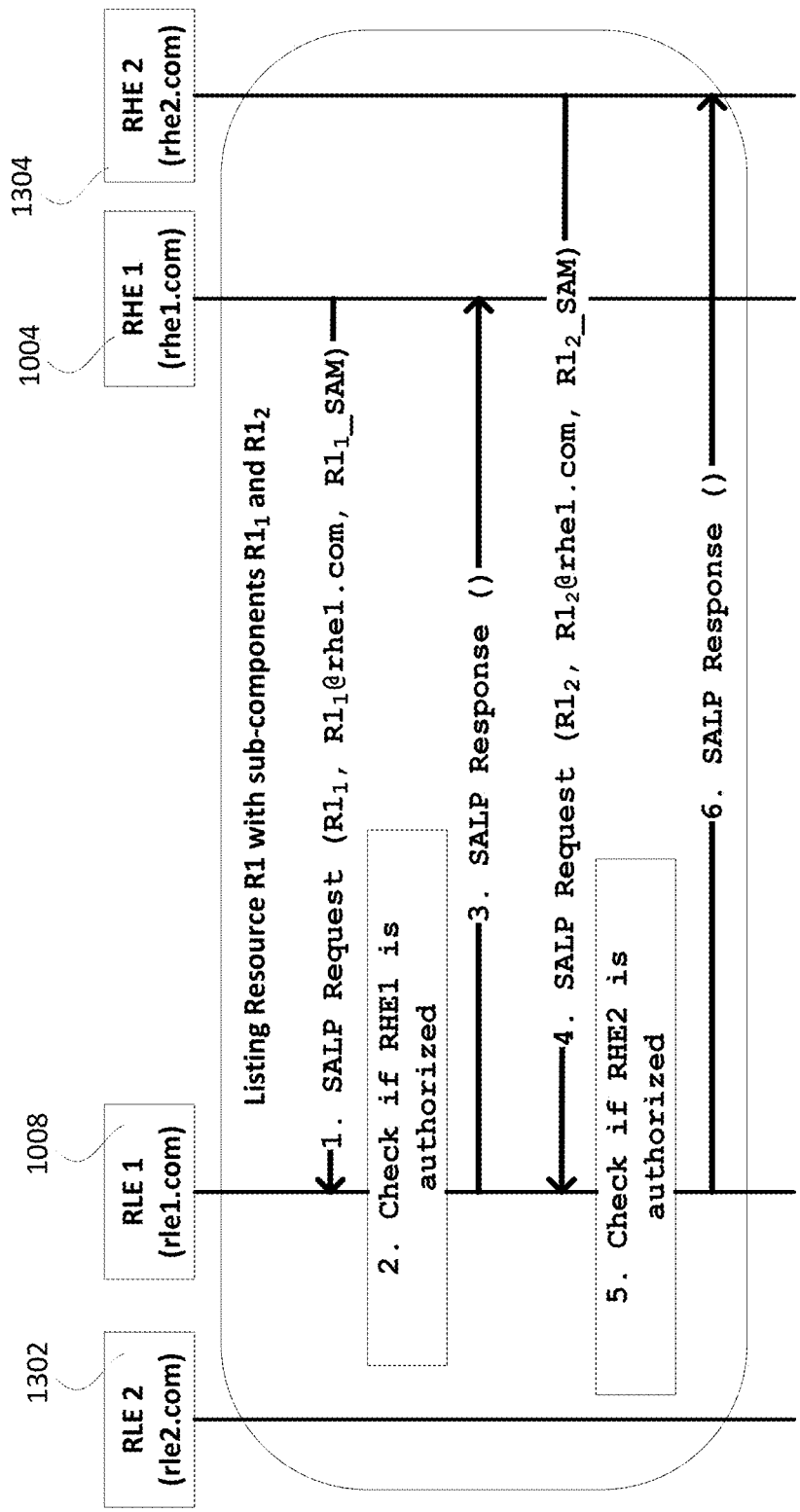
FIG. 13 is a diagram that depicts message exchange for listing of resources on to Resource Listing Entities (RLEs).

A more distributed resource hosting and listing mechanism is illustrated in FIG. 13. It illustrates possible options for listing of resources originating from different RHEs. The resource R1 has sub-components, $R1_1$ and $R1_2$, each with its own SAM info. The resources may be tied to one another but they have different security profiles. For example, $R1_2$ originates from a government facility and may have a higher security requirement than $R1_1$ and therefore the $R1_1$_SAM may be different than $R1_2$_SAM. It may be possible to have just a single R1_SAM that captures the higher of the two security requirements but in certain scenarios that may not provide flexibility. It is to be understood that all communications between RHE(s) and RLE(s) are protected for integrity and/or confidentiality (e.g. using TLS/DTLS mechanisms). Messaging steps are shown below.

In step 1 of FIG. 13, RHE1 sends a SALP Request to RLE1 1008 containing the resource sub-component id $R1_1$-id the location of where the resource is located: $R1_1$@rhe1.com, the associated SAM). It may also indicate explicitly that it is one of the sub-components.

In step 2 of FIG. 13, RLE1 1008 checks to see if RHE1 is authorized to perform listing request for $R1_1$ and if so, lists the resource and associated SAM.

In step 3 of FIG. 13, RLE1 1008 sends an SALP Response to RLE1 1008.

In step 4 of FIG. 13, RHE2 1304 sends a SALP Request to RLE1 1008 similar to message A containing the information relating to $R1_2$.

In step 5 of FIG. 13, Checks for Authorization of RHE2 1304 and may also check to see if $R1_1$ and $R1_2$ are to be web-linked and indexed appropriately.

In step 6 of FIG. 13, RLE1 1008 sends an SALP ack to RHE2 1304.

It is understood that the entities performing the steps illustrated in FIG. 13 may be logical entities that may be implemented in the form of software (i.e., computer-executable instructions) stored in a memory of, and executing on a processor of, an apparatus configured for wireless and/or network communications or a computer system such as those illustrated in FIG. 31C or FIG. 31D. That is, the method(s) illustrated in FIG. 13 may be implemented in the form of software (i.e., computer-executable instructions) stored in a memory of an apparatus, such as the apparatus or computer system illustrated in FIG. 31C or FIG. 31D, which computer executable instructions, when executed by a processor of the apparatus, perform the steps illustrated in FIG. 13. It is also understood that the functionality illustrated in FIG. 13 may implemented as a set of virtualized network functions. The network functions may not necessarily communicate directly, rather, they may communicate via forwarding or routing function. It is also understood that any transmitting and receiving steps illustrated in FIG. 13 may be performed by communication circuitry of the apparatus under control of the processor of the apparatus and the computer-executable instructions (e.g., software) that it executes.

Figure 14:
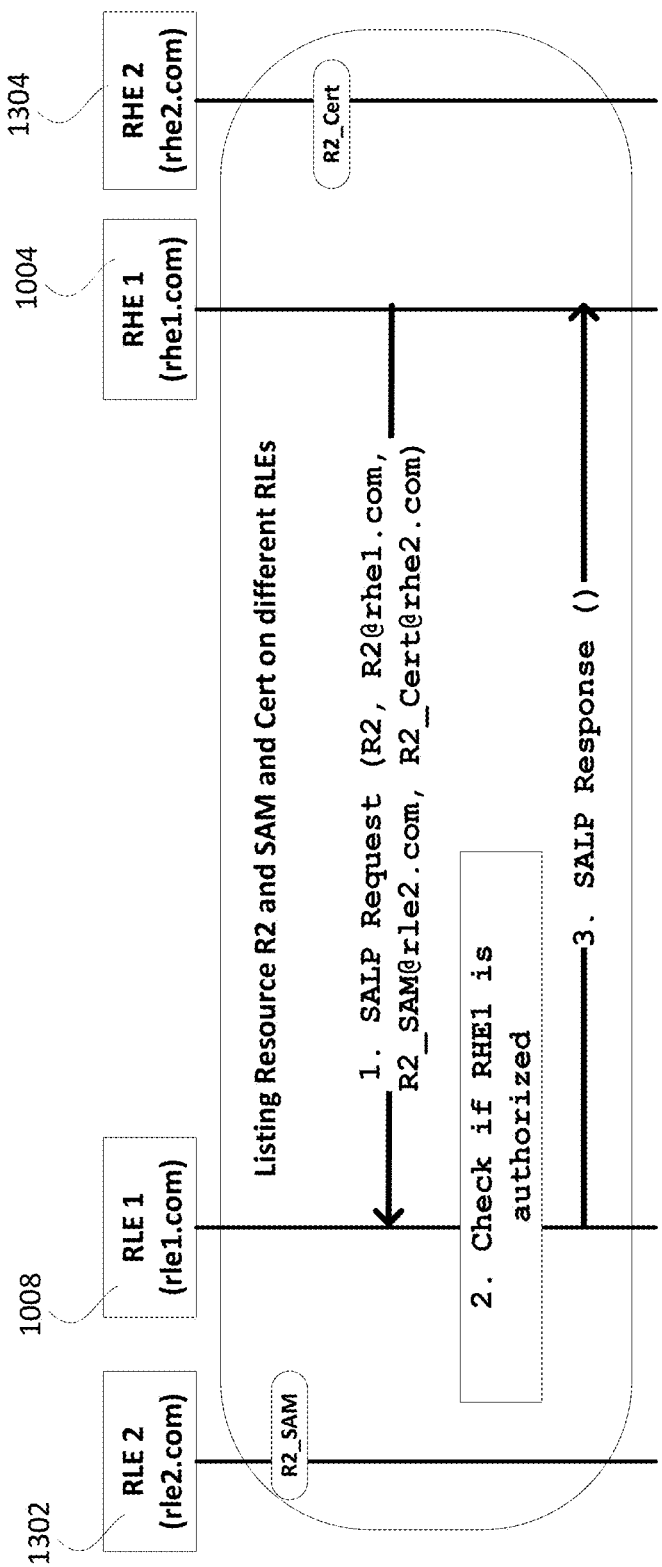
FIG. 14 is a diagram that illustrates resource and security listings published on different RLEs.

FIG. 14 depicts a scenario, wherein a resource is listed on RLE1 1008, while the SAM is stored on RLE2 1302, while the R2_Cert is stored on RHE2 1304. Such a scenario may occur when a SAM and Cert may be re-used for a class of resources, where the resource belonging to the same application class but has a different instantiation of it. Message details are provided below.

In step 1 of FIG. 14, the RHE1 sends a SALP Request to RLE1 1008 containing the resource id R2-id, the location of where the resource is located: R2@rhe1.com, the location where the R2_SAM and R2_Cert are located: R2_SAM@rle2.com and R2_Cert@rhe2.com respectively.

In step 2 of FIG. 14, the RLE1 1008 checks to see if RHE1 is authorized to perform listing request for R2 and if so, lists the resource and provides a location link to R2_SAM and R2_Cert which are located at rle2.com and rhe2.com respectively.

In step 3 of FIG. 14, the RLE1 1008 sends an SALP Response to RLE1 1008 indicating successful verification and listing.

It is understood that the entities performing the steps illustrated in FIG. 14 may be logical entities that may be implemented in the form of software (i.e., computer-executable instructions) stored in a memory of, and executing on a processor of, an apparatus configured for wireless and/or network communications or a computer system such as those illustrated in FIG. 31C or FIG. 31D. That is, the method(s) illustrated in FIG. 14 may be implemented in the form of software (i.e., computer-executable instructions) stored in a memory of an apparatus, such as the apparatus or computer system illustrated in FIG. 31C or FIG. 31D, which computer executable instructions, when executed by a processor of the apparatus, perform the steps illustrated in FIG. 14. It is also understood that the functionality illustrated in FIG. 14 may implemented as a set of virtualized network functions. The network functions may not necessarily communicate directly, rather, they may communicate via forwarding or routing function. It is also understood that any transmitting and receiving steps illustrated in FIG. 14 may be performed by communication circuitry of the apparatus under control of the processor of the apparatus and the computer-executable instructions (e.g., software) that it executes.

Figure 15:
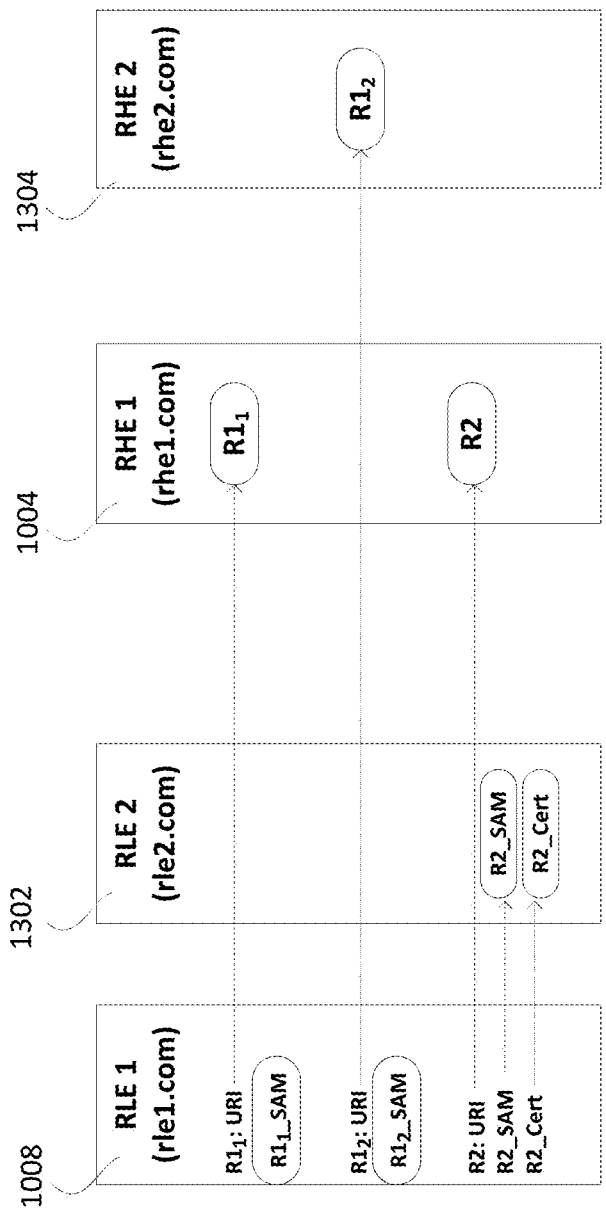
FIG. 15 is a diagram that illustrates published resource and Security Achievability Mechanism (SAM).

As a result of the listing process, the resources and associated SAM, Cert may be linked and hosted in a manner as illustrated in FIG. 15. A resource linking protocol such as the web-linking protocol specified in IETF-RFC 5988 may be used in order to associate resources together, similarly the web-linking protocol may be used to link together the resources and SAMs/Certs as well.

It is understood that the entities performing the steps illustrated in FIG. 15 may be logical entities that may be implemented in the form of software (i.e., computer-executable instructions) stored in a memory of, and executing on a processor of, an apparatus configured for wireless and/or network communications or a computer system such as those illustrated in FIG. 31C or FIG. 31D. That is, the method(s) illustrated in FIG. 15 may be implemented in the form of software (i.e., computer-executable instructions) stored in a memory of an apparatus, such as the apparatus or computer system illustrated in FIG. 31C or FIG. 31D, which computer executable instructions, when executed by a processor of the apparatus, perform the steps illustrated in FIG. 15. It is also understood that the functionality illustrated in FIG. 15 may implemented as a set of virtualized network functions. The network functions may not necessarily communicate directly, rather, they may communicate via forwarding or routing function. It is also understood that any transmitting and receiving steps illustrated in FIG. 15 may be performed by communication circuitry of the apparatus under control of the processor of the apparatus and the computer-executable instructions (e.g., software) that it executes.

Figure 16:
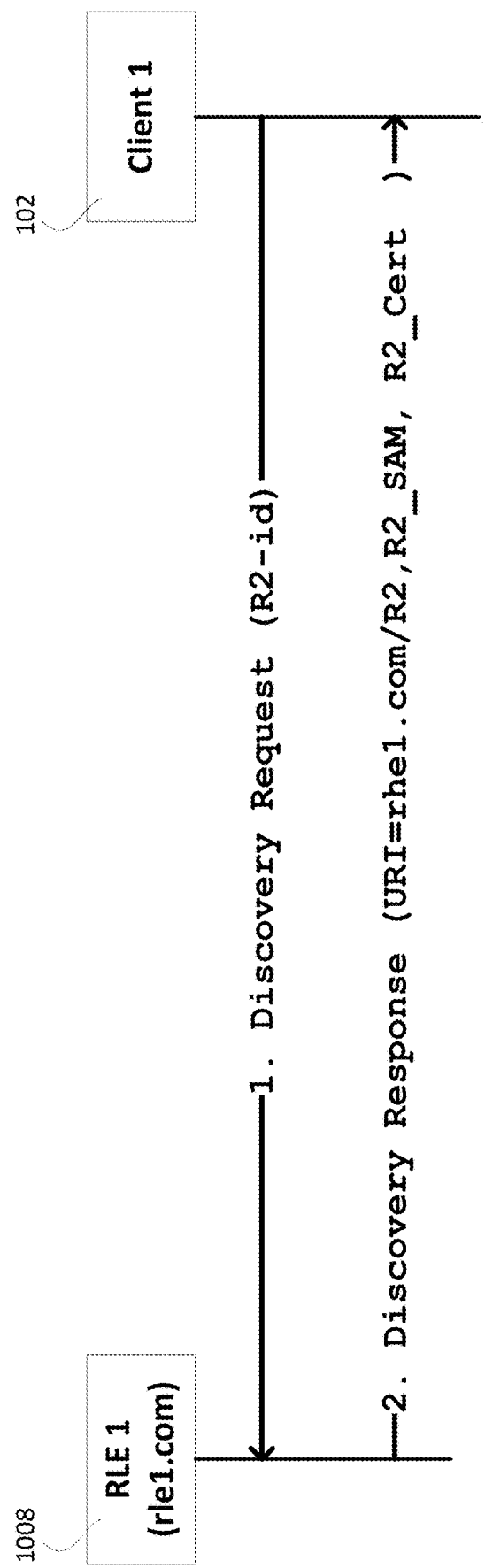
FIG. 16 is a diagram that illustrates simple resource discovery process.

An example table maintained at RLE1 1008 is shown below, illustrating the linking that may occur at RLE1 1008. An additional resource R3 has been added to illustrate that R3_Cert may be hosted on RHE as well. In some cases, the RHE may function as a certificate repository therefore all the resources may be stored on a RHE, while another RHE hosts the associated Certs and another RHE hosts the associated SAM. Based on the type of flexibility as well as scenarios wherein RS 108 or Clients may be constrained, listing models may vary. There may not be access control restriction if Client 102 would like to access the Cert. As an alternative, the SAM could be hosted on a secure RHE, where access control restrictions may apply. This may be the case in an enterprise or government controlled entities/functions. However, this may lead to a circular access control issues and probably adds overhead if not designed properly.

that is hosting the resource information and also knows the resource id (R2-id). Messaging details:

In step 1 of FIG. 16, Client 1 102 sends a Discovery Request containing the resource id (R2). As part of this request, the Client 102 may also explicitly request security parameters such as the SAM and/or the Cert associated with R2.

In step 2 of FIG. 16, the RLE 1008 may optionally perform an authorization check, in order to determine if Client 1 102 is a paid, subscribed or authorized Client based on location, time, Client id, etc. . . . . . RLE1 1008 responds with the URI of where the resource is hosted (rhe1.com/R2) and sends the R2_SAM associated with R2 and may optionally send R2_Cert.

It is understood that the entities performing the steps illustrated in FIG. 16 may be logical entities that may be implemented in the form of software (i.e., computer-executable instructions) stored in a memory of, and executing on a processor of, an apparatus configured for wireless and/or network communications or a computer system such as those illustrated in FIG. 31C or FIG. 31D. That is, the method(s) illustrated in FIG. 16 may be implemented in the form of software (i.e., computer-executable instructions) stored in a memory of an apparatus, such as the apparatus or computer system illustrated in FIG. 31C or FIG. 31D, which computer executable instructions, when executed by a processor of the apparatus, perform the steps illustrated in FIG. 16. It is also understood that the functionality illustrated in FIG. 16 may implemented as a set of virtualized network functions. The network functions may not necessarily communicate directly, rather, they may communicate via forwarding or routing function. It is also understood that any transmitting and receiving steps illustrated in FIG. 16 may be performed by communication circuitry of the apparatus under control of the processor of the apparatus and the computer-executable instructions (e.g., software) that it executes.

Figure 17:
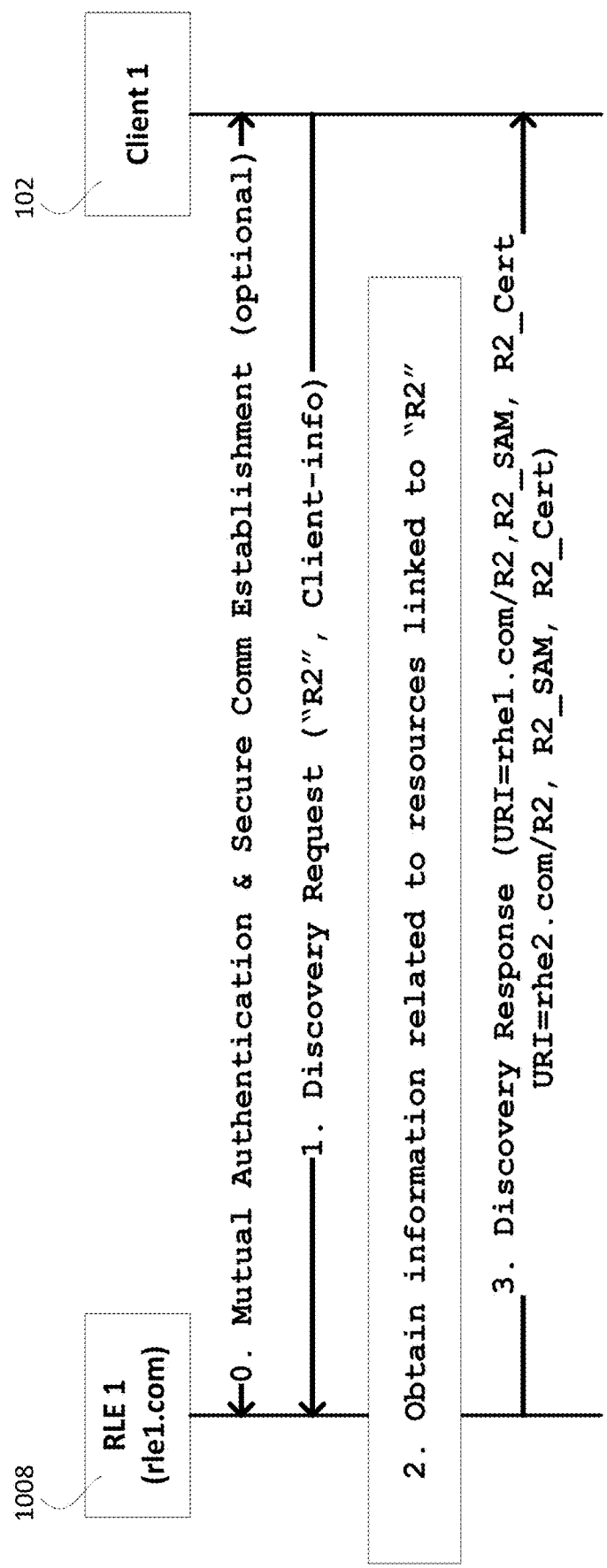
FIG. 17 is a diagram that illustrates discovery of a class of resource and client capability.

FIG. 17 illustrates a more sophisticated resource discovery process, where the Client provides the name of the resource, which may be a class of resource or in some cases a unique name. An example of such a resource name may be "temperature at Tokyo airport" or a more security sensitive resource such as "number of people visiting Bank of

TABLE 5

Resource linking with associated SAM at RLE1

| Resource | Resource sub-components | SAM | Certificate |
|---|---|---|---|
| R1 | R1$_1$: rhe1.com/R11/ . . . | R1$_1$_SAM.json | |
| | R1$_2$: rhe1.com/R12/ . . . | R1$_2$_SAM.json | |
| R2 | R2: rhe1.com/R2/ . . . | rle2.com/R2_SAM.json | rle2.com/R2_Cert |
| R3 | R3: rhe1.com/R3/ | rle2.com/R3_SAM.json | rhe2.com/R3_Cert |

Discovery Process (DP)

A Client 102 that wishes to discover resources may interact with a RLE 1008. A Client 102 may have previous knowledge of an RLE 1008 or perform a search for a resource which then directs the Client 102 to a RLE 1008. In other implementations, a QR code on a resource may be scanned by a Client 102 which then may direct the Client 102 to a RLE 1008. A client may use resource or service discovery process in order to obtain information about resource(s) and/or resource listing functions.

FIG. 16 illustrates a simple discovery process, where the Client 102 knows the RLE 1008 (e.g. URI of RLE1 1008)

America kiosk-Time Square" or even more security sensitive resource such as "temperature in Centrifuge 1". If an RLE 1008 does not have all the relevant information about a resource available with it, then the Client may be re-directed to the appropriate RLE 1008. Alternatively, the RLE 1008 may query another RLE and obtain the resource location and security parameters (SAM, Cert) associated with the resource. The Client may provide Client info to the RLE 1008, in order that the RLE 1008 can provide appropriate resource information based on capability of the Client (resource constrained or not). If a Client is deemed to be constrained then the RLE 1008 performs the resource discovery on its behalf by querying other RLEs.

In step 0 of FIG. 17, Client 1 and RLE1 1008 may mutually authenticate one another and optionally setup a secure communications channel between them. This step is optional and in some cases may be deferred till after step 1.

In step 1 of FIG. 17, Client 1 sends a Discovery Request containing the resource information "R2" or if the Client 1 has the resource id, then it may provide it as well. In addition, the Client 1 sends its Client-info. The Client-info may contain information about the capability of the Client such as computing capability, memory, battery restrictions, presence of SE, certificate of the Client, OS of the Client etc. . . . .

The RLE1 1008 performs authorization check similar to the mechanisms described in earlier section.

In step 3 of FIG. 17, RLE1 1008 responds with the URI of location of the resources, the associated SAM and the Cert. Based on the Client-info and the type or resource requested, the RLE 1008 may select appropriate resources that may be suitable to the Client. RLE 1 sends two resource locations and the associated SAM and Certs. It is possible that both the resources share the same Certs but may have different SAMs. As described earlier, the SAM and the Certs may be hosted at the same RLE 1008 or different RLE. In some cases, the Certs may be located at RHE, which may perform the role of a Certificate Repository.

It is understood that the entities performing the steps illustrated in FIG. 17 may be logical entities that may be implemented in the form of software (i.e., computer-executable instructions) stored in a memory of, and executing on a processor of, an apparatus configured for wireless and/or network communications or a computer system such as those illustrated in FIG. 31C or FIG. 31D. That is, the method(s) illustrated in FIG. 17 may be implemented in the form of software (i.e., computer-executable instructions) stored in a memory of an apparatus, such as the apparatus or computer system illustrated in FIG. 31C or FIG. 31D, which computer executable instructions, when executed by a processor of the apparatus, perform the steps illustrated in FIG. 17. It is also understood that the functionality illustrated in FIG. 17 may implemented as a set of virtualized network functions. The network functions may not necessarily communicate directly, rather, they may communicate via forwarding or routing function. It is also understood that any transmitting and receiving steps illustrated in FIG. 17 may be performed by communication circuitry of the apparatus under control of the processor of the apparatus and the computer-executable instructions (e.g., software) that it executes.

Security Achievability Mechanism Assessment Process (SAMAP)

The Client may optionally verify the authenticity of the Cert and use the Cert in order to verify the authenticity of the SAM that was obtained from an RLE 1008. Once the SAM has been verified then Client performs an assessment of the SAM and an assessment of the other requirements (payment, flexibility of usage, IoT-specific support etc. . . . ). If the Client deems that it may not be able to accomplish the security mechanisms defined in the SAM, the Client may select a different R from the resource list sent by the RLE 1008. If there is only a URI that was sent based on the request for an R that was sent by the RLE 1008, the Client may abandon the process or query a different RLE 1008 or request a different resource from the same RLE 1008.

As part of the assessment process, the Client selects an authorization model (e.g. PUSH, PULL, and Agent) that best suits its needs. In some scenarios, the RHE may mandate a model (e.g. PUSH model) that can be used, in such a case, the Client is not left with much choice on the model. At the end of the assessment process the Client may have determined the:

Security protocols that must be used in order to secure the Resource in transit as well as at rest (secure storage process).

The Trustworthy Servers that must be contacted in order to perform Authentication, Authorization and/or Platform Validation Model(s) that can used (e.g. PUSH/PULL)

Modes the Client may operate (Proxy-Authentication and/or Proxy-Retrieval)

Cost of accessing the resource and possible payment options

Figure 18:
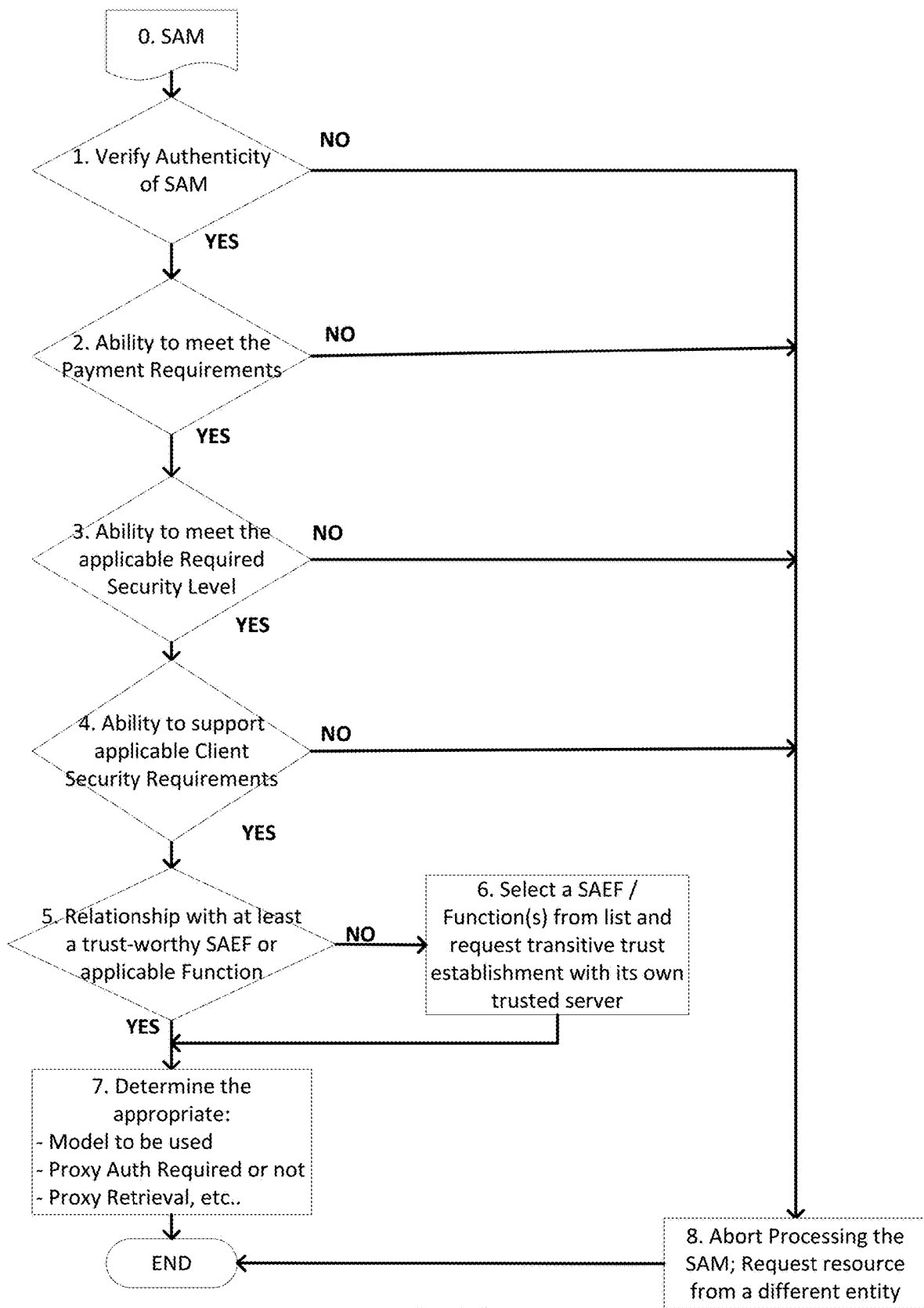
FIG. 18 is a flow-chart describing the processing of SAM by a Client.

An assessment process is described in FIG. 18. The steps are as follows:

In step 1 of FIG. 18, upon receiving the SAM associated with a resource from an RLE 1008, the Client may optionally verify the authenticity of the SAM by using the Cert and verifying the signature generated on the SAM using the public key associated with the resource R (available on the R_Cert). Once the SAM is deemed to be authentic, then the Client begins to perform an evaluation process of the various security mechanisms/requirements that are expected of the Client in order to be able to access the resource.

In step 2 of FIG. 18, the Client may check to see if there is a payment requirement and if so, it may verify if it has the ability to pay for accessing the resource using the appropriate currency (e.g. $, bitcoins). It may also check to see if it has a trust relationship with one of the Trustworthy Payment functions listed in the SAM.

In step 3 of FIG. 18, the Client checks to see if it can meet the level of security required in order to be able to protect the Resource from being tampered, eavesdropped by malicious or non-malicious entities during transit or at rest. If not the process is aborted.

In step 4 of FIG. 18, the Client checks to see if it has the platform, software, middleware, protocols and hardware required from a security perspective in order to be able to protect the resource. The requirements check that is performed here, may be viewed as a more granular assessment of the check performed at Step 3. The Check at Step 3 is about the security requirements associated with a resource, whereas the check here is assessing the capabilities of the Client.

In step 5 of FIG. 18, from among the list of "Trustworthy SAEF" or "Trustworthy functions" the Client picks the appropriate SAEF/Function, with which the Client may have a trust relationship or is capable of developing a trust relationship. In addition, it may pick a SAEF 1010 or pick multiple functions depending upon, the security mechanism requirements. If payment is not required, then selection of a payment function is skipped, similarly an authentication function may be skipped if the SAM does not deem authentication to be necessary for accessing a particular resource. A more preferable option for the Client may be to pick a SAEF 1010, which then is able to orchestrate the various assessments that may be required as per the SAM.

In step 6 of FIG. 18, if the Client does not have a trust relationship with any other SAEFs or functions that has been listed within the SAM, then the Client may request building a dynamic trust building process so that a trust relationship may be established between anyone of the listed functions and the Client's own trusted function/entity (e.g. Identity Provider associated with the Client).

In step 7 of FIG. 18, on completion of determining trusted functions/SAEF 1010, the Client selects an appropriate Model that may be suitable from the list. As discussed earlier, the PUSH model seems more appropriate if a RHE is constrained whereas if the Client is constrained then a PULL model may be preferred. The SAM provides a priority list of models that is supported by the RHE and the Client picks a model that may closely fit its own restrictions. In addition, the Client may also determine if it can operate in a delegated authentication mode (Proxy-Authentication) or using Proxy-Retrieval process that may be suitable for severely constrained Clients/RHEs.

In step 8 of FIG. 18, if the Client deems that it is not possible to meet any of the required and applicable security requirements, models, payment etc. . . . then the authorization process may be aborted or may request the service from a different RHE/RLE 1008, which may have differing security requirements.

It is understood that the entities performing the steps illustrated in FIG. 18 may be logical entities that may be implemented in the form of software (i.e., computer-executable instructions) stored in a memory of, and executing on a processor of, an apparatus configured for wireless and/or network communications or a computer system such as those illustrated in FIG. 31C or FIG. 31D. That is, the method(s) illustrated in FIG. 18 may be implemented in the form of software (i.e., computer-executable instructions) stored in a memory of an apparatus, such as the apparatus or computer system illustrated in FIG. 31C or FIG. 31D, which computer executable instructions, when executed by a processor of the apparatus, perform the steps illustrated in FIG. 18. It is also understood that the functionality illustrated in FIG. 18 may implemented as a set of virtualized network functions. The network functions may not necessarily communicate directly, rather, they may communicate via forwarding or routing function. It is also understood that any transmitting and receiving steps illustrated in FIG. 18 may be performed by communication circuitry of the apparatus under control of the processor of the apparatus and the computer-executable instructions (e.g., software) that it executes.

Security Achievability Enabling Process (SAEP)

The SAEP process is carried out between the Client and the SAEF 1010. The goal of the SAEP process is to determine with a high-degree of assurance if the Client:

Is the same entity that it claims it to be (Authentication assessment)

The Client has the appropriate security behavior that is expected of it in order to access a resource (Platform Validation/determining Security Posture assessment)

Determines if Client has a secure platform (OS, Kernel, Drivers, Hardware etc.):

Secure Environment, TPM, TEE

Secured and measure boot process

Secure run-time integrity of applications

Determines if the Client has the right set of security applications (e.g. malware protection mechanisms: Anti-Virus (AV)), protocols for secure communications (e.g. TLS), secure storage mechanisms, appropriate cryptographic functions, secure policies etc.

Is requesting access to a resource whose SAM is matched or exceeded by the Client (Authorization assessment)

Wherever applicable, the ability to verify if the Client has made a payment in order to access the resource.

The SAEF 1010 may use delegated mechanisms in order to perform the checks on the Client. An entity/function may perform the Authentication assessment, while another entity performs the Authorization assessment, Validation assessment, etc. . . . . It must be noted that not all of the assessments may be carried out considering that the resource that the Client is trying to access may have a low SC/SV, or the Client may be a constrained entity. As an example, the client may be authenticated by an identity provider such as an Mobile Network Operator (MNO) (e.g. Verizon, ATT, NTT BT) or an Over-The-Top (OTT) provider (e.g. google, Facebook), while the platform validation is performed by the platform vendor such as Android, RIM or ARM. It may be possible that each of the assessments have a valid lifetime, which is tracked by the SAEF 1010. If a new SAEP is requested then the SAEF 1010 may check the existing validity of a previous assessment. Only if an assessment that has not been carried out previously or if a previously performed assessment's validity has expired is a new assessment performed. This is especially important in the case where a Client may be constrained and would prefer to avoid performing intensive cryptographic or security protocols frequently.

Figure 20:
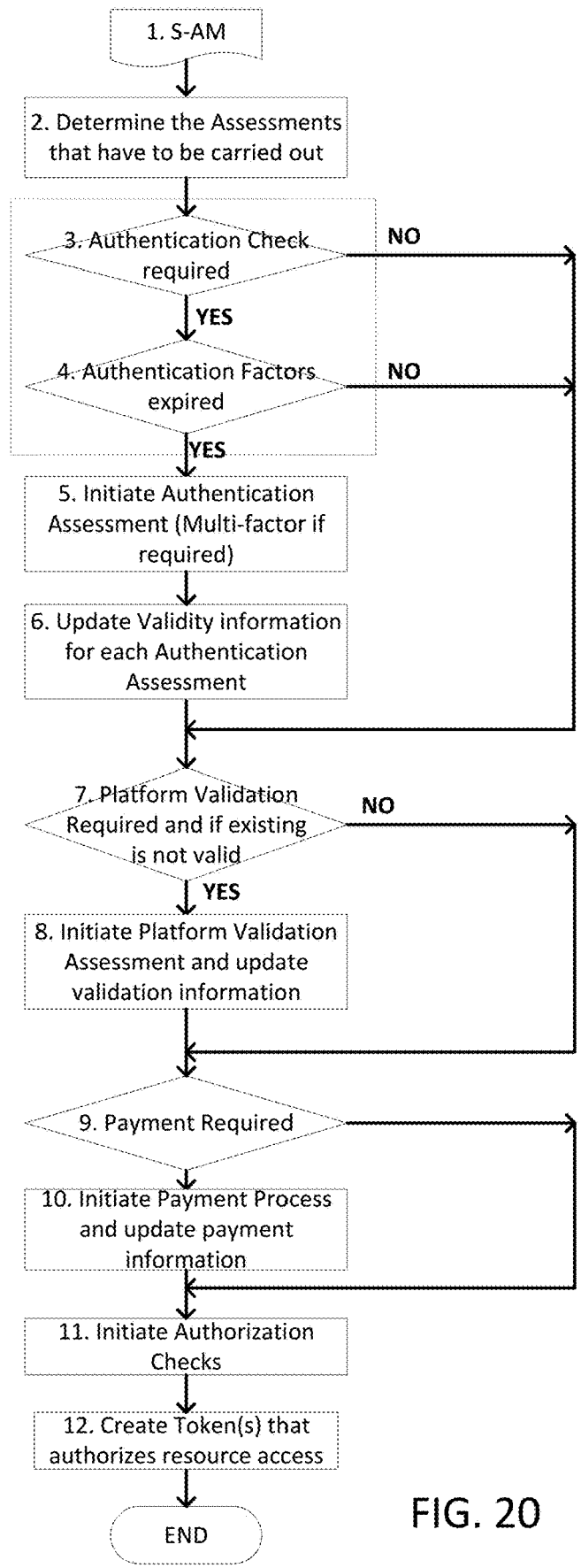
FIG. 20 is a flow chart of the security achievability assessment process.

At the conclusion of the SAEP process, the SAEF 1010 may issue an assertion(s) or token(s) that asserts the veracity of the checks performed by the SAEF 1010 on the Client. The SAEF 1010 may create a cumulative assertion in the form of a token and sends it to the Client. A cumulative assertion may be a combination of the results of various assessments that were performed. In short, it may be a group of tokens that attests to the assessments or a single token that illustrates all the assessments that were performed. It may be noted that the tokens generated may be in the form of OAuth tokens (e.g. access token, bearer token) or other forms of tokens (e.g. SAML tokens). FIG. 20 illustrates a flow-chart detailing the steps performed by a SAEF 1010 in orchestrating the various assessments. Steps described:

In step 1 of FIG. 20, The SAM is obtained by the SAEF 1010 generally directly provided by the Client to the SAEF 1010. Alternatively, the Client may provide a link to the SAM (e.g. URI of the RLE 1008 hosting the SAM), which is then fetched by the SAEF 1010. Also, the mechanism by which the SAM is obtained by the SAEF 1010 may be determined based on the Model selected by the Client. The associated R_Cert may also be obtained by the SAEF 1010.

In step 2 of FIG. 20, Based on the SAM and after optionally verifying the authenticity of the Cert and using the Cert to optionally verify the integrity of the SAM, the SAEF 1010 processes the SAM. The SAEF 1010 processes the SAM by analyzing the relevant attributes and may initiate the necessary assessments required to meet the SAM.

In step 3 of FIG. 20, Authentication assessment: A check is made to determine if an Authentication assessment is required. This step may be skipped if the Resource can be accessed in an anonymous manner.

In step 4 of FIG. 20, It also checks to see if the authentication factors are fresh and have not expired In step 5 of FIG. 20, The Authentication assessment may also be skipped if fresh and valid authentications that meet the SAM requirements are met. Multi-factor authentications may be carried out that determines the authenticity and assurance level of a client by performing "what the client knows", "what the client has" and "what the client is" assessments that may involve as examples, password-based authentication, device authentication and biometric authentications respectively. In step 5 of FIG. 20, During the Authentication assessment, a determination is made, if a multi-factor authentication may need to be carried out especially if a Client application is being controlled by a human being. The authentication assessment of the human may involve other authentication factors (password-based, device, biometrics etc. . . . ). The entity with which the authentication is carried out may be determined based on the entry in the SAM, where a "List of Trustworthy Authentication functions" has been provided. From the list, the SAEF 1010 or alternatively the Client may trigger an Authentication assessment with the "Trustworthy Authentication function". It is possible that if a multi-factor authentication is carried out then it may include a plurality of Trustworthy Authentication functions each associated with an authentication factor (e.g. MNO that may be used for verifying "what you possess" authentication). It may also be possible that the SAEF 1010 is capable of performing the authentications on its own without relying on external authentication functions.

In step 6 of FIG. 20, If new authentications have been carried out then the validity (freshness) information is updated for the corresponding authentication factors.

In step 7 of FIG. 20, A determination is made in order to determine if a platform validation is required based on analysis of SAM that was performed in step 2. And then a determination is made if there exists a fresh (non-expired) validation assessment. Only if a platform validation assessment is required and if a current and fresh assessment is not available then a new assessment is carried out else the platform validation is skipped.

In step 8 of FIG. 20, The Client's device/application performs an integrity validation check which may be triggered by a "Trustworthy Validation Function" residing within the same administrative domain as the SAEF 1010 or by an entity listed within the SAM that was provided by the RHE that may reside outside the SAEF 1010 domain. The results of the platform validation are updated in a table maintained at the SAEF 1010. Platform validation may involve a remote validation process and/or a local platform validation of the client's device involving secured and measured boot process followed by assessment of the integrity of applications hosted on the platform. In addition, a snapshot of run-time integrity checks of the platform may be performed. It is assumed here that the SAEF 1010 is able to verify the availability of secure protocols, algorithms, presence of SE/TEE and other "Client Security Requirements" that have been deemed to be necessary within the SAM.

In step 9 of FIG. 20, It checks to see if payment is required based on the information provided using the SAM and also determines the type of payment (e.g. using bitcoins, ether, US$ etc. . . . ).

In step 10 of FIG. 20, If Payment is required then initiates payment process with a 'Trustworthy Payment Function", which may reside within the same domain as the SAEF 1010 or outside it and satisfies the payment or subscription method that is to be used.

In step 11 of FIG. 20, The SAEF 1010 after having performed the various assessments, finally performs an authorization checks. At a high-level, the SAEF 1010 compares every "applicable" entry within the SAM and checks to see if the "required"/"applicable" and associated Features/Attributes/Values have been satisfied. The SAEF 1010 may also perform environmental checks such as the physical location of the Client (e.g. using GPS/IP address etc.), time of day the request has been made etc.

In step 12 of FIG. 20, If all the assessments have been passed, then the SAEF 1010 issues token(s). In its simplest form the token may indicate that the requirements from the SAM has been satisfied. This token may be a bearer token as described in the OAuth 2.0 Authorization Framework or more complex token that basically describes a high-level requirements that has been verified/assessed by the SAEF 1010. The token may be digitally signed by the SAEF 1010 and may have similar characteristics as a Message Authentication Code (MAC) token. It is recommended that the token issued by the SAEF 1010 bears a digital signature of the SAEF created using the SAEF's private key. Each issued token may have an associated life-time that is described by the token and then token is deemed to be worthless after the expiration of the lifetime. Alternatively, a single token may be made up of multiple sub-tokens. As an example a sub-token may have been issued by a "Trustworthy Authentication Function" another by "Trustworthy Validation Function" etc. The SAEF 1010 may consolidate all the tokens into a set of token which then digitally signed by the SAEF 1010 or alternatively combines all the tokens into a single token which may also be digitally signed by the SAEF 1010. In the latter case, only the digital signature of the SAEF 1010 may be present, whereas in the first case, the tokens from each of the trustworthy functions may still be present, that may bear digital signatures of the issuer (e.g. Authentication Function, Trustworthy Validation Function) of the tokens. Example token (in JSON format or other formats such CBOR may be used) that is signed and displays that a payment has been made is illustrated in FIG. 19.

The Payment Token (PT) is a JWT that was issued by "saef1.com" confirming that a payment of $200 was made for a resource "R-id", time/date it was issued, "01/01/2015: 20:00 hrs" and it expires in 86400 seconds. The main claim of the PT is followed by a digital signature of the issuer "saef1.com", signed by saef1.com using its private key.

It is understood that the entities performing the steps illustrated in FIG. 20 may be logical entities that may be implemented in the form of software (i.e., computer-executable instructions) stored in a memory of, and executing on a processor of, an apparatus configured for wireless and/or network communications or a computer system such as those illustrated in FIG. 31C or FIG. 31D. That is, the method(s) illustrated in FIG. 20 may be implemented in the form of software (i.e., computer-executable instructions) stored in a memory of an apparatus, such as the apparatus or computer system illustrated in FIG. 31C or FIG. 31D, which computer executable instructions, when executed by a processor of the apparatus, perform the steps illustrated in FIG. 20. It is also understood that the functionality illustrated in FIG. 20 may implemented as a set of virtualized network functions. The network functions may not necessarily communicate directly, rather, they may communicate via forwarding or routing function. It is also understood that any transmitting and receiving steps illustrated in FIG. 20 may be performed by communication circuitry of the apparatus under control of the processor of the apparatus and the computer-executable instructions (e.g., software) that it executes.

Figure 21:
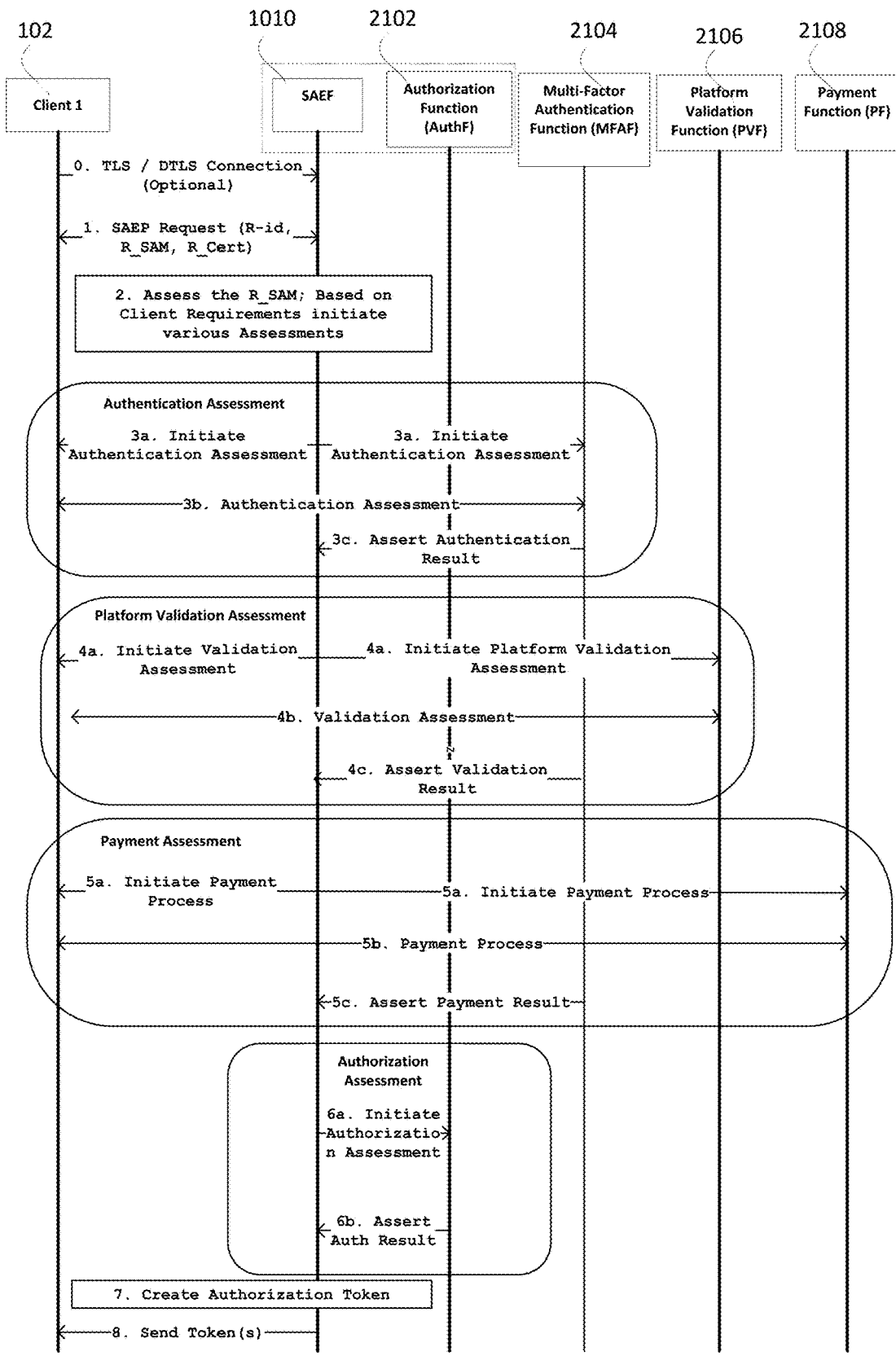
FIG. 21 is a high-level call flow associated with the (Security Achievability Enabling Process) SAEP.

FIG. 21 illustrates a high-level call flow associated with the SAEP process, wherein a Client may select a PULL or PUSH model. Irrespective of the Model selected, the interaction between the Client and the SAEF 1010 would remain very similar at a high-level and the assessments are carried out directly between the Client and the SAEF 1010. Some optimizations are possible when using a PULL model, since the interactions would be facilitated by a RHE and as described earlier, and may be a more appropriate model when dealing with constrained Clients but not suitable when dealing with constrained RHEs. steps:

In step 0 of FIG. 21, setting up of a secure communication channel between Client 1 and SAEF 1010 using TLS or DTLS. The Client 1 and SAEF 1010 may have mutually authenticated one another as part of the process. Requirement to perform a mutual authentication process may be optional particularly in cases where the Client may require anonymous access to data. The Client may however require that it is able to authenticate the SAEF 1010.

In step 1 of FIG. 21, the Client sends SAEP Request that contains the R-id, associated R_SAM and optionally an R_Cert that is associated with the resource.

In step 2 of FIG. 21, the SAEF 1010 may optionally perform a validity check of the R_Cert and verifies the R_SAM. The SAEF 1010 processes the SAM and checks if it is one of the "Trustworthy SAEFs". If so, then it identifies the type of assessments that may have to be carried out. If the SAM required that the Authentication assurance level required is "High", then a Multi-factor authentication may have to be carried out, provided that the SAEF 1010 is able to determine if the Client is controlled by a human or not. Since, there is an assumption, that there is a trust relationship between the SAEF 1010 and the Client 1, the SAEF 1010 may be able to obtain the information about Client 1 using the profile associated with Client 1. If there is no direct trust relationship between the Client 1 and the SAEF 1010 and if SAEF 1010 may have to create a transitive trust with the Client 1's trusted entity, then the SAEF 1010 may be able to obtain the profile from that trusted entity. In cases where the required Authentication level may be low and if an authentication has occurred at Step 0, then the SAEF 1010 may not require to perform another authentication of the Client 1. The order in which the various assessments are carried out may be based upon the SAM and the policies governing SAEF 1010 operations. As an example, the SAEF 1010 may determine that the Authentication Assessment has less impact for a constrained device and therefore may initiate it before performing the rest of the assessments. So, if the authentication fails then the other assessments may not be carried out. On the other hand, if the SAEF 1010 determines that the most important assessment is the Platform Validation then it may be carried out before any other assessments are performed.

In step 3 of FIG. 21, It is assumed here, that the SAEF 1010 initiates an Authentication assessment first before any other assessments. The Authentication assessment may be skipped if: a). No authentication is required based on the SAM (anonymous access) or b). An existing valid and fresh authentication is present which meets the "Required Security Level" or c). The TLS/DTLS authentication that was carried out in order to setup a secure connection meets the "Security Level". The Authentication assessment may be carried out in the following manner:

In step 3*a*, the SAEF 1010 may trigger either the Client 1 or the Authentication Function (AF), which may also be Multi-Factor Authentication Function (MFAF) 2104 that is capable of performing varied authentication factors to start the authentication process. The Authentication process may follow well established protocols such as Open Identity (OpenID)/OpenID Connect/SAML/Kerberos/GBA/EAP etc. And in one such embodiment, the Client 1 may be re-directed to a MFAF in order to perform the Authentication assessment(s)

In step 3*b*, the Client 1 and MFAF 2104 may perform multi-factor authentications in order to meet or exceed the "Required Security Level" associated with Authentication. As part of the Authentication process, Client device may be authenticated using a device certificate or using a Client application certificate. Optionally the Client device may also be authenticated using shared secrets (e.g. using secrets stored in a SIM card) or Client applications that may have shared secrets stored securely. If the Client is controlled by a human, then the individual may be authenticated using (what the "user knows" mechanism: e.g. password) and/or biometrics. The MFAF 2104 may use other AFs in order to co-ordinate the various authentication assessment(s) since the credentials associated with each of the factors may be stored at different AFs. The device authentication may require the MFAF 2104 to interact with a Mobile Network Operator (MNO)'s core network functions such as AAA/Diameter/HSS that may store Client 1 (subscriber's credentials).

In step 3*c*, the MFAF 2104 obtains the results from the various AFs and then creates an Assertion or a Token that vouches the authentication of Client 1. It may indicate the Authentication Level achieved by the Client 1. The Token may be made up of sub-tokens each obtained from an AF. The MFAF 2104 sends the Assertion/Token to the SAEF. 1010.

In step 4 of FIG. 21, the SAEF 1010 then determines if a Platform Validation is required or not based on the SAM information and the availability of a fresh and valid platform validation assessment. If required the SAEF 1010 triggers a Platform Validation assessment process with a Platform Validation Function (PVF) 2106. In addition to the assessment of the platform validation process, the SAEF 1010 may request that a more granular check of whether certain security protocols are supported (e.g. SAML or IPSec etc. . . . ), presence and current running of Malware detection/cleaning application, anti-virus (AV), appropriate configuration parameters etc. . . . and meets the SAM requirements. The PVF 2106 sends an Assertion/Token based on the Validation Process vouching for a successful assessment that was carried out.

In step 5 of FIG. 21, the SAEF 1010 may initiate a Payment assessment with a PF 2108 if it is deemed to be necessary. The PF 2108 sends an PT (Payment Token) to the SAEF 1010 on completion of payment process and as described earlier, the PT may indicate if a payment was successful or the actual payment that was performed. In some instances, the PT may be used as a receipt and may be associated with an R-id. It is also possible that a PT does not contain an R-id, especially for transactions requiring anonymous transactions. The PT may vouch for a successful payment transaction that was carried out.

In step 6 of FIG. 21, the SAEF 1010 may use the services of an Authorization Function (AuthF) 2102 in order to determine if all the remaining requirements listed within the SAM have been achieved and the appropriate mechanisms have been utilized. In addition, the AuthF 2102 would be responsible for conveying restrictions associated with access control and the restrictions may include (an example list is provided below, which is not exhaustive):

Validity of access to the resource, R-id: How long the AT is valid (e.g. in seconds)

Location from which access to R may be allowed (e.g. IP@ range, geographical location restrictions, time of day)

Proxy-Retrieval or Possibility of Group Access (Number of group members restrictions): Is the resource accessible by a proxy on behalf of other clients.

Re-distributable: If a resource may be re-distributable to other Clients, number of Clients and or even the IP address/application associated with Clients. DRM protected content.

In step 7 of FIG. 21, at the conclusion of the various assessments, the SAEF 1010 creates an Authorization Token (AT) that may be digitally signed by the SAEF 1010 or may contain a MAC of the Token that may be verifiable by the RHE. The AT may be a consolidation of all the relevant assessments (claims) that were carried out by the SAM, or may just contain only a high level claims about the assessment or alternatively contain every token that was issued by the various assessment functions.

In step 8 of FIG. 21, the Token is then sent to the Client 1 using preferably a secure communications channel (e.g. TLS/DTLS). The token may be individual tokens that attest to the various assessments that were performed or may be a single token that contains the appropriate claims. It must be noted that all the assessments may be cryptographically channel bound.

It is understood that the entities performing the steps illustrated in FIG. 21 may be logical entities that may be implemented in the form of software (i.e., computer-executable instructions) stored in a memory of, and executing on a processor of, an apparatus configured for wireless and/or network communications or a computer system such as those illustrated in FIG. 31C or FIG. 31D. That is, the method(s) illustrated in FIG. 21 may be implemented in the form of software (i.e., computer-executable instructions) stored in a memory of an apparatus, such as the apparatus or computer system illustrated in FIG. 31C or FIG. 31D, which computer executable instructions, when executed by a processor of the apparatus, perform the steps illustrated in FIG. 21. It is also understood that the functionality illustrated in FIG. 21 may implemented as a set of virtualized network functions. The network functions may not necessarily communicate directly, rather, they may communicate via forwarding or routing function. It is also understood that any transmitting and receiving steps illustrated in FIG. 21 may be performed by communication circuitry of the apparatus under control of the processor of the apparatus and the computer-executable instructions (e.g., software) that it executes.

Resource Access Process (RAP)

During the RAP, Client 1 sends the AT that was obtained from the SAEF 1010 to the RHE using a secure connection.

The RHE checks to see if the R_SAM associated with the resource had a requirement for "Trustworthy SAEF". If so, the RHE obtains a digital certificate associated with the SAEF 1010 or obtains a pre-shared secret associated with the SAEF 1010. The SAEF 1010 then verifies the Digital Signature or the MAC that is sent as part of the AT. The RHE then verifies the rest of the AT in order to check if the SAM requirements have been met and also checks to determine if appropriate mechanisms described in the SAM has been used in authorizing the Client 1 by the SAEF 1010. A flow-chart illustrating the steps described above is shown in FIG. 22.

Figure 22:
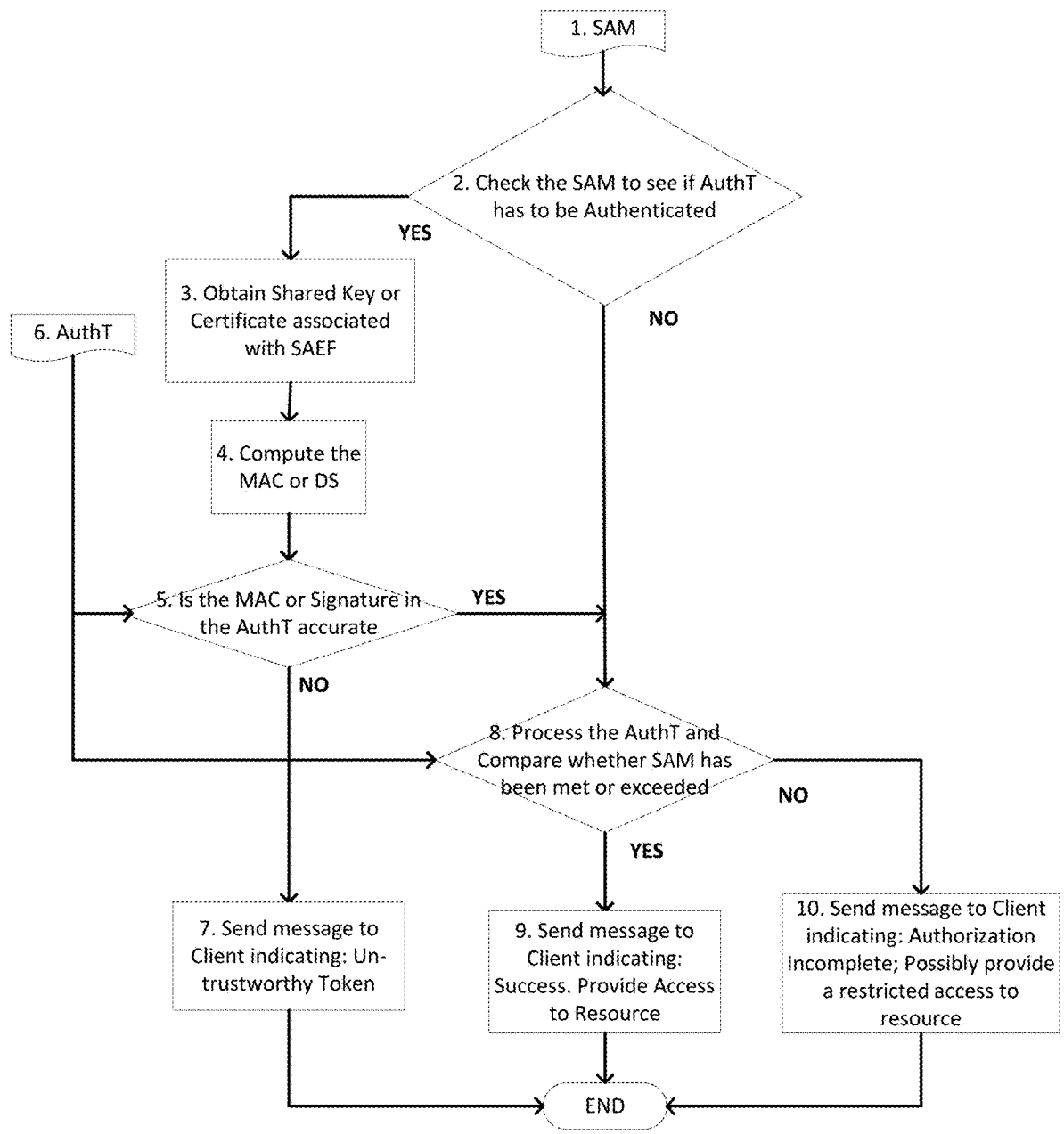
FIG. 22 is a flow-chart for resource access procedure at a Resource Hosting Entity (RHE).

In step 2 of FIG. 22, the SAM is checked to see if AuthT has to be Authenticated.

If so in step 3 of FIG. 22, the Shared Key or Certificate associated with SAEF is obtained, and in step 4 of FIG. 22, The MAC or Digital Signature (DS) is computed. In step 5 of FIG. 22, it is checked if the MAC or Signature in the AuthT is accurate.

If the MAC or Signature in the AuthT is not accurate, in step 7 of FIG. 22 a message is sent to the Client indicating an Un-trustworthy Token.

If the MAC or Signature in the AuthT is accurate (or if the AuthT does not have to be Authenticated), in step 8 of FIG. 22, the AuthT is processed and it is checked whether SAM has been met or exceeded.

If the SAM has been met or exceeded, in step 9 of FIG. 22, a message is sent to the Client indicating a Success and access is provided to the resource.

If the SAM has not been met or exceeded, in step 10 of FIG. 22, a message is sent to the Client indicating an Authorization Incomplete. In one embodiment, restricted access to the resource is provided.

It is understood that the entities performing the steps illustrated in FIG. 22 may be logical entities that may be implemented in the form of software (i.e., computer-executable instructions) stored in a memory of, and executing on a processor of, an apparatus configured for wireless and/or network communications or a computer system such as those illustrated in FIG. 31C or FIG. 31D. That is, the method(s) illustrated in FIG. 22 may be implemented in the form of software (i.e., computer-executable instructions) stored in a memory of an apparatus, such as the apparatus or computer system illustrated in FIG. 31C or FIG. 31D, which computer executable instructions, when executed by a processor of the apparatus, perform the steps illustrated in FIG. 22. It is also understood that the functionality illustrated in FIG. 22 may implemented as a set of virtualized network functions. The network functions may not necessarily communicate directly, rather, they may communicate via forwarding or routing function. It is also understood that any transmitting and receiving steps illustrated in FIG. 22 may be performed by communication circuitry of the apparatus under control of the processor of the apparatus and the computer-executable instructions (e.g., software) that it executes.

Figure 23:
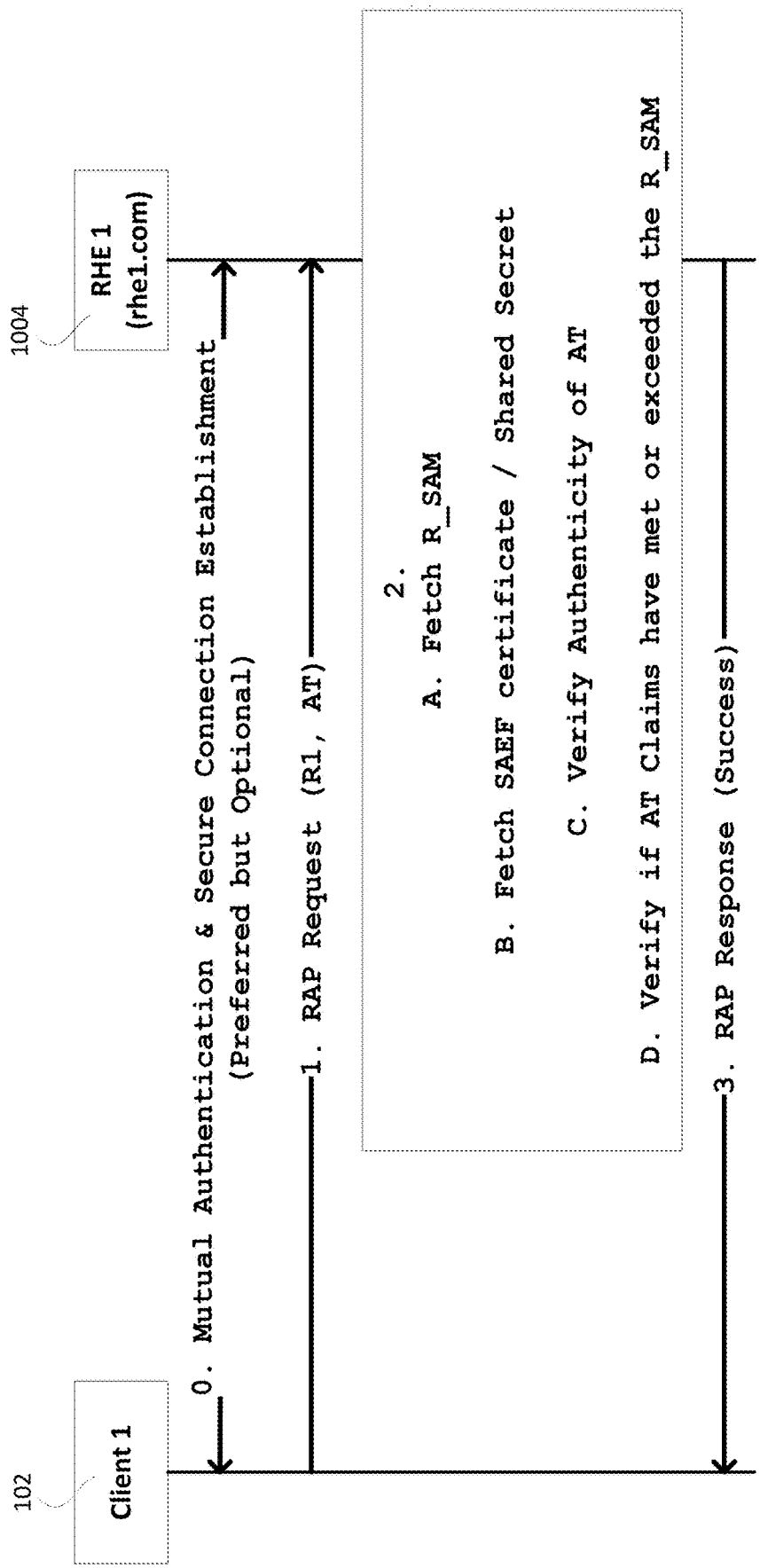
FIG. 23 is a call flow depicting a Resource Access Process (RAP).

A call flow depicting the message exchange is illustrated in FIG. 23.

In step 0 of FIG. 23, Client 1 and RHE1 mutually authenticates one another and establishes a secure connection between them. This step may be optional however preferred. In cases, where anonymous authentication is required, the authentication step may be skipped. Also, if Client 1 has been provisioned with an AT that has been authenticated by a SAEF 1010, then the authentication of Client 1 may be skipped. The Client 1 may however require that the RHE1 is authenticated by it.

In step 1 of FIG. 23, Client 1 sends a RAP Request message to RHE1. Client 1 provides the AT within the Request which is sent inside a secure connection. It may optionally include the resource id, R-id, since the R-id may be present as a claim within the AT. In cases, where the R-id is not included as part of the claim, the R-id has to be included as part of the RAP Request message.

In step 2 of FIG. 23, the RHE1, then performs;

(step 2*a*) Fetches SAM associated with R-id from its local stored database or fetches it from a different RHE.

(step 2*b*) If the RHE has a list of 'Trustworthy SAEF" or other "Trustworthy Function", then it obtains those information from the SAM and also obtains from a database associated with the RHE1, a pre-shared secret between the RHE1 and the SAEF 1010 or a digital certificate of the SAEF 1010. Similar procedures may be used to obtain secrets or certificates associated with the other functions.

(step 2*c*) If a Signature or MAC is required based on the SAM associated with resource, then the RHE may verify the Signature or MAC that was included as part of the AT. Mechanisms similar to those specified in the JSON Web Token (JWT)/JSON Web Signature (JWS) specifications JSON Web Token (JWT), IETF-Draft: draft-ietf-oauth-json-web-token-32, Dec. 9, 2014 may be used for verification. The JWT is a JSON representation of an assertion of claims provided by the SAEF 1010 or "Trustworthy Function". In short, it is JSON version of an AT and the JWS is a signed AT.

(step 2*d*) The RHE1 then verifies if Client 1 has met the requirements/mechanisms as listed in SAM. If so, Client 1 is authorized to access the resource, else RHE1 may determine if a partial access to the resource could be provided based on the match else no access is provided at all.

In step 3 of FIG. 23, RHE1 sends the resource to Client 1, if the AT claims have been met and verified.

It is understood that the entities performing the steps illustrated in FIG. 23 may be logical entities that may be implemented in the form of software (i.e., computer-executable instructions) stored in a memory of, and executing on a processor of, an apparatus configured for wireless and/or network communications or a computer system such as those illustrated in FIG. 31C or FIG. 31D. That is, the method(s) illustrated in FIG. 23 may be implemented in the form of software (i.e., computer-executable instructions) stored in a memory of an apparatus, such as the apparatus or computer system illustrated in FIG. 31C or FIG. 31D, which computer executable instructions, when executed by a processor of the apparatus, perform the steps illustrated in FIG. 23. It is also understood that the functionality illustrated in FIG. 23 may implemented as a set of virtualized network functions. The network functions may not necessarily communicate directly, rather, they may communicate via forwarding or routing function. It is also understood that any transmitting and receiving steps illustrated in FIG. 23 may be performed by communication circuitry of the apparatus under control of the processor of the apparatus and the computer-executable instructions (e.g., software) that it executes.

Only the PUSH model is considered above. However, the mechanisms described here can be applied to other models (PULL, Indirect PUSH etc. . . . ) as well since the principles and logic are similar.

EMBODIMENTS

A traditional Resource Server (RS) 108 may be enhanced with functionalities (e.g. with the ability to interact with an SCF 1006, creation of SAM, publishing the associated SAM and S-Cert) and messaging capabilities associated with RHE as described in 5.3 in order to support a more flexible and dynamic authorization framework described above. Similarly, a Resource Directory (RD) 2404 may be enhanced with the additional functionality (e.g. ability to list the SAM, S-Cert, process query requests based on security parameters: HIGH/MEDIUM/LOW) and messaging capabilities that are associated with an RLE 1008 that have been described in 5.4.

It must be noted the appropriate selection of the SAM parameters would depend upon the type of data that is being protected. A data/resource that has a low SV/SC is then represented using a very simple SAM, but if the SC/SV=High for a resource then it should take into considerations that the resource created and hosted on an RHE/RS, has the sufficient capacity to hold and process the SAM. The same would apply for a Client.

Also, if a Client is not able to deal with a model, (e.g. PULL), wherein, the Client may not have a trust relationship with the AS 106 then either a transitive trust must be created, which may be cumbersome or may query the RLE 1008/RD 2404 in order to find another RHE/RS 108 that may support the PUSH model.

In a slightly varied embodiment, it may entail that the RHE/RS 108 implements a subset of the RLE 1008/RD 2404 functions, therefore the Client may query an RS 108 directly for a SAM or may have a SAM from a previous exchange that has not expired.

In some cases, a resource may only have an associated SC/SV value, which may depict the Resource-Specific Security Profile (RSSP). This may range from e.g. 0 (LOW)-10 (HIGH).

Figure 24:
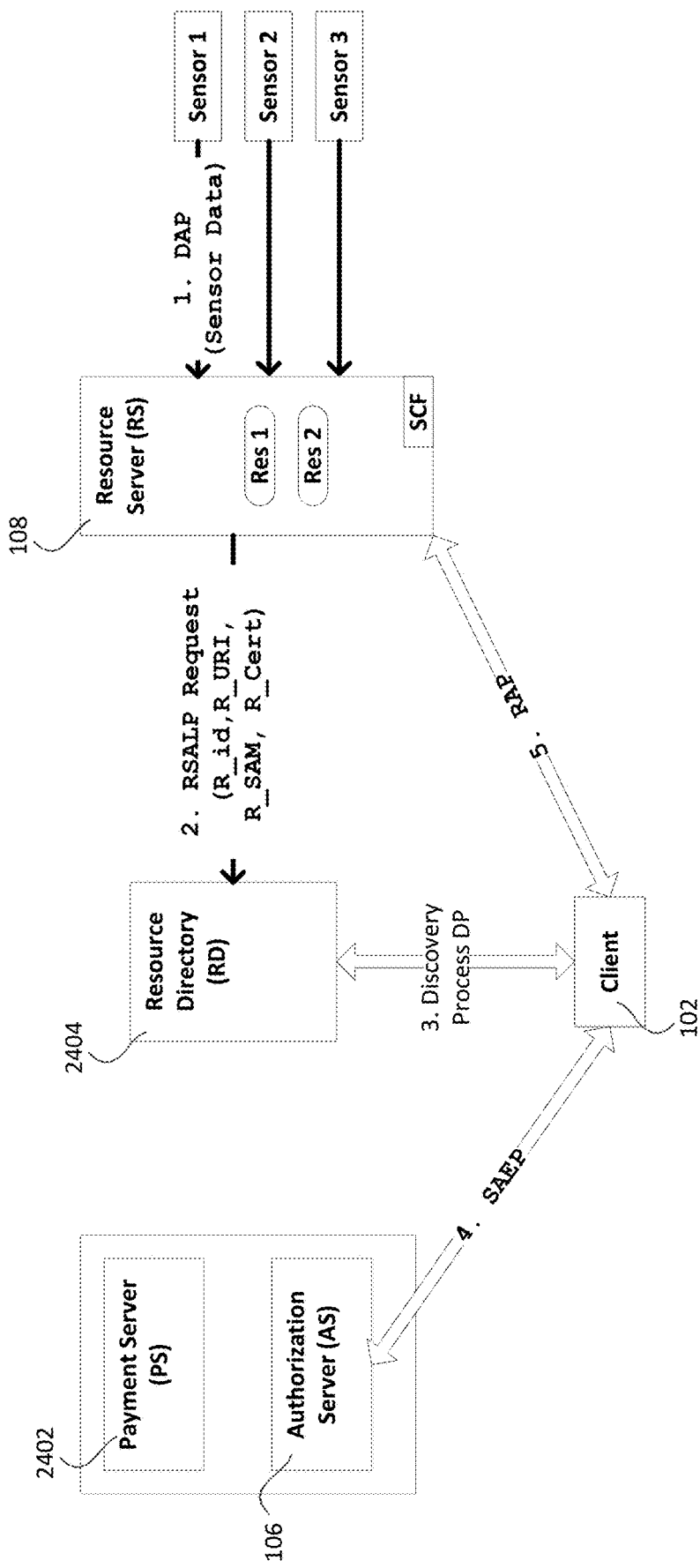
FIG. 24 is a diagram that illustrates steps involved in resource access.

A high-level embodiment of the solution is illustrated in FIG. 24. It depicts the entities and the steps involved in order to be able to provide a Client with access to a resource hosted by a RHE such as a Resource Server (RS).

Embodiment with Detailed Messaging

A traditional RS 108 must be enhanced with the functionality described in this application in order that the RS 108 functions similar to a RHE. The Client uses a traditional RD 2404 that has been enhanced with RLE 1008 functions in order to obtain the appropriate SAM and determine the appropriate security mechanisms, security requirements, payment etc. It must be noted that the RD 2404 must be enhanced with functionalities described for a RLE 1008 in order that a client is able to leverage the dynamic authorization framework described here. Similarly, a traditional AS 106 must be enhanced with the functions performed by a SAEF 1010 and may be co-hosted with a Payment Server (PS) 2402.

In step 1 of FIG. 24, the sensors perform a DUP and may be performed periodically. As described earlier, a resource that is created may be raw data, raw data with meta-data, information that is extracted out raw data or a collection of data or information or content. Some resources may be linked together using web-linking protocol. Each piece of data may have a SC/SV that is computed by the RHE or provided to it by an external trusted entity. Additionally, resources created by different information servers may also be hosted on the RS 108. Furthermore, this new information resources may be used to create newer resources on the RS 108. A new SV may be computed by the RS 108 for each instance of a new information that is created. In a constrained environment, these resources may be assigned to class rather than a more granular SVs. In short, for any new resource that is created on the RS, a new SV may be computed. The value of SV may range from e.g. 0-10; 0—No Security requirements; 10—Extremely High.

In step 2 of FIG. 24, the RS 108 then performs a directory listing or registration of the resource and associated SAM and optionally a Cert on to an RLE 1008. The RS 108 sends an SALP message to the RD 2404, containing the R-id, R_SAM and R_Cert associated with each of the resources hosted on the RS 108. As mentioned earlier, the SAM contains information on "Trust-worthy SAEF" or Functions, with which the RS 108 may have a trust relationship. The SAM also provides the Client with information on the type of Model (e.g. PUSH, PULL etc.) that it may select when initiating an authorization process. In addition, information on whether the RS 108 is constrained or not, whether proxy-authentication, proxy-retrieval process can be performed are also provided.

On receiving the SALP message, the RD 2404 may perform an authorization check to see if the RS 108 is authorized to perform an update operation on the resource listing/record associated with the RS 108 on the RD 2404. If so, the RD 2404 creates an entry for the resource listing (location or URI of the resource of on the RS) and the associated SAM is either stored on the RD 2404 or a link (URI indicating where it may be stored) to the SAM is provided as part of the listing. The same holds for the R_Cert.

In step 3 of FIG. 24, a Client that wishes to access a resource, may perform a DP with a RD 2404 using the protocol described in CoRE Resource Directory (IETF-draft-shelby-core-resource-directory-02, Nov. 9, 2014).

As part of the resource discovery, the Client is provided with the SAM, location information of the resource (URI that points to the RS) and if applicable a Cert is also provided. It may be possible that the same copy of the resources are stored on multiple RS 108. Additionally, related listing(s) regarding resources which may be web linked using the web linking protocol described in Web-linking Protocol, IETF-RFC 5988 may also be provided. The RS 108 may update the resource location periodically, and/or update the associated SAM periodically depending upon the nature of the data that is being collected or based on the security posture of the data which may have changed based on certain external factors (e.g. trust relationship with a new SAEF).

In step 4 of FIG. 24, based on the information obtained by the Client from the RD 2404, the Client may determine the model that is to be used, determine if it is able to handle the security requirements, payment requirement, determine if it has a trust relationship with at least one of the SAEF 1010 or other security functions, ability to run in a proxy-authentication, proxy-retrieval modes etc. The required assessments are performed by the AS 106/PS 2402 and appropriate token(s) are issued to the Client 102. If the Client is not able to meet some of the core requirements, it may perform a DP using certain other parameters, or with a different RD 2404.

In step 4 of FIG. 24, it is assumed in this particular scenario, the Client selects the PUSH model, based upon the SAM, it then selects an appropriate SAEF 1010, which may be implemented within an existing Authorization Server (AS). It must be noted, that the current AS 106 must be enhanced with the SAEF functionality in order that it is able to process the SAM and then have the ability to co-ordinate the various security and payment functions and related tokens (assertions) generated by each of the functions and then create a consolidated token. Additionally, the AS 106 may have to create transitive relationships with other AS 106 with which it may not have had any trust relationship previously. In such cases, the AS 106 may have to perform a service discovery in order to discover AS, that may have a transitive trust relationship with an AS 106 listed within the AP. Alternatively, the AP may have to perform a service discovery of a class of AS 106 that meets the requirements as provided within the SAM. The selected AS 106 may perform an authentication using the services of an AF. Alternatively, the Client may be authenticated by another AS, which then asserts the Client's identity to the requesting AS 106. The requesting AS 106 then creates an AT, which is then provisioned to the Client. If a payment was performed then the PS 2402 generates a Payment Token (PT). Based on the SAM, the AS 106 may determine an authentication process may not be required in such authentication may be skipped, while the other assessments (e.g. platform validation, authorization checks) may be executed based on the requirements dictated by the SAM. The AS 106 creates a consolidated Token which is then sent to the Client using a secure connection.

In step 5 of FIG. 24, the Client submits the token(s) to the RS 108 in order to access the resource. The RS 108 verifies the token(s) and optionally verifies a signature provided as part of the token(s), in order to verify that token(s) was issued by a trusted AS 106 specified by the SAM. The RS 108 may optionally verify the Payment token if one was issued by the PS 2402. alternatively, a single token may indicate both an authorization success as well as a successful payment. The payment token may indicate the amount that was paid or may just provide an indication that a payment was successfully processed. The token may be a bearer token, authentication token or a MAC token or a customized token or a PT.

It is understood that the entities performing the steps illustrated in FIG. 24 may be logical entities that may be implemented in the form of software (i.e., computer-executable instructions) stored in a memory of, and executing on a processor of, an apparatus configured for wireless and/or network communications or a computer system such as those illustrated in FIG. 31C or FIG. 31D. That is, the method(s) illustrated in FIG. 24 may be implemented in the form of software (i.e., computer-executable instructions) stored in a memory of an apparatus, such as the apparatus or computer system illustrated in FIG. 31C or FIG. 31D, which computer executable instructions, when executed by a processor of the apparatus, perform the steps illustrated in FIG. 24. It is also understood that the functionality illustrated in FIG. 24 may implemented as a set of virtualized network functions. The network functions may not necessarily communicate directly, rather, they may communicate via forwarding or routing function. It is also understood that any transmitting and receiving steps illustrated in FIG. 24 may be performed by communication circuitry of the apparatus under control of the processor of the apparatus and the computer-executable instructions (e.g., software) that it executes. It is assumed that all the communications between the various entities (e.g. Client 1, RD1, RS1 and AS1) are carried out by means of unique secure connection (e.g. TLS/SSL) between the two entities involved in a communications channel.

Figure 25:
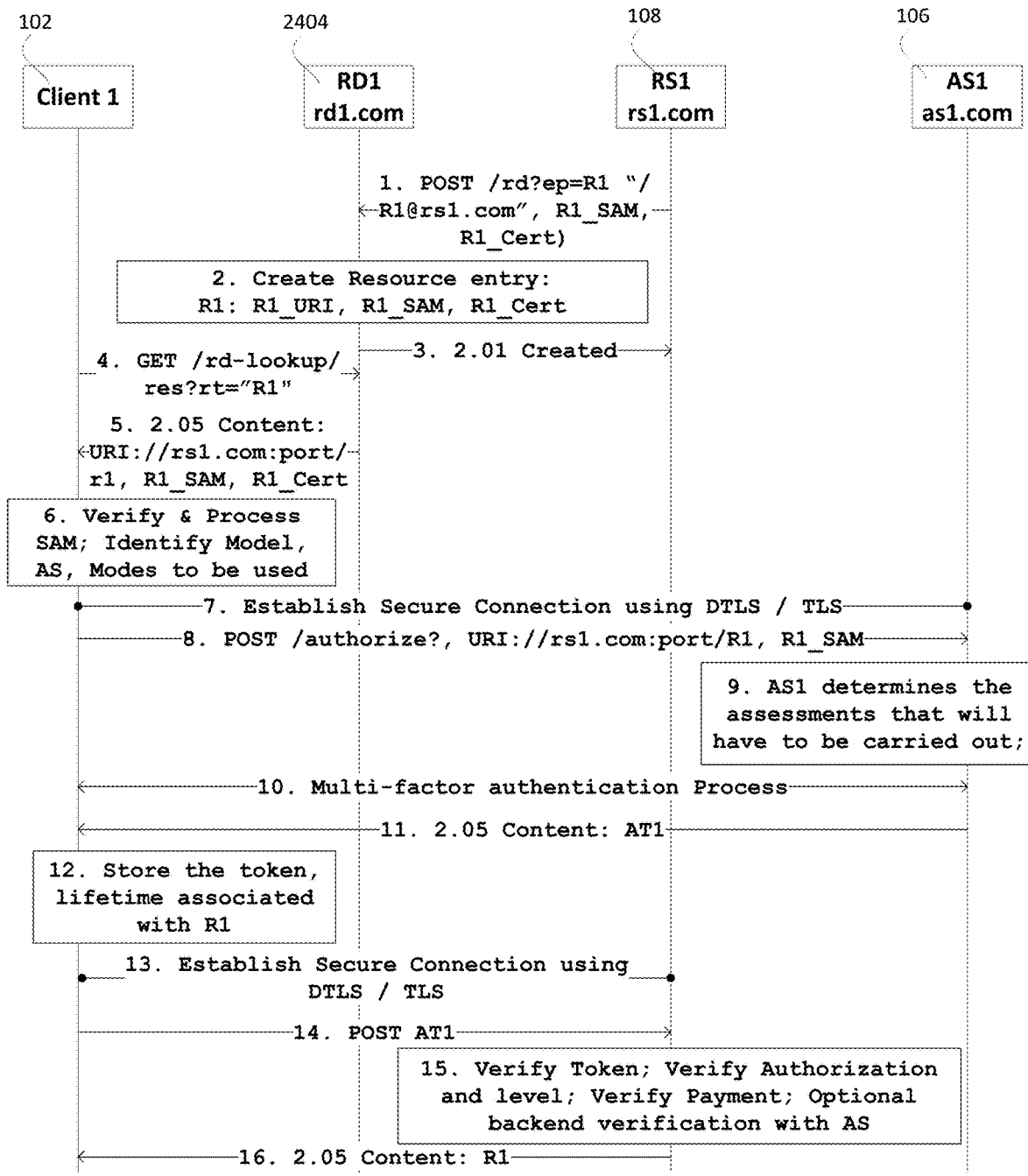
FIG. 25 is a diagram that illustrates a detailed resource access mechanism.

A detailed Embodiment call flow is illustrated in FIG. 25. Steps involved:

In step 1 of FIG. 25, RS 108 sends a request to create a listing for resource, R1 that is hosted on RS 108 onto a RD 2404. The listing also includes R1_SAM and R1_Cert.

In step 2 of FIG. 25, RD 2404 creates a listing for R1, along with the associated R1_SAM and R1_Cert. RD 2404 may optionally check to see if RS 108 is authorized to perform a listing.

In step 3 of FIG. 25, RD 2404 sends a 2.01 "Created" message on successful listing to RS 108

In step 4 of FIG. 25, At some point Client performs a lookup using RD 2404. Client explicitly requests for resource R1. It may be possible that the Client may request a class of resource, or a resources that may operate using certain models/modes etc. . . . . .

In step 5 of FIG. 25, RD 2404 provides the Client, with the R1-URI, R1_SAM and the R1_Cert In step 6 of FIG. 25, Client verifies the SAM using the Cert and determines the model to be selected, a trustworthy SAEF (AS) is also selected. In this call flow the PUSH model is selected In step 7 of FIG. 25, Client establishes a secure connection with AS 106. The Client and AS 106 may mutually authenticate one another In step 8 of FIG. 25, Client requests for authorization and a token to AS 106. It also provides R1_SAM to AS 106

In step 9 of FIG. 25, AS 106 determines the assessment(s) (Additional user and/or device Authentication, Payment, Platform Validation etc. . . . ) that will have to be carried out. Here, it determines that a multi-factor authentication will have to be carried out.

In step 10 of FIG. 25, AS 106 authenticates the Client. This step may involve multi-factor authentications.

In step 11 of FIG. 25, The AS 106 performs authorization check and provisions a token, AT to Client with appropriate claims In step 12 of FIG. 25, The Client stores the AT In step 13 of FIG. 25, Client establishes a secure connection with RS 108

In step 14 of FIG. 25, Client posts the AT that was issued by AS 106 to the RS 108

In step 15 of FIG. 25, RS 108 verifies the token and the signature of AS contained in the token, the assessments that were carried out and ensures that the assessments matched the requirements and mechanisms described in R1_SAM In step 16 of FIG. 25, RS 108 provides Client with the appropriate access to the resource, R1 for a duration that was authorized based on the claim in the AT and as prescribed by R1_SAM.

It is understood that the entities performing the steps illustrated in FIG. 25 may be logical entities that may be implemented in the form of software (i.e., computer-executable instructions) stored in a memory of, and executing on a processor of, an apparatus configured for wireless and/or network communications or a computer system such as those illustrated in FIG. 31C or FIG. 31D. That is, the method(s) illustrated in FIG. 25 may be implemented in the form of software (i.e., computer-executable instructions) stored in a memory of an apparatus, such as the apparatus or computer system illustrated in FIG. 31C or FIG. 31D, which computer executable instructions, when executed by a processor of the apparatus, perform the steps illustrated in FIG. 25. It is also understood that the functionality illustrated in FIG. 25 may implemented as a set of virtualized network functions. The network functions may not necessarily communicate directly, rather, they may communicate via forwarding or routing function. It is also understood that any transmitting and receiving steps illustrated in FIG. 25 may be performed by communication circuitry of the apparatus under control of the processor of the apparatus and the computer-executable instructions (e.g., software) that it executes.

Figure 26:
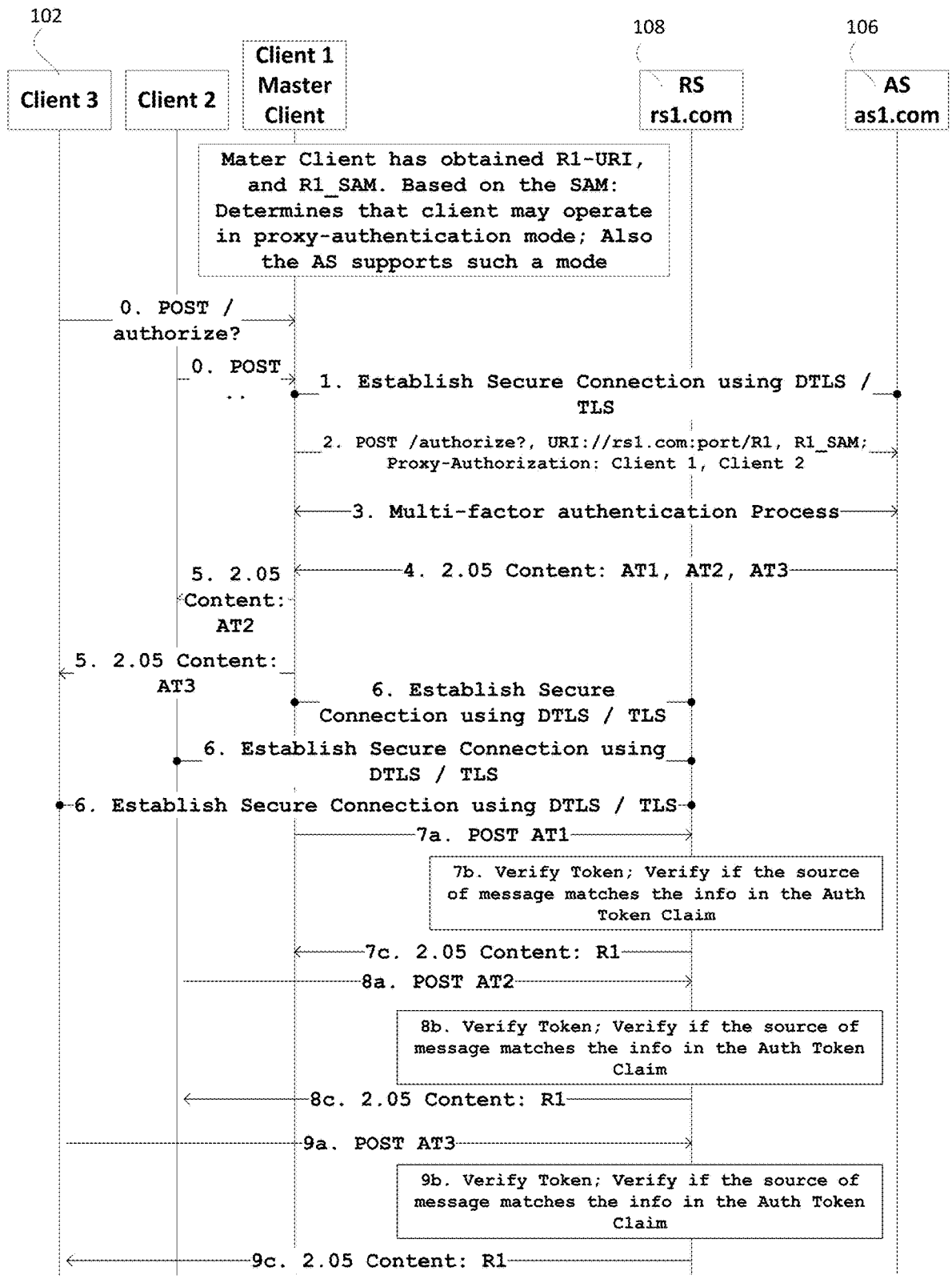
FIG. 26 is a diagram that illustrates a detailed resource access-proxy authentication.

An embodiment that demonstrates a proxy-authentication scenario is shown in FIG. 26. A Client 1 works as a Master Client and performs authentication/authorization on-behalf of other Clients with an AS 106. Client 1, which works as a delegated authentication function, performs the more intensive authentication and cryptographic operations on behalf of other Clients. Client 1 may have been pre-configured to receive authorization requests on behalf of other Clients. It should be noted that Client 2 and Client 3 may have been freshly authenticated with Client 1 and have setup individual secure connections between Client 2 and Client 1 and also between Client 3 and Client 1. Messaging details:

It is assumed that Client 1 has already performed the Discovery Process and obtained the R1_URI and the R1_SAM. In an alternative scenario, the Discovery Process itself may also be performed in a proxy manner by Client 1 on behalf of Client 2 and Client 3.

In step 0 of FIG. 26, Clients 1 and 2 each sends a POST message to Client 1 using a secure connections (e.g. TLS/SSL). The content within the POST message has an authorization request for resource R1.

In step 1 of FIG. 26, Client 1 determines that the POST message is actually targeted for an AS 106 and also determines that Clients 2 and 3 are authorized to use a proxy-authentication mode. Based on the SAM that was obtained previously, Client 1 determines that AS1 is among the list of trustworthy functions and also that AS1 accepts proxy-authentications. Client 1 102 establishes a TLS/DTLS connection with AS1 106.

In step 2 of FIG. 26, Client 1, requests authorization for itself and also for authorization of other Clients along with the R1_SAM. Client 1 lists the identities of the other Clients within the POST message. In some embodiments, Client 1 may list the original requests that was obtained from the other Clients and which may have been digitally signed by the other Clients, in order to verify the request(s).

In step 3 of FIG. 26, Client 1 may be authenticated by AS1 and also a platform validation and secure protocols assessment may be performed in order to determine that Client 1 is behaving in a manner that it should. In case, Client 1 is just another machine or application without a user involved then a combination of device authentication along with platform validation checks may be performed. No user authentication is carried out in such a case. In case, a payment assessment has to be performed then the Client 1 would have to perform the payment on behalf of all the Clients based on R1_SAM.

In step 4 of FIG. 26, AS1 issues Tokens for all the three Clients. Since the claims within the Tokens would identify the Clients explicitly therefore only those Clients would be able to use the Tokens. The Tokens cannot be modified since they are digitally signed. It may be possible that Client 1 only has a certain credit and therefore the payment assessment was only partially fulfilled, in such a case, only a limited number of tokens may be issued (e.g. in this case, 2 or less tokens will be issued)

In step 5 of FIG. 26, Client 1 provides the appropriate tokens to Client 2 and Client 3 respectively.

In step 6 of FIG. 26, each of the Clients establishes a secure connection with RS1 using TLS/DTLS In step 7 of FIG. 26, Client 1 process:

In step 7a, Client 1 submits its token, AT1 to RS1 using a POST message

In step 7b, RS1 verifies the token, the token origin and also verifies the signature if one was present and makes a note of the validity. In addition, it may infer from the token that a Proxy-Authorization process was used to generate the token. The RS1 may also be able to infer that a total of 3 tokens were issued.

In step 7c, RS1 sends the resource R1 to Client 1

In step 8 of FIG. 26, Client 2 initiates the retrieval process and the sub-procedures: 8a, 8b and 8c follow similar process as described for Procedures 7a, 7b & 7c.

In step 9 of FIG. 26, Client 3 follows similar process as in 7 and 8 and sends the content through a secure connection.

It is understood that the entities performing the steps illustrated in FIG. 26 may be logical entities that may be implemented in the form of software (i.e., computer-executable instructions) stored in a memory of, and executing on a processor of, an apparatus configured for wireless and/or network communications or a computer system such as those illustrated in FIG. 31C or FIG. 31D. That is, the method(s) illustrated in FIG. 26 may be implemented in the form of software (i.e., computer-executable instructions) stored in a memory of an apparatus, such as the apparatus or computer system illustrated in FIG. 31C or FIG. 31D, which computer executable instructions, when executed by a processor of the apparatus, perform the steps illustrated in FIG. 26. It is also understood that the functionality illustrated in FIG. 26 may implemented as a set of virtualized network functions. The network functions may not necessarily communicate directly, rather, they may communicate via forwarding or routing function. It is also understood that any transmitting and receiving steps illustrated in FIG. 26 may be performed by communication circuitry of the apparatus under control of the processor of the apparatus and the computer-executable instructions (e.g., software) that it executes.

Figure 27:
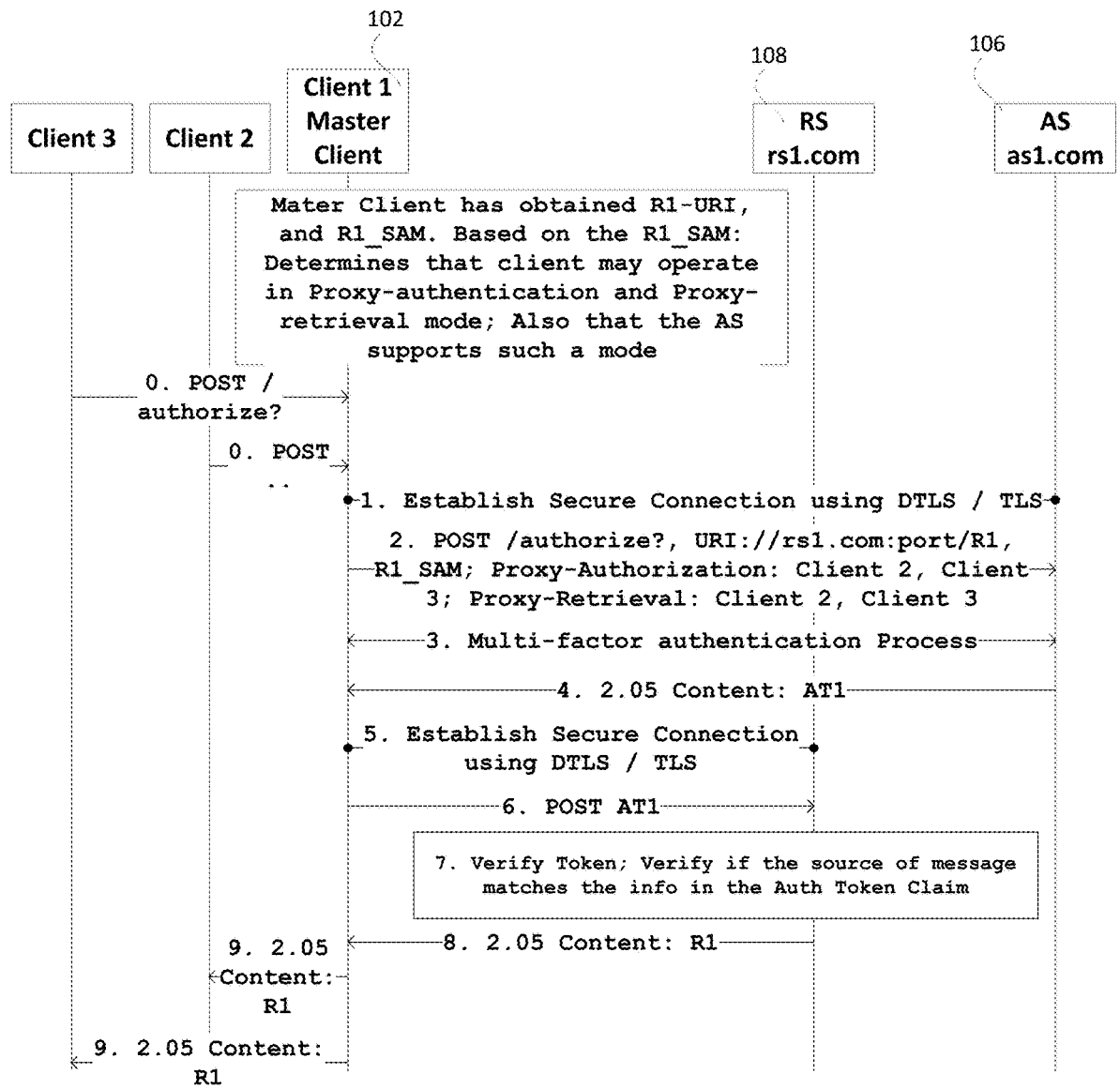
FIG. 27 is a diagram that illustrates a proxy-retrieval process.

An embodiment that demonstrates a proxy-retrieval scenario is shown in FIG. 27. The embodiment uses both proxy-authentication as proxy-retrieval. It may be possible that the authentication may be carried out in non-proxy manner particularly in the case, where the Clients are not constrained. However, if the RS 108 is constrained then a Proxy-Retrieval may be employed. If both the Clients and the RS 108 are constrained then both a Proxy-Authorization as well as a Proxy-Retrieval may be performed. Messaging details:

Messages 0-6 of FIG. 27 are very similar to the Proxy-Authorization scenario described earlier. And also, that Client 2 and Client 3 may have been freshly mutually authenticated with Client 1 and have setup individual secure connections between Client 2 and Client 1 and also between Client 3 and Client 1. Some of the subtle changes include a determination if the RS 108 accepts Proxy-Retrieval and if so, that may be indicated within the SAM. Also, the Client 1 indicates that it is performing a proxy-retrieval on behalf of the other Clients to the AS1 during the Authorization process, therefore during the payment assessment process, Client 1 may be charged for the proxy-retrieval but only one token is issued.

Message 7 of FIG. 27, the RS1 may verify that the Client 1 is performing a Proxy-retrieval, based on the Claims within the Token. It also verifies that the Client 1 has successfully passed the Platform Validation assessment and performed the necessary payment.

Message 8 of FIG. 27, the content R1 is sent to Client 1 102.

Message 9 of FIG. 27, once the Client 1 receives the resource R1, it sends a copy of the resource to both the Clients using secure connection(s).

It is understood that the entities performing the steps illustrated in FIG. 27 may be logical entities that may be implemented in the form of software (i.e., computer-executable instructions) stored in a memory of, and executing on a processor of, an apparatus configured for wireless and/or network communications or a computer system such as those illustrated in FIG. 31C or FIG. 31D. That is, the method(s) illustrated in FIG. 27 may be implemented in the form of software (i.e., computer-executable instructions) stored in a memory of an apparatus, such as the apparatus or computer system illustrated in FIG. 31C or FIG. 31D, which computer executable instructions, when executed by a processor of the apparatus, perform the steps illustrated in FIG. 27. It is also understood that the functionality illustrated in FIG. 27 may implemented as a set of virtualized network functions. The network functions may not necessarily communicate directly, rather, they may communicate via forwarding or routing function. It is also understood that any transmitting and receiving steps illustrated in FIG. 27 may be performed by communication circuitry of the apparatus under control of the processor of the apparatus and the computer-executable instructions (e.g., software) that it executes.

Protocol Enhancements and Extensions

Description of the enhancements and extensions to the existing RD protocol CoRE Resource Directory as well as the CoAP protocol [The Constrained Application Protocol (CoAP), IETF-RFC 7252] are described. Ability for a RS 108 to list the SAM and for a Client to be able to discover the SAM has to be provided. In addition, the ability for a Client to be able to request appropriate authorization and resource retrieval using CoAP is described. In addition, the mechanisms described here may be used over protocols such as Hypertext Transfer Protocol (HTTP) or WebSockets or any other applicable protocol.

RD Extension to Support SAM

CoRE link format IETF-RFC 6690 defines some attributes to describe resources provided on a RS 108 (i.e. endpoint). The RS 108 may be a constrained device that registers its resources including their associated attributes on to a Resource Directory (RD) 2404 so that other devices or applications can discover resources via the RD 2404.

The resource registration process can be extended to support listing of the SAM (resource-specific security profile) describing the security requirements/mechanisms associated with a resource. Also, the ability for a client to discover resources based on certain security profiles. We define two new link attributes:

Security Achievability Mechanism (SAM): This attribute indicates the detailed security achievability mechanism. This may be represented using e.g. JSON, XML or CBOR.

Certificate (Cert): Each resource may be associated with a digital certificate that may be self-signed or issued by a third-party. In addition, the SAM may be associated with a certificate in order to provide the authenticity of the SAM.

Figure 28:
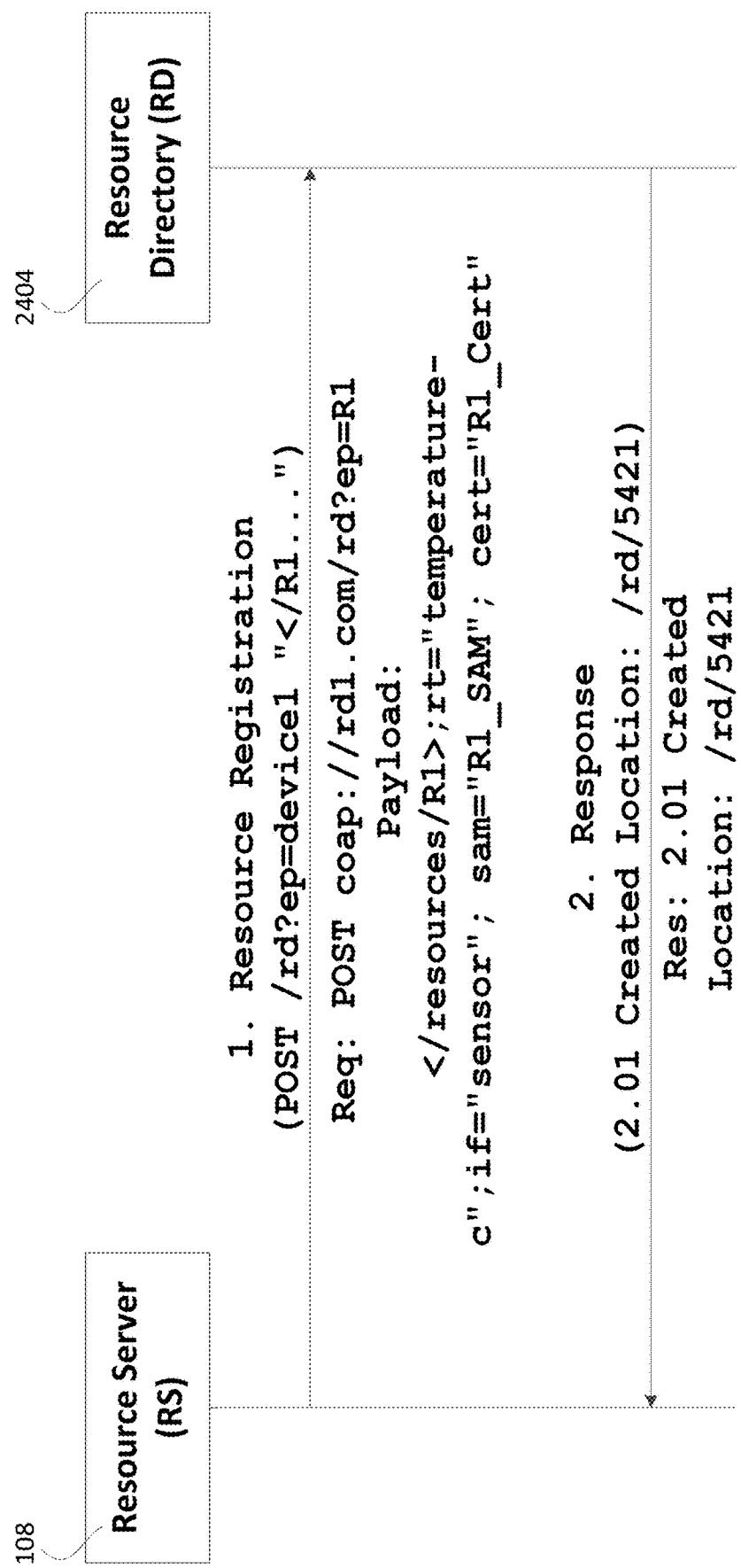
FIG. 28 is a diagram that illustrates a Resource Directory (RD) extension to support registration of SAM associated with a resource.

FIG. 28 illustrates an example procedure of the extended resource registration.

In step 1 of FIG. 28, the endpoint sends "Resource Registration" message to the RD 2404. This message contains a list of resources to be registered. Each resource has its link format description (i.e. link attributes). Especially, each resource has two new attributes "sam" and "cert".

For example, /resources/R1 resource has the following attributes
Resource type (rt) is "temperature-c"
SAM (sam) is "R1_SAM"
Certificate (cert) associated with the SAM is "R1_Cert"

In another example, /resources/R2 resource has the following attributes
Resource type (rt) is "streaming"
Resource-specific security profile (rssp) is "R2_rssp"
Certificate (cert) for resource is "R2_Cert"

In Step 2 of FIG. 28, the RD 2404 sends "Response" message back to the endpoint.

Note that with the introduced new attributes "sam", "rssp" and "cert", a client (e.g. an IoT application) can issue more queries to the RD 2404. For example,
To query and discover endpoints that host a resource with a certain rssp value="LOW"

It is understood that the entities performing the steps illustrated in FIG. 28 may be logical entities that may be implemented in the form of software (i.e., computer-executable instructions) stored in a memory of, and executing on a processor of, an apparatus configured for wireless and/or network communications or a computer system such as those illustrated in FIG. 31C or FIG. 31D. That is, the method(s) illustrated in FIG. 28 may be implemented in the form of software (i.e., computer-executable instructions) stored in a memory of an apparatus, such as the apparatus or computer system illustrated in FIG. 31C or FIG. 31D, which computer executable instructions, when executed by a processor of the apparatus, perform the steps illustrated in FIG. 28. It is also understood that the functionality illustrated in FIG. 28 may implemented as a set of virtualized network functions. The network functions may not necessarily communicate directly, rather, they may communicate via forwarding or routing function. It is also understood that any transmitting and receiving steps illustrated in FIG. 28 may be performed by communication circuitry of the apparatus under control of the processor of the apparatus and the computer-executable instructions (e.g., software) that it executes.

CoAP Extension to Support Non-Proxy, Proxy-Authentication and Proxy-Retrieval

We present CoAP options which enables to support the dynamic authorization framework as well as the optimizations described earlier such as proxy-authorization and proxy-retrieval. A summary of CoAP options is provided in the Table 6.

Figure 29:
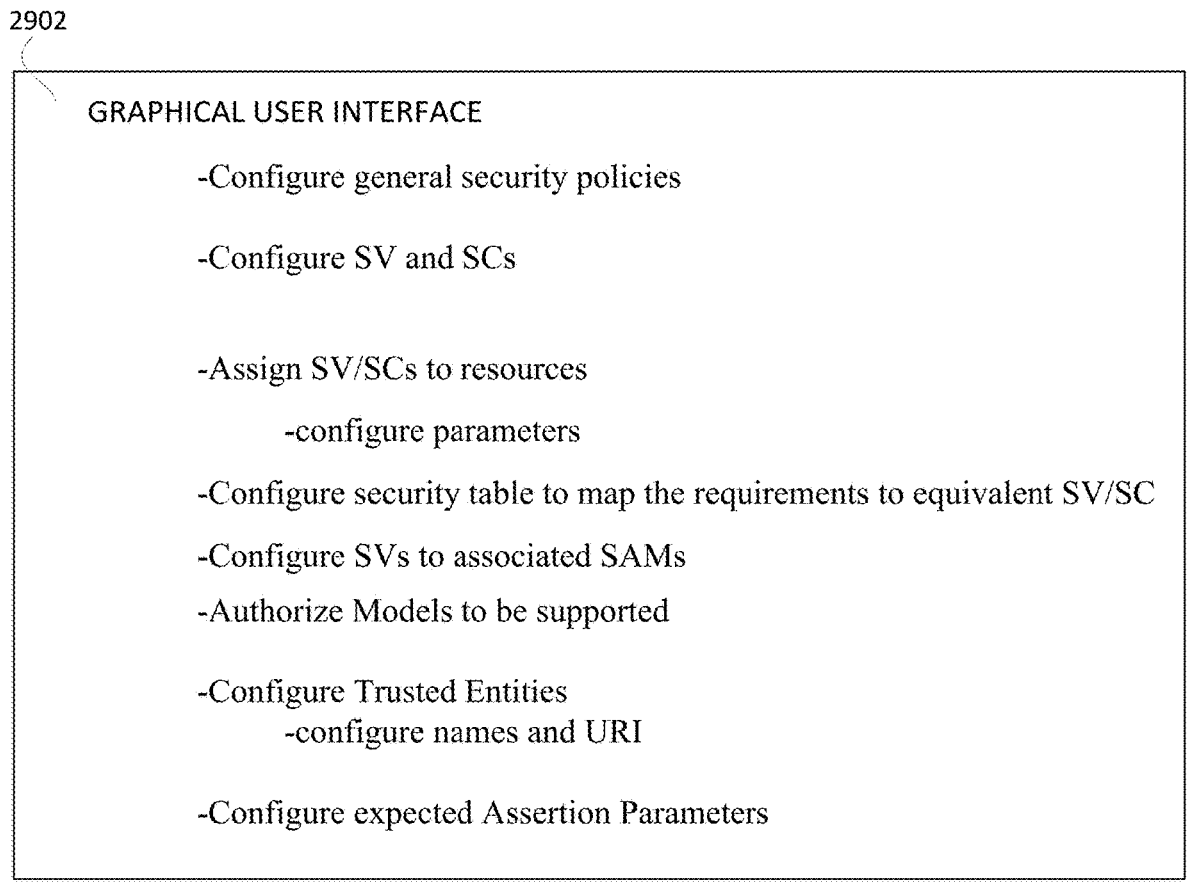
FIG. 29 is a diagram that illustrates Graphical User Interfaces (GUIs) used for configuring various security-related parameters at the RHE/SCF.
Figure 30:
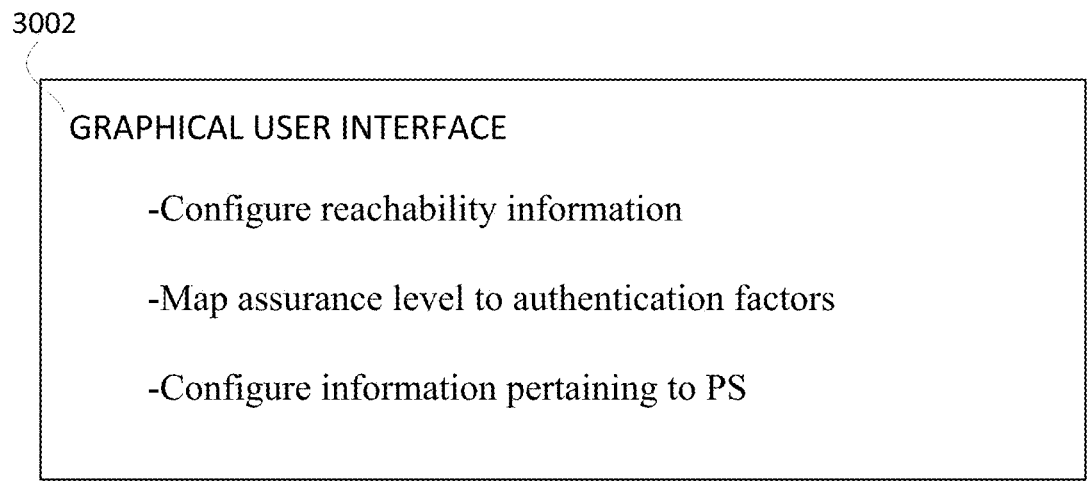

FIGS. 29 and 30 are diagrams that illustrate interfaces that can be used with systems of the present application. It is to be understood that such GUIs can be produced using displays such as those shown in FIGS. 31C-D described below.

Use of GUIs for configuring security policies, requirements, protocols, parameters and appropriate security values may be carried out at the RHE and at the AS. The GUI 2902 at the SCF 1006 or at the RHE, as illustrated in FIG. 29 may be used for performing the following:

Configuring general security policies

Configuration of SV and SCs

Configuration parameters so that SV/SCs can be assigned to resources

TABLE 6

List of CoAP Options

| New CoAP Options | Descriptions | Meaning in a Request | Meaning in a Response |
|---|---|---|---|
| Client-List | Lists the id of each client | Indicates the universal identity or local identity associated with each of the client within the proxy-authorization request or proxy-retrieval request | Indicates the universal identity or local identity associated with each of the client within a proxy-authentication response or proxy-retrieval response |
| Client-Authentication-Tokens | Lists the ATs associated with each client | The Client lists the ATs associated with each of the client. Applicable for both proxy-retrieval as well as non-proxy-retrieval | The AS 106 lists the ATs associated with each of the client. If there is only a single client, then all the ATs associated with that client is sent |
| Nested-Authentication-Token | Indicates if an AT is nested within another AT (optional). This may be the case when an AS 106 creates an AT but within has an AT or PT issued by another function (e.g. PVF 2106 or AF) | Client indicates if an AT is nested within another AT | The AS 106 indicates if an AT is nested within another AT that is issued by the AS |
| Number-of-Clients | Indicates the number of clients the client is going to work as a proxy for. | Client indicates the number of clients that it would be proxying for. It applies to both proxy-authorization as well as proxy-retrieval | The AS 106 may indicate the maximum number of clients that the client is able to represent |
| Number-of-Tokens | Lists the number of ATs included | Indicates the number of ATs that is being used by a client to perform a proxy-retrieval | Indicates the number of ATs issued by the AS |
| Payment-Token | Indicates that it is a payment token | The client indicates if a AT that has been included is a payment token or not | The AS 106 indicates if the included AT is a payment token or not. |
| Proxy-Authorization | Indicates that the CoAP endpoint is requesting proxy-authorization | If a client would like to functions as a proxy-authentication entity, on behalf of other clients | Not Applicable |
| Proxy-Retrieval | Indicates that the CoAP endpoint is requesting proxy-retrieval | Indicate if the endpoint that sends the request would like to perform a proxy-retrieval procedure | Not Applicable |
| Request-Number-of-Authentication-Tokens | Indicates the number of ATs that is being requested | Client indicates the number of ATs it would like to request | Not Applicable |
| Authentication-Token-Usage-Restrictions (optional) | Indicates how AT(s) may be used. Examples of usage may be if the AT can be re-used or for a single retrieval etc.. | Client may include it to indicate to a RS 108 how the ATs may be processed (optional) | The AS 106 provides restrictions on how the issued AT(s) may be used/processed/consumed (optional) |

Graphical User Interfaces (GUI)

Interfaces, such as Graphical User Interfaces (GUIs), can be used to assist user to control and/or configure functionalities related to the service layer charging correlation.

Configuration of a security table that maps the requirements to equivalent SV/SC Configuration of SVs to associated SAMs Authorization Models that are to be supported Configuration of Trusted Entities (e.g. names and URI of AS 106/PS 2402)

Configuration of Assertion Parameters that are expected

A GUI 3002 used for configuring Authorization and Payment related security parameters at the AS/PS 2402 is illustrated in FIG. 30. The GUI 3002 may be used at the AS/PS 2402 in order to perform the following configurations:

- Configuring the types of authentication(s) that may have to be carried out (Multi-factor authentications: biometric, device-based etc.)
- Configuration of information related to reachability of other AS 106 in order that the authentications are carried out.
- Mapping of an assurance level to factors of authentication
- Configuration of information pertaining to PS 2402

Example M2M/IoT/WoT Communication System

The various techniques described herein may be implemented in connection with hardware, firmware, software or, where appropriate, combinations thereof. Such hardware, firmware, and software may reside in apparatuses located at various nodes of a communication network. The apparatuses may operate singly or in combination with each other to effect the methods described herein. As used herein, the terms "apparatus," "network apparatus," "node," "device," and "network node" may be used interchangeably.

The term "service layer" refers to a functional layer within a network service architecture. Service layers are typically situated above the application protocol layer such as HTTP, CoAP or MQTT and provide value added services to client applications. The service layer also provides an interface to core networks at a lower resource layer, such as for example, a control layer and transport/access layer. The service layer supports multiple categories of (service) capabilities or functionalities including service definition, service runtime enablement, policy management, access control, and service clustering. Recently, several industry standards bodies, e.g., oneM2M, have been developing M2M service layers to address the challenges associated with the integration of M2M types of devices and applications into deployments such as the Internet/Web, cellular, enterprise, and home networks. A M2M service layer can provide applications and/or various devices with access to a collection of or a set of the above mentioned capabilities or functionalities, supported by the service layer, which can be referred to as a CSE or SCL. A few examples include but are not limited to security, charging, data management, device management, discovery, provisioning, and connectivity management which can be commonly used by various applications. These capabilities or functionalities are made available to such various applications via APIs which make use of message formats, resource structures and resource representations defined by the M2M service layer. The CSE or SCL is a functional entity that may be implemented by hardware and/or software and that provides (service) capabilities or functionalities exposed to various applications and/or devices (i.e., functional interfaces between such functional entities) in order for them to use such capabilities or functionalities.

FIG. 31A is a diagram of an example machine-to machine (M2M), Internet of Things (IoT), or Web of Things (WoT) communication system 10 in which one or more disclosed embodiments may be implemented. Generally, M2M technologies provide building blocks for the IoT/WoT, and any M2M device, M2M gateway, M2M server, or M2M service platform may be a component or node of the IoT/WoT as well as an IoT/WoT service layer, etc. Communication system 10 can be used to implement functionality of the disclosed embodiments and can include functionality and logical entities such as Client 102, RO 104, AS 106, RS 108, CAM 702, SAMs such as D-SAM 704, Sensors such as sensor 802, SAEF 1010, RLE 1008, RHE 1004, SCF 1006, DS 1002, Resource 1102, DHP 1104, AuthF 2102, MFAF 2104 PVF 2106, PF 2108, PS 2402, RD 2404 SAEP, RAP and logical entities to produce the GUIs of FIGS. 29 and 30.

As shown in FIG. 31A, the M2M/IoT/WoT communication system 10 includes a communication network 12. The communication network 12 may be a fixed network (e.g., Ethernet, Fiber, ISDN, PLC, or the like) or a wireless network (e.g., WLAN, cellular, or the like) or a network of heterogeneous networks. For example, the communication network 12 may be comprised of multiple access networks that provide content such as voice, data, video, messaging, broadcast, or the like to multiple users. For example, the communication network 12 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like. Further, the communication network 12 may comprise other networks such as a core network, the Internet, a sensor network, an industrial control network, a personal area network, a fused personal network, a satellite network, a home network, or an enterprise network for example.

As shown in FIG. 31A, the M2M/IoT/WoT communication system 10 may include the Infrastructure Domain and the Field Domain. The Infrastructure Domain refers to the network side of the end-to-end M2M deployment, and the Field Domain refers to the area networks, usually behind an M2M gateway. The Field Domain and Infrastructure Domain may both comprise a variety of different network nodes (e.g., servers, gateways, device, and the like). For example, the Field Domain may include M2M gateways 14 and terminal devices 18. It will be appreciated that any number of M2M gateway devices 14 and M2M terminal devices 18 may be included in the M2M/IoT/WoT communication system 10 as desired. Each of the M2M gateway devices 14 and M2M terminal devices 18 are configured to transmit and receive signals, using communications circuitry, via the communication network 12 or direct radio link. A M2M gateway 14 allows wireless M2M devices (e.g. cellular and non-cellular) as well as fixed network M2M devices (e.g., PLC) to communicate either through operator networks, such as the communication network 12 or direct radio link. For example, the M2M terminal devices 18 may collect data and send the data, via the communication network 12 or direct radio link, to an M2M application 20 or other M2M devices 18. The M2M terminal devices 18 may also receive data from the M2M application 20 or an M2M terminal device 18. Further, data and signals may be sent to and received from the M2M application 20 via an M2M service layer 22, as described below. M2M terminal devices 18 and gateways 14 may communicate via various networks including, cellular, WLAN, WPAN (e.g., Zigbee, 6LoWPAN, Bluetooth), direct radio link, and wireline for example.

Exemplary M2M terminal devices 18 include, but are not limited to, tablets, smart phones, medical devices, temperature and weather monitors, connected cars, smart meters, game consoles, personal digital assistants, health and fitness monitors, lights, thermostats, appliances, garage doors and other actuator-based devices, security devices, and smart outlets.

Referring to FIG. 31B, the illustrated M2M service layer 22 in the field domain provides services for the M2M application 20, M2M gateway devices 14, and M2M terminal devices 18 and the communication network 12. Communication network 12 can be used to implement functionality of the disclosed embodiments and can include functionality and logical entities such as Client 102, RO 104, AS 106, RS 108, CAM 702, SAMs such as D-SAM 704, Sensors such as sensor 802, SAEF 1010, RLE 1008, RHE 1004, SCF 1006, DS 1002, Resource 1102, DHP 1104, AuthF 2102, MFAF 2104 PVF 2106, PF 2108, PS 2402, RD 2404 SAEP, RAP and logical entities to produce the GUIs of FIGS. 29 and 30. The M2M service layer 22 may be implemented by one or more servers, computers, devices, virtual machines (e.g. cloud/storage farms, etc.) or the like, including for example the devices illustrated in FIGS. 31C and 31D described below. It will be understood that the M2M service layer 22 may communicate with any number of M2M applications, M2M gateways 14, M2M terminal devices 18, and communication networks 12 as desired. The M2M service layer 22 may be implemented by one or more nodes of the network, which may comprises servers, computers, devices, or the like. The M2M service layer 22 provides service capabilities that apply to M2M terminal devices 18, M2M gateways 14, and M2M applications 20. The functions of the M2M service layer 22 may be implemented in a variety of ways, for example as a web server, in the cellular core network, in the cloud, etc.

Similar to the illustrated M2M service layer 22, there is the M2M service layer 22' in the Infrastructure Domain. M2M service layer 22' provides services for the M2M application 20' and the underlying communication network 12 in the infrastructure domain. M2M service layer 22' also provides services for the M2M gateways 14 and M2M terminal devices 18 in the field domain. It will be understood that the M2M service layer 22' may communicate with any number of M2M applications, M2M gateways and M2M devices. The M2M service layer 22' may interact with a service layer by a different service provider. The M2M service layer 22' by one or more nodes of the network, which may comprises servers, computers, devices, virtual machines (e.g., cloud computing/storage farms, etc.) or the like.

Referring also to FIG. 31B, the M2M service layers 22 and 22' provide a core set of service delivery capabilities that diverse applications and verticals can leverage. These service capabilities enable M2M applications 20 and 20' to interact with devices and perform functions such as data collection, data analysis, device management, security, billing, service/device discovery etc. Essentially, these service capabilities free the applications of the burden of implementing these functionalities, thus simplifying application development and reducing cost and time to market. The service layers 22 and 22' also enable M2M applications 20 and 20' to communicate through networks 12 in connection with the services that the service layers 22 and 22' provide.

The methods of the present application may be implemented as part of a service layer 22 and 22'. The service layer 22 and 22' is a software middleware layer that supports value-added service capabilities through a set of Application Programming Interfaces (APIs) and underlying networking interfaces. Both ETSI M2M and oneM2M use a service layer that may contain the connection methods of the present application. ETSI M2M's service layer is referred to as the Service Capability Layer (SCL). The SCL may be implemented within an M2M device (where it is referred to as a device SCL (DSCL)), a gateway (where it is referred to as a gateway SCL (GSCL)) and/or a network node (where it is referred to as a network SCL (NSCL)). The oneM2M service layer supports a set of Common Service Functions (CSFs) (i.e. service capabilities). An instantiation of a set of one or more particular types of CSFs is referred to as a Common Services Entity (CSE) which can be hosted on different types of network nodes (e.g. infrastructure node, middle node, application-specific node). Further, connection methods of the present application can implemented as part of an M2M network that uses a Service Oriented Architecture (SOA) and/or a resource-oriented architecture (ROA) to access services such as the connection methods of the present application.

In some embodiments, M2M applications 20 and 20' may be used in conjunction with the disclosed systems and methods. The M2M applications 20 and 20' may include the applications that interact with the UE or gateway and may also be used in conjunction with other disclosed systems and methods.

In one embodiment, the logical entities such as Client 102, RO 104, AS 106, RS 108, CAM 702, SAMs such as D-SAM 704, Sensors such as sensor 802, SAEF 1010, RLE 1008, RHE 1004, SCF 1006, DS 1002, Resource 1102, DHP 1104, AuthF 2102, MFAF 2104 PVF 2106, PF 2108, PS 2402, RD 2404 SAEP, RAP and logical entities to produce the GUIs of FIGS. 29 and 30 may be hosted within a M2M service layer instance hosted by an M2M node, such as an M2M server, M2M gateway, or M2M device, as shown in FIG. 31B. For example, the logical entities such as Client 102, RO 104, AS 106, RS 108, CAM 702, SAMs such as D-SAM 704, Sensors such as sensor 802, SAEF 1010, RLE 1008, RHE 1004, SCF 1006, DS 1002, Resource 1102, DHP 1104, AuthF 2102, MFAF 2104 PVF 2106, PF 2108, PS 2402, RD 2404 SAEP, RAP and logical entities to produce the GUIs of FIGS. 29 and 30 may comprise an individual service capability within the M2M service layer instance or as a sub-function within an existing service capability.

The M2M applications 20 and 20' may include applications in various industries such as, without limitation, transportation, health and wellness, connected home, energy management, asset tracking, and security and surveillance. As mentioned above, the M2M service layer, running across the devices, gateways, servers and other nodes of the system, supports functions such as, for example, data collection, device management, security, billing, location tracking/geofencing, device/service discovery, and legacy systems integration, and provides these functions as services to the M2M applications 20 and 20'.

Generally, the service layers 22 and 22' define a software middleware layer that supports value-added service capabilities through a set of Application Programming Interfaces (APIs) and underlying networking interfaces. Both the ETSI M2M and oneM2M architectures define a service layer. ETSI M2M's service layer is referred to as the Service Capability Layer (SCL). The SCL may be implemented in a variety of different nodes of the ETSI M2M architecture. For example, an instance of the service layer may be implemented within an M2M device (where it is referred to as a device SCL (DSCL)), a gateway (where it is referred to as a gateway SCL (GSCL)) and/or a network node (where it is referred to as a network SCL (NSCL)). The oneM2M service layer supports a set of Common Service Functions (CSFs) (i.e., service capabilities). An instantiation of a set of one or more particular types of CSFs is referred to as a Common Services Entity (CSE) which can be hosted on different types of network nodes (e.g. infrastructure node, middle node, application-specific node). The Third Generation Partnership Project (3GPP) has also defined an architecture for machine-type communications (MTC). In that architecture, the service layer, and the service capabilities it provides, are implemented as part of a Service Capability Server (SCS). Whether embodied in a DSCL, GSCL, or NSCL of the ETSI M2M architecture, in a Service Capability Server (SCS) of the 3GPP MTC architecture, in a CSF or CSE of the oneM2M architecture, or in some other node of a network, an instance of the service layer may be implemented as a logical entity (e.g., software, computer-executable instructions, and the like) executing either on one or more stand-alone nodes in the network, including servers, computers, and other computing devices or nodes, or as part of one or more existing nodes. As an example, an instance of a service layer or component thereof may be implemented in the form of software running on a network node (e.g., server, computer, gateway, device or the like) having the general architecture illustrated in FIG. 31C or FIG. 31D described below.

Further, logical entities such as Client 102, RO 104, AS 106, RS 108, CAM 702, SAMs such as D-SAM 704, Sensors such as sensor 802, SAEF 1010, RLE 1008, RHE 1004, SCF 1006, DS 1002, Resource 1102, DHP 1104, AuthF 2102, MFAF 2104 PVF 2106, PF 2108, PS 2402, RD 2404 SAEP, RAP and logical entities to produce the GUIs of FIGS. 29 and 30 can implemented as part of an M2M network that uses a Service Oriented Architecture (SOA and/or a Resource-Oriented Architecture (ROA) to access services of the present application.

FIG. 31C is a block diagram of an example hardware/software architecture of a M2M network node 30, such as an M2M device 18, an M2M gateway 14, an M2M server, or the like. The node 30 can execute or include logical entities such as Client 102, RO 104, AS 106, RS 108, CAM 702, SAMs such as D-SAM 704, Sensors such as sensor 802, SAEF 1010, RLE 1008, RHE 1004, SCF 1006, DS 1002, Resource 1102, DHP 1104, AuthF 2102, MFAF 2104 PVF 2106, PF 2108, PS 2402, RD 2404 SAEP, RAP and logical entities to produce the GUIs of FIGS. 29 and 30. The device 30 can be part of an M2M network as shown in FIG. 31A-B or part of a non-M2M network. As shown in FIG. 31C, the M2M node 30 may include a processor 32, non-removable memory 44, removable memory 46, a speaker/microphone 38, a keypad 40, a display, touchpad, and/or indicators 42, a power source 48, a global positioning system (GPS) chipset 50, and other peripherals 52. The node 30 may also include communication circuitry, such as a transceiver 34 and a transmit/receive element 36. It will be appreciated that the M2M node 30 may include any sub-combination of the foregoing elements while remaining consistent with an embodiment. This node may be a node that implements the SMSF functionality described herein.

The processor 32 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. In general, the processor 32 may execute computer-executable instructions stored in the memory (e.g., memory 44 and/or memory 46) of the node in order to perform the various required functions of the node. For example, the processor 32 may perform signal coding, data processing, power control, input/output processing, and/or any other functionality that enables the M2M node 30 to operate in a wireless or wired environment. The processor 32 may run application-layer programs (e.g., browsers) and/or radio access-layer (RAN) programs and/or other communications programs. The processor 32 may also perform security operations such as authentication, security key agreement, and/or cryptographic operations, such as at the access-layer and/or application layer for example.

As shown in FIG. 31C, the processor 32 is coupled to its communication circuitry (e.g., transceiver 34 and transmit/receive element 36). The processor 32, through the execution of computer executable instructions, may control the communication circuitry in order to cause the node 30 to communicate with other nodes via the network to which it is connected. In particular, the processor 32 may control the communication circuitry in order to perform the transmitting and receiving steps described herein and in the claims. While FIG. 31C depicts the processor 32 and the transceiver 34 as separate components, it will be appreciated that the processor 32 and the transceiver 34 may be integrated together in an electronic package or chip.

The transmit/receive element 36 may be configured to transmit signals to, or receive signals from, other M2M nodes, including M2M servers, gateways, device, and the like. For example, in an embodiment, the transmit/receive element 36 may be an antenna configured to transmit and/or receive RF signals. The transmit/receive element 36 may support various networks and air interfaces, such as WLAN, WPAN, cellular, and the like. In an embodiment, the transmit/receive element 36 may be an emitter/detector configured to transmit and/or receive IR, UV, or visible light signals, for example. In yet another embodiment, the transmit/receive element 36 may be configured to transmit and receive both RF and light signals. It will be appreciated that the transmit/receive element 36 may be configured to transmit and/or receive any combination of wireless or wired signals.

In addition, although the transmit/receive element 36 is depicted in FIG. 31C as a single element, the M2M node 30 may include any number of transmit/receive elements 36. More specifically, the M2M node 30 may employ MIMO technology. Thus, in an embodiment, the M2M node 30 may include two or more transmit/receive elements 36 (e.g., multiple antennas) for transmitting and receiving wireless signals.

The transceiver 34 may be configured to modulate the signals that are to be transmitted by the transmit/receive element 36 and to demodulate the signals that are received by the transmit/receive element 36. As noted above, the M2M node 30 may have multi-mode capabilities. Thus, the transceiver 34 may include multiple transceivers for enabling the M2M node 30 to communicate via multiple RATs, such as UTRA and IEEE 802.11, for example.

The processor 32 may access information from, and store data in, any type of suitable memory, such as the non-removable memory 44 and/or the removable memory 46. For example, the processor 32 may store session context in its memory, as described above. The non-removable memory 44 may include random-access memory (RAM), read-only memory (ROM), a hard disk, or any other type of memory storage device. The removable memory 46 may include a subscriber identity module (SIM) card, a memory stick, a secure digital (SD) memory card, and the like. In other embodiments, the processor 32 may access information from, and store data in, memory that is not physically located on the M2M node 30, such as on a server or a home computer. The processor 32 may be configured to control lighting patterns, images, or colors on the display or indicators 42 to reflect the status of an M2M service layer session migration or sharing or to obtain input from a user or display information to a user about the node's session migration or sharing capabilities or settings. In another example, the display may show information with regard to a session state. The current disclosure defines a RESTful user/application API in the oneM2M embodiment. A graphical user interface, which may be shown on the display, may be layered on top of the API to allow a user to interactively establish and manage an E2E session, or the migration or sharing thereof, via the underlying service layer session functionality described herein.

The processor 32 may receive power from the power source 48, and may be configured to distribute and/or control the power to the other components in the M2M node 30. The power source 48 may be any suitable device for powering the M2M node 30. For example, the power source 48 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 32 may also be coupled to the GPS chipset 50, which is configured to provide location information (e.g., longitude and latitude) regarding the current location of the M2M node 30. It will be appreciated that the M2M node 30 may acquire location information by way of any suitable location-determination method while remaining consistent with an embodiment.

The processor 32 may further be coupled to other peripherals 52, which may include one or more software and/or hardware modules that provide additional features, functionality and/or wired or wireless connectivity. For example, the peripherals 52 may include various sensors such as an accelerometer, biometrics (e.g., figure print) sensors, an e-compass, a satellite transceiver, a digital camera (for photographs or video), a universal serial bus (USB) port or other interconnect interfaces, a vibration device, a television transceiver, a hands free headset, a Bluetooth® module, a frequency modulated (FM) radio unit, a digital music player, a media player, a video game player module, an Internet browser, and the like.

The node 30 may be embodied in other apparatuses or devices, such as a sensor, consumer electronics, a wearable device such as a smart watch or smart clothing, a medical or eHealth device, a robot, industrial equipment, a drone, a vehicle such as a car, truck, train, or airplane. The node 30 may connect to other components, modules, or systems of such apparatuses or devices via one or more interconnect interfaces, such as an interconnect interface that may comprise one of the peripherals 52. Alternately, the node 30 may comprise apparatuses or devices, such as a sensor, consumer electronics, a wearable device such as a smart watch or smart clothing, a medical or eHealth device, a robot, industrial equipment, a drone, a vehicle such as a car, truck, train, or airplane.

FIG. 31D is a block diagram of an exemplary computing system 90 which may also be used to implement one or more nodes of an M2M network, such as an M2M server, gateway, device, or other node. Computing system 90 may comprise a computer or server and may be controlled primarily by computer readable instructions, which may be in the form of software, wherever, or by whatever means such software is stored or accessed. Computing system 90 can execute or include logical entities such as Client 102, RO 104, AS 106, RS 108, CAM 702, SAMs such as D-SAM 704, Sensors such as sensor 802, SAEF 1010, RLE 1008, RHE 1004, SCF 1006, DS 1002, Resource 1102, DHP 1104, AuthF 2102, MFAF 2104 PVF 2106, PF 2108, PS 2402, RD 2404 SAEP, RAP and logical entities to produce the GUIs of FIGS. 29 and 30. Computing system 90 can be an M2M device, user equipment, gateway, UE/GW or any other nodes including nodes of the mobile care network, service layer network application provider, terminal device 18 or an M2M gateway device 14 for example. Such computer readable instructions may be executed within a processor, such as central processing unit (CPU) 91, to cause computing system 90 to do work. In many known workstations, servers, and personal computers, central processing unit 91 is implemented by a single-chip CPU called a microprocessor. In other machines, the central processing unit 91 may comprise multiple processors. Coprocessor 81 is an optional processor, distinct from main CPU 91, that performs additional functions or assists CPU 91. CPU 91 and/or coprocessor 81 may receive, generate, and process data related to the disclosed systems and methods for E2E M2M service layer sessions, such as receiving session credentials or authenticating based on session credentials.

In operation, CPU 91 fetches, decodes, and executes instructions, and transfers information to and from other resources via the computer's main data-transfer path, system bus 80. Such a system bus connects the components in computing system 90 and defines the medium for data exchange. System bus 80 typically includes data lines for sending data, address lines for sending addresses, and control lines for sending interrupts and for operating the system bus. An example of such a system bus 80 is the PCI (Peripheral Component Interconnect) bus.

Memories coupled to system bus 80 include random access memory (RAM) 82 and read only memory (ROM) 93. Such memories include circuitry that allows information to be stored and retrieved. ROMs 93 generally contain stored data that cannot easily be modified. Data stored in RAM 82 can be read or changed by CPU 91 or other hardware devices. Access to RAM 82 and/or ROM 93 may be controlled by memory controller 92. Memory controller 92 may provide an address translation function that translates virtual addresses into physical addresses as instructions are executed. Memory controller 92 may also provide a memory protection function that isolates processes within the system and isolates system processes from user processes. Thus, a program running in a first mode can access only memory mapped by its own process virtual address space; it cannot access memory within another process's virtual address space unless memory sharing between the processes has been set up.

In addition, computing system 90 may contain peripherals controller 83 responsible for communicating instructions from CPU 91 to peripherals, such as printer 94, keyboard 84, mouse 95, and disk drive 85.

Display 86, which is controlled by display controller 96, is used to display visual output generated by computing system 90. Such visual output may include text, graphics, animated graphics, and video. Display 86 may be implemented with a CRT-based video display, an LCD-based flat-panel display, gas plasma-based flat-panel display, or a touch-panel. Display controller 96 includes electronic components required to generate a video signal that is sent to display 86.

Further, computing system 90 may contain communication circuitry, such as for example a network adaptor 97, that may be used to connect computing system 90 to an external communications network, such as network 12 of FIG. 31A and FIG. 31B, to enable the computing system 90 to communicate with other nodes of the network.

User equipment (UE) can be any device used by an end-user to communicate. It can be a hand-held telephone, a laptop computer equipped with a mobile broadband adapter, or any other device. For example, the UE can be implemented as the M2M terminal device 18 of FIGS. 31 A-B or the device 30 of FIG. 31 C.

It is understood that any or all of the systems, methods, and processes described herein may be embodied in the form of computer executable instructions (i.e., program code) stored on a computer-readable storage medium which instructions, when executed by a machine, such as a node of an M2M network, including for example an M2M server, gateway, device or the like, perform and/or implement the systems, methods and processes described herein. Specifically, any of the steps, operations or functions described above, including the operations of the gateway, UE, UE/GW, or any of the nodes of the mobile core network, service layer or network application provider, may be implemented in the form of such computer executable instructions. Logical entities such as Client 102, RO 104, AS 106, RS 108, CAM 702, SAMs such as D-SAM 704, Sensors such as sensor 802, SAEF 1010, RLE 1008, RHE 1004, SCF 1006, DS 1002, Resource 1102, DHP 1104, AuthF 2102, MFAF 2104 PVF 2106, PF 2108, PS 2402, RD 2404 SAEP, RAP and logical entities to produce the GUIs of FIGS. 29 and 30 may be embodied in the form of the computer executable instructions stored on a computer-readable storage medium. Computer readable storage media include both volatile and nonvolatile, removable and non-removable media implemented in any non-transitory (i.e., tangible or physical) method or technology for storage of information, but such computer readable storage media do not includes signals. Computer readable storage media include, but are not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other tangible or physical medium which can be used to store the desired information and which can be accessed by a computer.

In describing preferred embodiments of the subject matter of the present disclosure, as illustrated in the Figures, specific terminology is employed for the sake of clarity. The claimed subject matter, however, is not intended to be limited to the specific terminology so selected, and it is to be understood that each specific element includes all technical equivalents that operate in a similar manner to accomplish a similar purpose.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have elements that do not differ from the literal language of the claims, or if they include equivalent elements with insubstantial differences from the literal language of the claims.

What is claimed:

1. An apparatus, comprising a processor, a memory, and computer-executable instructions stored in the memory which, when executed by the processor, cause the apparatus to:
   send, to a Resource Listing Entity (RLE), a query pertaining to a resource;
   receive, from the RLE, a response to the query, the response comprising a location of the resource and a Security Achievability Mechanism (SAM) associated with the resource;
   determine, based on the SAM, a security level required for accessing the resource;
   determine, based on the security level and needs of the apparatus, an authorization model for accessing the resource, the authorization model being a push model, a pull model, an agent model, a push confirm model, or an indirect push model; and
   apply the authorization model in communications required for compliance with the SAM in accessing the resource.

2. The apparatus of claim 1, wherein the needs of the apparatus comprise one or more of a constraint on available battery, memory, computational bandwidth, and certificate.

3. The apparatus of claim 1, wherein the instructions further cause the apparatus to: identify an Authorization Server (AS), the AS being trustable by the apparatus and the RLE; and contact the AS server to obtain access to the resource.

4. The apparatus of claim 1, wherein the instructions further cause the apparatus to determine to perform, based on the SAM and the needs of the apparatus, a proxy-authentication operation.

5. The apparatus of claim 1, wherein the instructions further cause the apparatus to determine to perform, based on the SAM and the needs of the apparatus, a proxy-retrieval operation.

6. The apparatus of claim 1, wherein the instructions further cause the apparatus to:
   initiate an authentication, authorization, and/or payment operation;
   in response to the authentication, authorization, and/or payment operation, obtain an assertion of secure behavior from a Security-Achievability Enabler Function (SAEF).

7. The apparatus of claim 6, wherein the SAEF is a trusted third-party function.

8. The apparatus of claim 1, wherein the instructions further cause the apparatus to:
   identify a protocol associated the authorization model;
   download the protocol;
   use the protocol in applying the model in communications required for compliance with the SAM in accessing the resource.

9. The apparatus of claim 7, in which the protocol is Datagram Transport Layer Security (DTLS).

* * * * *